United States Patent
Chen et al.

(10) Patent No.: US 11,140,613 B2
(45) Date of Patent: Oct. 5, 2021

(54) NETWORK ACCESS METHOD AND UE USING THE SAME

(71) Applicant: Industrial Technology Research Institute, Hsinchu (TW)

(72) Inventors: Jen-Hsien Chen, Chiayi County (TW); Wei-Chen Pao, Hsinchu County (TW); Chien-Min Lee, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/521,597

(22) Filed: Jul. 25, 2019

(65) Prior Publication Data
US 2020/0037230 A1    Jan. 30, 2020

Related U.S. Application Data

(60) Provisional application No. 62/702,923, filed on Jul. 25, 2018.

(51) Int. Cl.
*H04W 48/10* (2009.01)
*H04J 11/00* (2006.01)

(52) U.S. Cl.
CPC ......... *H04W 48/10* (2013.01); *H04J 11/0073* (2013.01); *H04J 11/0076* (2013.01); *H04J 2011/0096* (2013.01)

(58) Field of Classification Search
CPC ..... H04W 48/10; H04W 48/12; H04W 48/14; H04J 11/0073; H04J 11/0069;
(Continued)

(56) References Cited

U.S. PATENT DOCUMENTS 10,057,785 B2    8/2018    Kwak et al.
2010/0238901 A1    9/2010    Sampath et al.
(Continued)

FOREIGN PATENT DOCUMENTS

| CN | 101478829 | 7/2009 |
|---|---|---|
| CN | 103987126 | 8/2014 |

(Continued)

OTHER PUBLICATIONS

Sony,"Considerations on DL Signals and Channels for NR unlicensed operation", 3GPP TSG RAN WG1 Meeting, May 2018, pp. 1-2.

(Continued)

*Primary Examiner* — Phong La
(74) *Attorney, Agent, or Firm* — JCIPRNET

(57) ABSTRACT

The disclosure provides a network access method and a user equipment (UE) using the same method in an environment of a 5G communication system. In an exemplary embodiment in accordance with the disclosure, the disclosure is directed to a network access method for a UE. The method would include not limited to: receiving a Synchronization Signal/physical broadcast channel Block (SSB) which comprises at least one of a physical broadcast channel (PBCH), a primary synchronization signal (PSS), a secondary synchronization signal (SSS) or mapping information; and determining from the SSB at least one of a SSB candidate number, a SSB index or a SSB pattern.

24 Claims, 43 Drawing Sheets

(58) Field of Classification Search
CPC ........... H04J 11/007379; H04J 11/0086; H04J 2011/0096; H04J 11/0076
USPC ........................................................ 370/254
See application file for complete search history.

(56) References Cited

U.S. PATENT DOCUMENTS

| | | | |
|---|---|---|---|
| 2012/0188907 | A1 | 7/2012 | Dayal et al. |
| 2018/0084593 | A1* | 3/2018 | Chen ................ H04L 5/0048 |
| 2018/0139084 | A1* | 5/2018 | Jung ................ H04L 27/2657 |
| 2018/0139713 | A1 | 5/2018 | Lee et al. |
| 2018/0176067 | A1 | 6/2018 | Luo et al. |
| 2018/0242232 | A1 | 8/2018 | Chendamarai Kannan et al. |
| 2018/0316454 | A1 | 11/2018 | Damnjanovic et al. |
| 2018/0324023 | A1 | 11/2018 | Zeng et al. |
| 2018/0343156 | A1 | 11/2018 | Malik et al. |
| 2019/0037509 | A1* | 1/2019 | Li .......................... H04L 5/001 |
| 2019/0053271 | A1* | 2/2019 | Islam ............... H04W 74/0833 |
| 2019/0059129 | A1* | 2/2019 | Luo ..................... H04W 72/042 |
| 2019/0081721 | A1* | 3/2019 | Ly ........................ H04J 11/0069 |
| 2019/0081827 | A1* | 3/2019 | Ly ........................ H04J 11/0069 |
| 2019/0109700 | A1* | 4/2019 | Liu ..................... H04L 27/2692 |
| 2019/0182817 | A1* | 6/2019 | Agiwal ............. H04W 72/0406 |
| 2019/0191461 | A1* | 6/2019 | Lee ...................... H04W 76/28 |
| 2019/0281534 | A1* | 9/2019 | Yu ....................... H04B 7/0617 |
| 2019/0327696 | A1* | 10/2019 | Oh ....................... H04L 5/0048 |
| 2020/0008131 | A1* | 1/2020 | Chakraborty ......... H04W 16/28 |
| 2020/0059874 | A1* | 2/2020 | Noh ...................... H04L 5/0007 |
| 2020/0163037 | A1* | 5/2020 | Zheng .................. H04W 16/14 |
| 2020/0389885 | A1* | 12/2020 | Tomeba ................ H04W 88/02 |
| 2020/0413356 | A1* | 12/2020 | Wang ................. H04W 56/0015 |
| 2021/0175937 | A1* | 6/2021 | Yamada ............... H04B 7/0639 |

FOREIGN PATENT DOCUMENTS

| | | |
|---|---|---|
| CN | 105009479 | 10/2015 |
| CN | 105848165 | 8/2016 |
| CN | 106576343 | 4/2017 |
| CN | 106688268 | 5/2017 |
| CN | 106717090 | 5/2017 |
| CN | 107318150 | 11/2017 |
| CN | 107580791 | 1/2018 |
| CN | 108092754 | 5/2018 |
| CN | 108092930 | 5/2018 |
| CN | 109417801 | 3/2019 |
| TW | 201830911 | 8/2018 |
| WO | 2016164823 | 10/2016 |
| WO | 2017074496 | 5/2017 |
| WO | 2018128376 | 7/2018 |

OTHER PUBLICATIONS

Qualcomm Incorporated,"DL signals and channels for NR-U", 3GPP TSG RAN WG1 Meeting, May 2018, pp. 1-10.
Vivo, "Discussion on physical DL channel design in NR unlicensed spectrum", 3GPP TSG RAN WG1 Meeting, May 2018, pp. 1-3.
Nokia, Nokia Shanghai Bell,"On DL Signals and Channels for NR-U", 3GPP TSG RAN WG1 Meeting, May 2018, pp. 1-8.
Ericsson,"On DL signals and channels for NR-U", 3GPP TSG-RAN WG1 Meeting, May 2018, pp. 1-4.
ZTE,"Considerations on DL reference signals and channels design for NR-U", 3GPP TSG RAN WG1 Meeting, May 2018, pp. 1-7.
Convida Wireless, "Design Considerations for SSB in NR-U", 3GPP TSG-RAN WG1 Meeting #93, R1-1807225, May 21-25, 2018, pp. 1-3.
Potevio, "Discussion on SSB design for NR-U", 3GPP TSG-RAN WG1 Meeting #93, R1-1807229, May 21-25, 2018, pp. 1-3.
"Office Action of Taiwan Counterpart Application", dated Oct. 23, 2020, p. 1-p. 11.
"Office Action of China Counterpart Application", dated Apr. 26, 2021, p. 1 -p. 11.

* cited by examiner

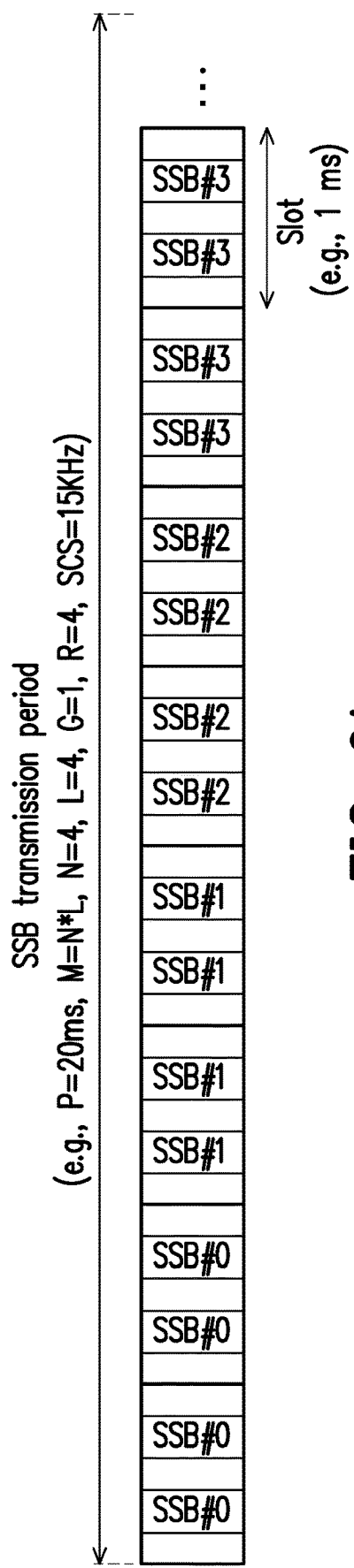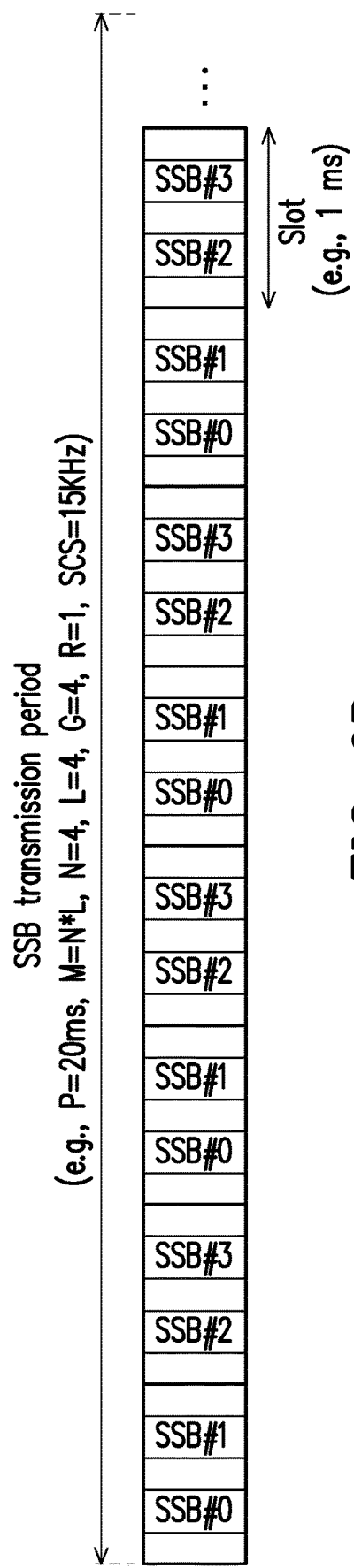
FIG. 9A
FIG. 9B

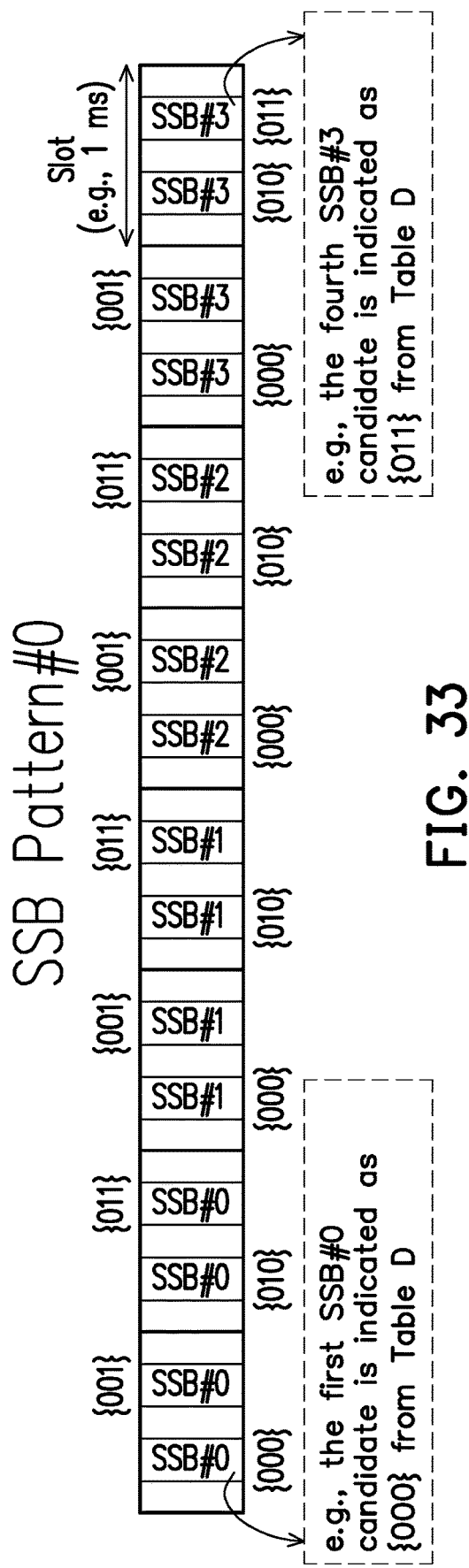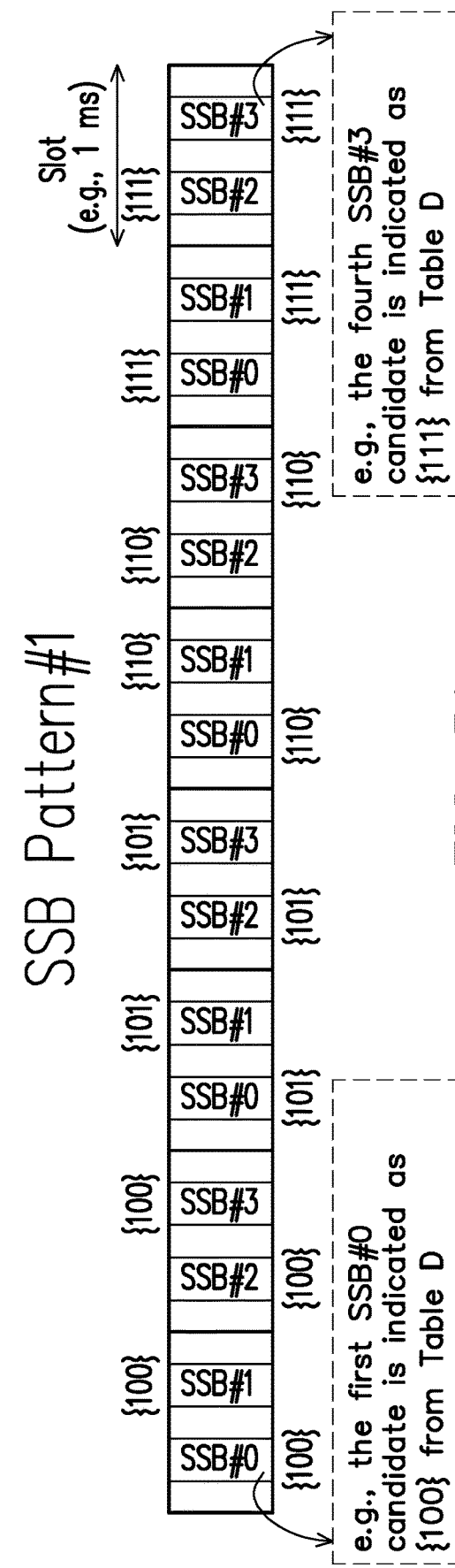

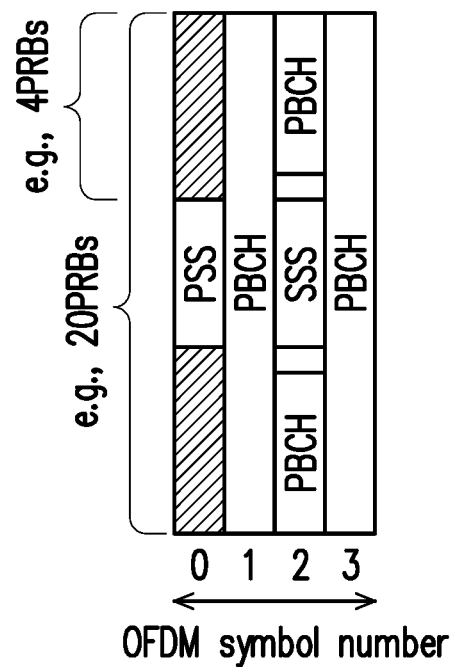
Resource for mapping information (e.g., 4PRBs)
FIG. 41

NETWORK ACCESS METHOD AND UE USING THE SAME

CROSS-REFERENCE TO RELATED APPLICATION

This application claims the priority benefit of U.S. provisional application No. 62/702,923, filed on Jul. 25, 2018. The entirety of the above-mentioned patent application is hereby incorporated by reference herein and made a part of this specification.

TECHNICAL FIELD

The disclosure is directed to a network access method and a UE using the same method.

BACKGROUND

Before a user equipment (UE) is able to access a 5G core network (5GC), the UE would typically search for a next Generation Node B (gNodeB or gNB). As a gNB periodically broadcasts system information, UEs located within signal coverage of the gNB may receive the broadcasted system information. The gNB may broadcast system information in a Synchronization Signal/physical broadcast channel Block (SS/PBCH block, SSB). After receiving the SSB broadcasted by the gNB, the UE may connect to the 5GC through the gNB and start transmitting and receiving data. The SSB broadcasted by the gNB may include synchronization signals (SS) and a physical broadcast channel (PBCH). Moreover, the synchronization signals may include primary synchronization signals (PSS) and secondary synchronization signals (SSS).

In the case when the 5G communication system uses unlicensed spectrum, there is a higher probability that the UE may fail to receive the SSB. Since the spectrum in use is unlicensed, any device of another communication system may also use the unlicensed spectrum. Simultaneous data transmission by another communication system in the unlicensed spectrum would interfere with the SSB to cause the UE to fail to receive the SSB. In order to solve this problem, the gNB typically performs a clear channel assessment (CCA) check or a listen before talk (LBT) procedure before using a channel.

FIG. 1 illustrates an example of several SSBs transmitted by the gNB in a transmission period. In FIG. 1, the transmission period has a time length of 5 milliseconds (ms). The transmission period is divided into five slots of 1 ms. The gNB transmits four SSBs: SSB #0, SSB #1, SSB #2, and SSB #3. The gNB is configured to transmit two SSBs during each of the first two slots of the transmission period. However, the gNB performs the LBT procedure before transmitting any SSB to determine if the channel is available for data transmission. In FIG. 1, the gNB performs LBT before determining to transmit SSB #0, SSB #1, SSB #2, and SSB #3. In the case of SSB #0, SSB #2, and SSB #3, since the gNB does not detect any signal in the channel, the gNB transmits SSB #0, SSB #2, and SSB #3. However, since the gNB detects a signal in the channel before determining to transmit SSB #1, there is an LBT failure. Due to the LBT failure, the gNB determines that SSB #1 should not be transmitted and blocks transmission of SSB #1.

FIG. 2 is an example of a 5G communication system which uses several SSBs. The 5G communication system of FIG. 2 includes a gNB which provides 5GC access. The 5G communication system of FIG. 2 uses beamforming techniques to provide higher data rates. In the case where the gNB may not support simultaneous transmission/reception on different beams, the gNB applies beam sweeping techniques. In the case where the gNB supports simultaneous transmission/reception on different beams, the gNB may not apply beam sweeping. The gNB divides its coverage area into several sectors. In the case of FIG. 2, there are three sectors. The gNB may transmit a SSB to the UEs in a sector through a transmission beam, and this beam is unlikely to cause interference in other sectors. In this example, the gNB transmits SSB #0 in the first beam, transmits SSB #1 in the second beam, and transmits SSB #2 in the third beam. If a UE is in the coverage area of the gNB, then the UE would receive a SSB corresponding to one of the beams, and the UE accesses the 5GC.

However, if the 5G communication system of FIG. 2 uses unlicensed spectrum, then the gNB would perform LBT to determine if the channel is available for data transmission. In this example, the gNB performs a first LBT in the first beam, and the first LBT outputs a first LBT result. According to the first LBT result, the gNB may determine if the channel is occupied for the first beam. If the channel is not occupied, then the gNB occupies the channel in the first beam. Similarly, the gNB performs a second LBT in the second beam. The second LBT outputs a second LBT result. According to the second LBT result, the gNB may determine if the channel is occupied for the second beam. If the channel is not occupied, then the gNB occupies the channel in the second beam. Finally, the gNB performs a third LBT in the third beam, and the third LBT outputs a third LBT result. According to the third LBT result, the gNB determines if the channel is occupied for the third beam. If the channel is not occupied, the gNB occupies the channel in the third beam.

FIGS. 3A and 3B illustrate both simultaneous transmission of multiple beams and non-simultaneous transmission of multiple beams. As previously described, the gNB performs an LBT procedure for each beam. Since there is no interference between the beams, LBT procedures of the beams can be either simultaneous or non-simultaneous. FIG. 3A illustrates the case where the gNB supports simultaneous transmission of multiple beams. In FIG. 3A, the gNB simultaneously performs a first LBT in the first beam and a second LBT in the second beam. The gNB determines to occupy the channel with the first beam according to the first LBT result. Similarly, the gNB determines to occupy the channel with the second beam according to the second LBT result. FIG. 3B illustrates the case where the gNB supports non-simultaneous transmission of multiple beams. In FIG. 3B, the gNB performs a first LBT in the first beam and a second LBT in the second beam. However, the first LBT and the second LBT are non-simultaneous. After the first LBT, if the first LBT result indicates that the channel is available, the gNB occupies the channel in the first beam for a predetermined time. After the end of the predetermined time, the gNB performs the second LBT. If the second LBT result indicates that the channel is available, the gNB occupies the channel in the second beam for another predetermined time.

By performing LBT procedures, the gNB avoids transmission when there are signals from other communication systems. However, since LBT failures also block SSB transmission, LBT failures do not allow the UE to access the 5GC. In order to overcome the uncertainty of LBT results, increased opportunities for SSB transmission may be motivated for the UE to access the 5GC in unlicensed spectrum.

SUMMARY OF THE DISCLOSURE

Accordingly, to address the above described difficulty, the disclosure provides a method of receiving system information for a UE compatible with a 5G communication system and a UE using the same method.

In an exemplary embodiment in accordance with the disclosure, the disclosure is directed to a network access method for a UE, and the method would include not limited to: receiving a Synchronization Signal/physical broadcast channel Block (SSB) which comprises at least one of a physical broadcast channel (PBCH), a primary synchronization signal (PSS), a secondary synchronization signal (SSS), mapping information or any combination of two or more of selected from the PBCH, the PSS, the SSS and the mapping information; and determining from the SSB at least one of a SSB candidate number, a SSB index, a SSB pattern or any combination of two or more of selected from the SSB candidate number, the SSB index and the SSB pattern.

In another exemplary embodiment in accordance with the disclosure, the disclosure is directed to a UE, and the UE would include not limited to: a wireless receiver and a processor coupled to the wireless receiver and configured to: receive, via the wireless receiver, a Synchronization Signal/physical broadcast channel Block (SSB) which comprises at least one of a physical broadcast channel (PBCH), a primary synchronization signal (PSS), a secondary synchronization signal (SSS), mapping information or any combination of two or more of selected from the PBCH, the PSS, the SSS and the mapping information; and determine from the SSB at least one of a SSB candidate number, a SSB index, a SSB pattern or any combination of two or more of selected from the SSB candidate number, the SSB index and the SSB pattern.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which could be achieved by one skilled in the art according to the disclosed exemplary embodiments.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIGS. 9A, 9B and 9C illustrate SSB transmission periods according to one of the exemplary embodiments of the disclosure.

FIG. 33 illustrates an example of one identification sequence of mapping information for Example 2 of mapping information according to one of the exemplary embodiments of the disclosure.

FIG. 34 illustrates another example of one identification sequence of mapping information for Example 2 of mapping information according to one of the exemplary embodiments of the disclosure.

FIG. 41 illustrates a SSB with mapping information according to one of the exemplary embodiments of the disclosure.

DETAILED DESCRIPTION OF DISCLOSED EMBODIMENTS

Figure 1:
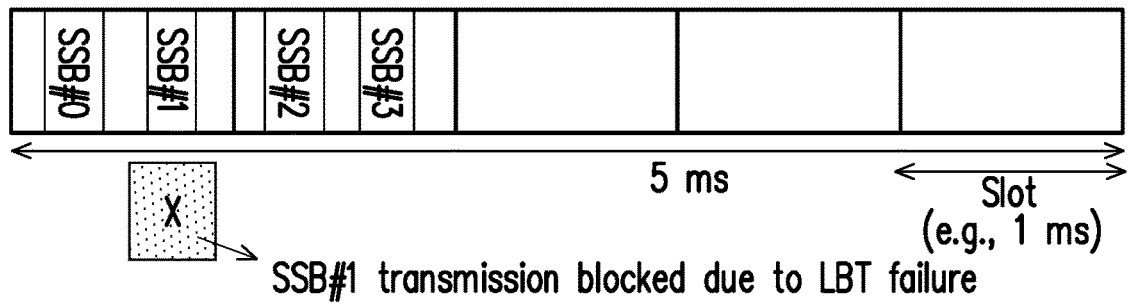
FIG. 1 illustrates an example of several SSBs transmitted by the gNB in a transmission period.
Figure 2:
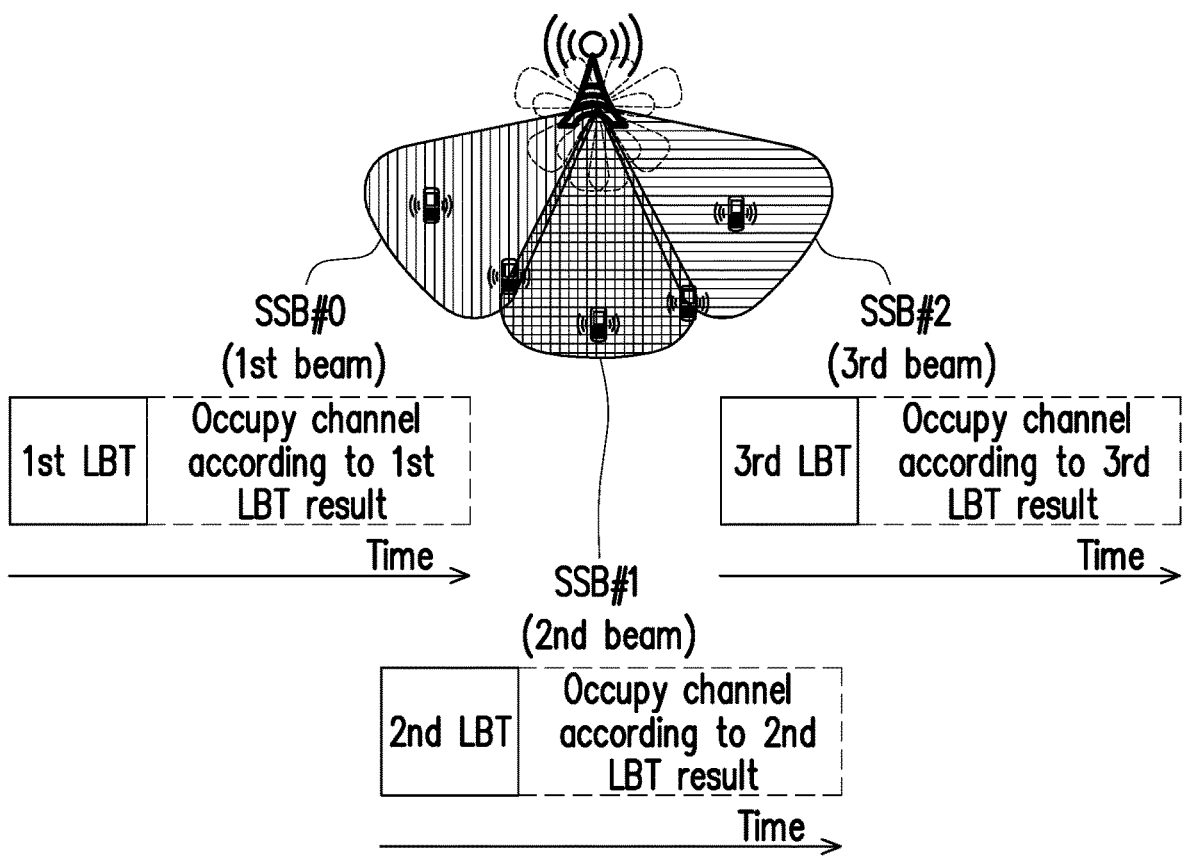
FIG. 2 illustrates a 5G communication system which uses several SSBs.
Figure 3A:
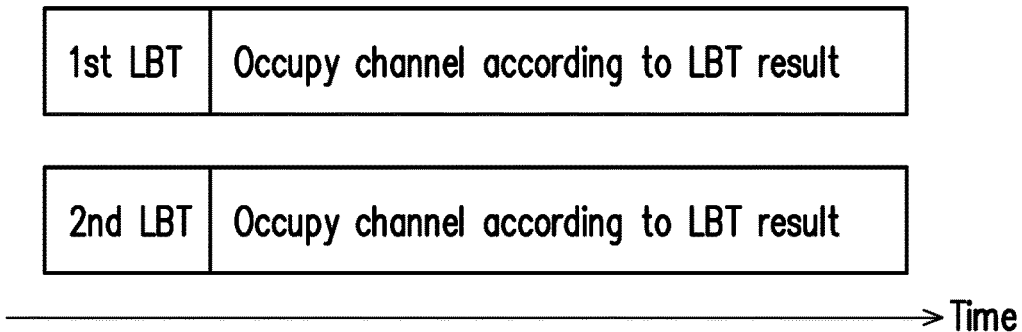
FIGS. 3A and 3B illustrate both simultaneous transmission of multiple beams and non-simultaneous transmission of multiple beams in a 5G communication system.
Figure 3B:
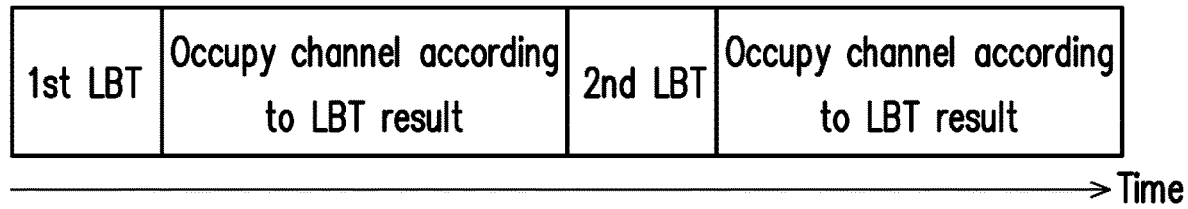

Reference will now be made in detail to the present exemplary embodiments of the disclosure, examples of which are illustrated in the accompanying drawings. Wherever possible, the same reference numbers are used in the drawings and the description to refer to the same or like parts.

Figure 4:
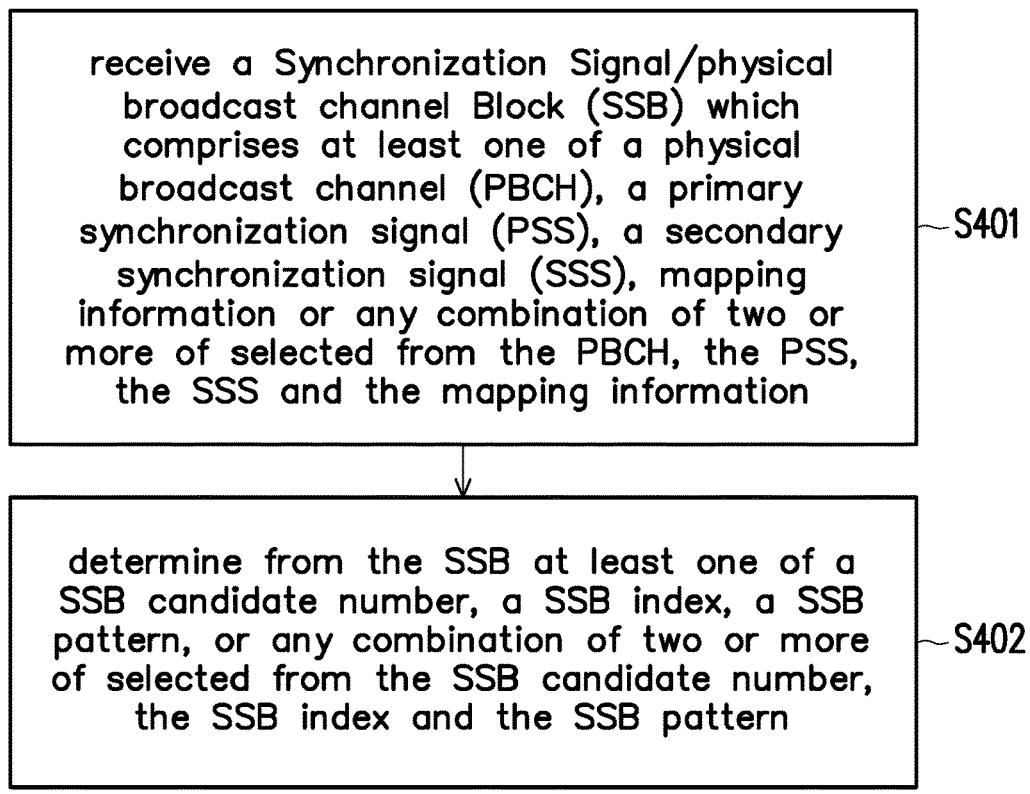
FIG. 4 is a flow chart which illustrates a network access method for a UE according to one of the exemplary embodiments of the disclosure.

Accordingly, to address the above described difficulty, the disclosure provides a method to access the 5G core network (5GC) for a UE compatible with a 5G communication system and a UE using the same method. FIG. 4 is a flow chart which illustrates a network access method for a UE according to one of the exemplary embodiments of the disclosure. Referring to FIG. 4, in step S401, the UE is assumed to have received from a gNB a Synchronization Signal/physical broadcast channel Block (SS/PBCH block, SSB) comprising at least one of a physical broadcast channel (PBCH), a primary synchronization signal (PSS), a secondary synchronization signal (SSS), mapping information or any combination of two or more of selected from the PBCH, the PSS, the SSS and the mapping information. In step S402, the UE determines from the SSB at least one of a SSB index, a SSB candidate number, a SSB pattern or any combination of two or more of selected from the SSB candidate number, the SSB index and the SSB pattern.

Since the gNB may perform SSB transmission in unlicensed frequency bands, the gNB may previously check if the channel is available or is already occupied by another communication system. Thus, the gNB typically performs a clear channel assessment (CCA) check or a listen before talk (LBT) procedure before using the channel. If the LBT result shows that the channel is occupied, the gNB may not transmit the SSB. Thus, the gNB increases the opportunities for SSB transmission in order for the UE to access the 5GC.

The gNB distributes SSB transmission opportunities in a SSB transmission period to a plurality of SSB indexes. The SSB indexes may be used, for example, by a gNB which uses beamforming. The gNB may assign a SSB index to each of the beams used by the gNB. Then, in this example, the gNB may distribute the SSB transmission opportunities among the beams. First, the gNB may distribute the SSB transmission opportunities to the SSB indexes. Then, the gNB may assign a SSB candidate number to the SSB transmission opportunities. The gNB may assign SSB candidate numbers by: selecting SSB transmission opportunities of the same SSB index; and assigning a SSB candidate number to each SSB transmission opportunity of the selected SSB transmission opportunities of the same SSB index. A SSB transmission opportunity of a SSB index could have the same SSB candidate number as a SSB transmission opportunity of another SSB index. Several distributions of the SSB transmission opportunities according to the SSB indexes and SSB candidate numbers produce different SSB patterns. The gNB transmits SSBs using one of the possible SSB patterns. The UE determines at least one of the SSB index, the SSB candidate number, the SSB pattern or any combination of two or more of selected from the SSB index, the SSB candidate number and the SSB pattern upon receiving a SSB.

Figure 5:
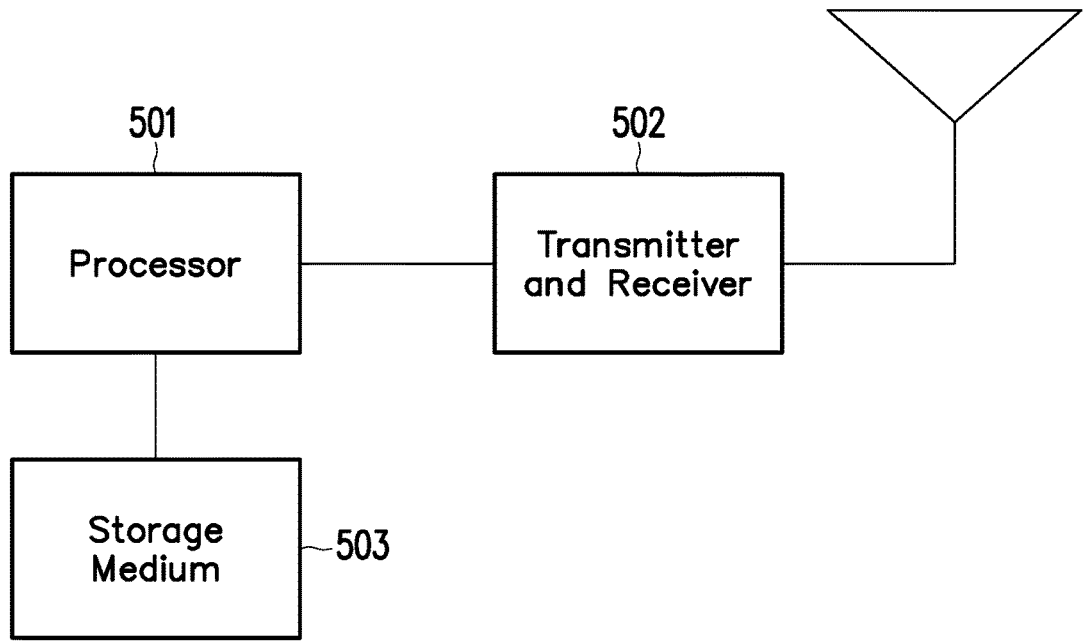
FIG. 5 illustrates an exemplary UE according to one of the exemplary embodiments of the disclosure.

FIG. 5 illustrates an exemplary UE according to one of the exemplary embodiments of the disclosure. The hardware of the UE would include not limited to a hardware processor 501, a hardware transceiver 502 which may include integrated or separate transmitter and receiver, and non-transitory storage medium 503. The hardware processor 501 is electrically connected to the hardware transceiver 502 and the non-transitory storage medium 503 and configured at least for implementing the method of receiving system information to access the 5GC for a UE which is compatible with a 5G communication system as well as its exemplary embodiments and alternative variations.

The hardware transceiver 502 may include one or more transmitters and receivers configured to transmit and receive signals respectively in the radio frequency or in the mmWave frequency. The hardware transceiver 502 may also perform operations such as low noise amplifying, impedance matching, frequency mixing, up or down frequency conversion, filtering, amplifying, and so forth. The hardware transceiver 502 may include one or more analog-to-digital (A/D) and digital-to-analog (D/A) converters which are configured to convert from an analog signal format to a digital signal format during downlink signal processing and from a digital signal format to an analog signal format during uplink signal processing. The hardware transceiver 502 may further include an antenna array which may include one or multiple antennas to transmit and receive omni-directional antenna beams or directional antenna beams.

The hardware processor 501 is configured to process digital signals and to perform procedures of the proposed system information reception method in accordance with the proposed exemplary embodiments of the disclosure. Also, the hardware processor 501 may access to the non-transitory storage medium 503 which stores programming codes, codebook configurations, buffered data, and record configurations assigned by the hardware processor 501. The hardware processor 501 could be implemented by using programmable units such as a micro-processor, a micro-controller, a DSP chips, FPGA, etc. The functions of the hardware processor 501 may also be implemented with separate electronic devices or ICs. It should be noted that the functions of hardware processor 501 may be implemented with either hardware or software.

Figure 6A:
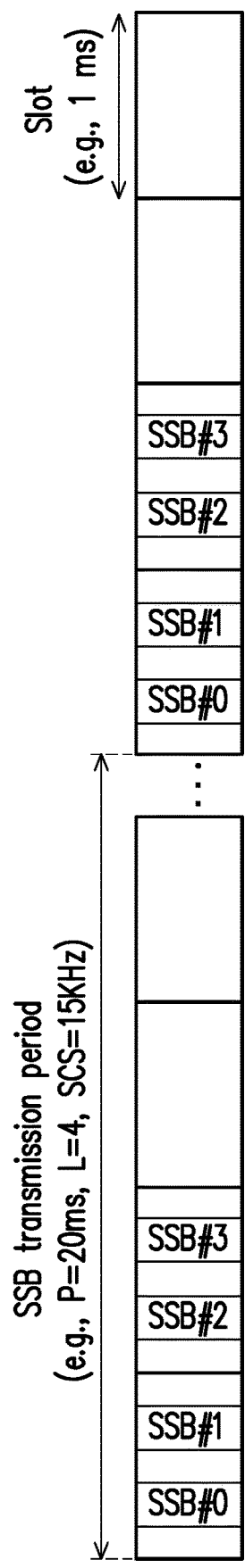
FIGS. 6A and 6B illustrate increasing SSB transmission opportunities according to one of the exemplary embodiments of the disclosure.
Figure 6B:
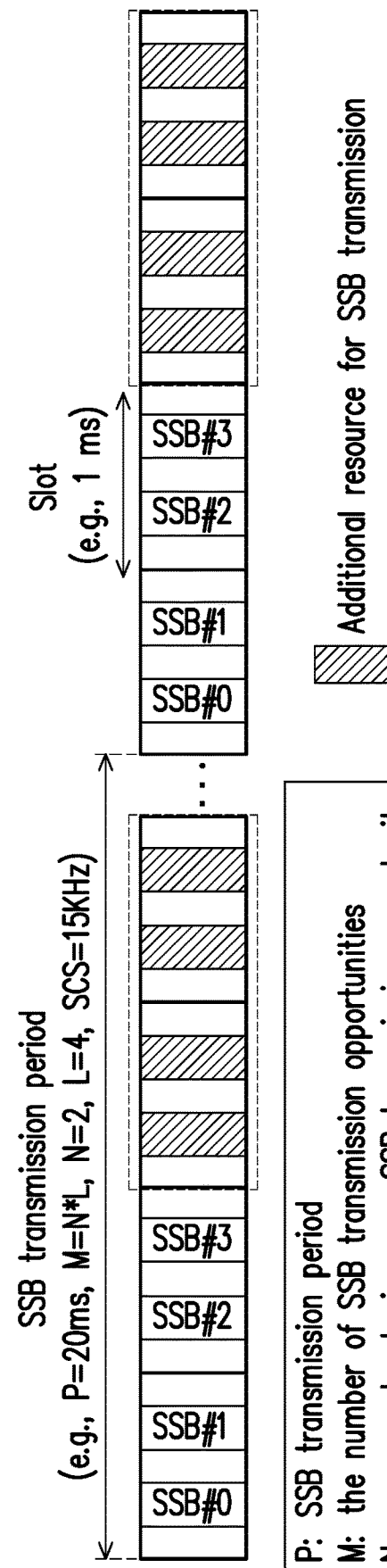

FIGS. 6A and 6B illustrate how a gNB in a 5G communication system increases SSB transmission opportunities according to one of the exemplary embodiments of the disclosure. FIGS. 6A and 6B show SSB transmission period P. SSB transmission period (for example, SSB-periodicity-ServingCell) may be a time period comprising a plurality of SSB candidate positions. Each SSB transmission period may be divided into slots. For example, the SSB transmission period P of FIGS. 6A and 6B may be 20 ms, and each slot may have a time length of 1 ms. In each SSB transmission period, the number of SSB transmission opportunities is M. The gNB may transmit SSBs with L different indexes. For example, the gNB may transmit SSB with L different beams, wherein the SSB transmitted with different beams means the SSBs may have different spatial relations. Hereinafter, L may be referred to as the number of different spatial relations. The transmitted SSBs occupy a frequency band which may be divided into a plurality of subcarriers, the subcarriers being separated one from another by a subcarrier spacing (SCS).

Referring to FIG. 6A, the gNB may transmit SSBs during two slots of the SSB transmission period. The gNB may transmit SSBs with SSB index SSB #0, SSB #1, SSB #2 and SSB #3. In FIG. 6A, L is 4, M is 4, and SCS is 15 kilohertz. Thus, in FIG. 6A, the total amount of SSB transmission opportunities may equal the number of different spatial relations L. There is one SSB transmission opportunity for each spatial relation.

Referring to FIG. 6B, the gNB may provide additional resources for SSB transmission. The total number of SSB transmission opportunities may equal the number of different spatial relations L multiplied by a factor N. In the example of FIG. 6B, L=4, N=2, and M=N*L=2×4=8 SSB transmission opportunities. Thus, by using a factor N of 2, the number of SSB transmission opportunities is doubled. The parameters of FIGS. 6A and 6B may also be modified in this exemplary embodiment of the disclosure. The gNB may transmit SSBs in more than 2 slots of the SSB transmission period. The gNB may transmit 1, 2 or more SSBs in one slot of the transmission period. Additionally, the gNB may also set other values for parameters L, N and M to transmit SSBs.

The gNB may transmit SSB in the first slot of a SSB transmission period. The first slot may comprise two SSB transmission opportunities. The spatial relation of the two SSB transmission opportunities of the first slot may be the same or may not be the same. Spatial relation may be the same or may not be the same depending on the SSB pattern.

In FIGS. 6A and 6B, the gNB increases the number of SSB transmission opportunities. The gNB may distribute the SSB transmission opportunities among the L spatial relations. The way in which the gNB distributes the SSB transmission opportunities depends on the characteristics and technologies used in the 5G communication system, among many relevant reasons. Thus, the gNB may distribute the SSB transmission opportunities among the L spatial relations in many different ways.

Figure 7:
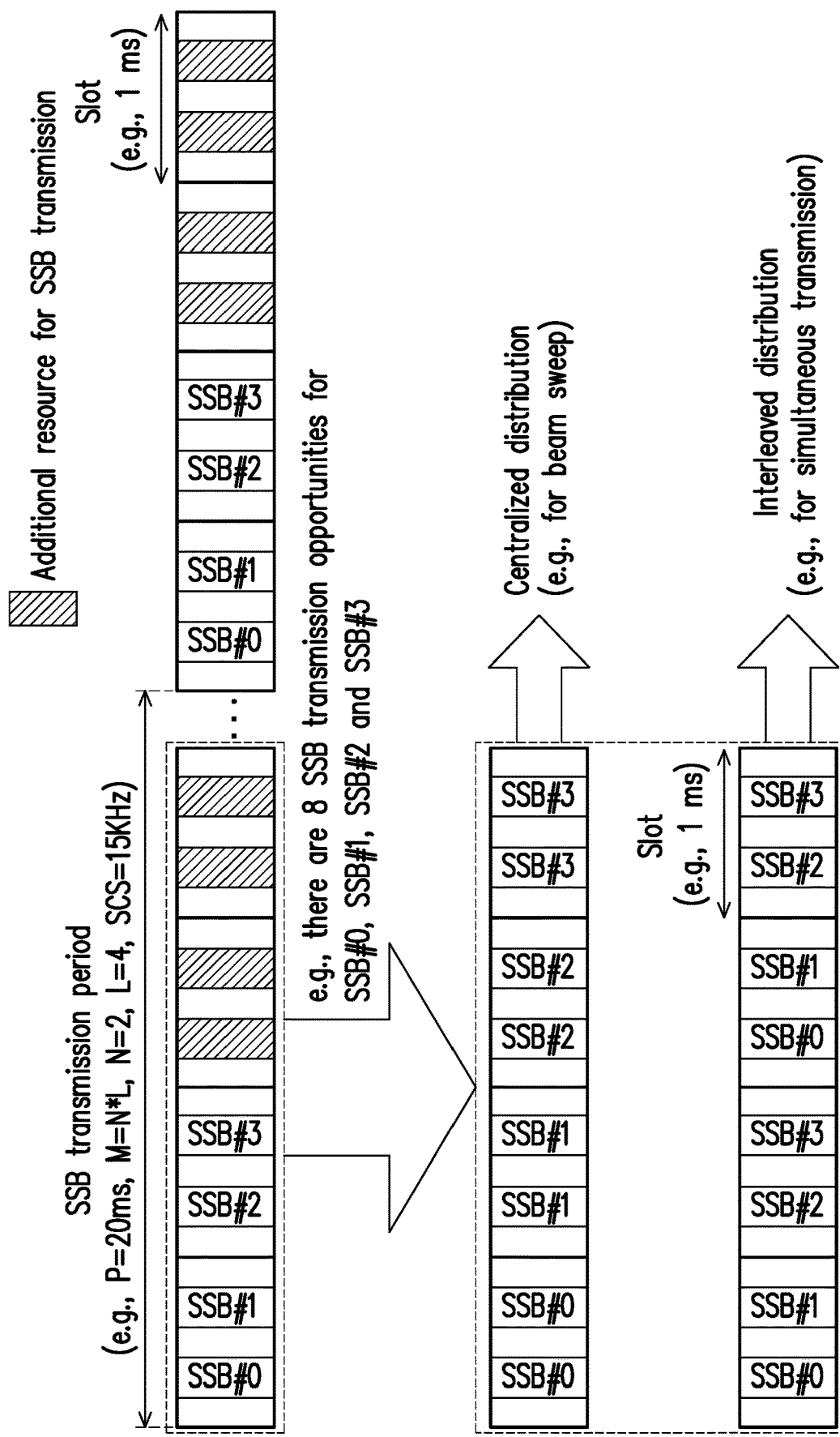
FIG. 7 illustrates different ways to distribute the SSB transmission opportunities among the different SSB indexes according to one of the exemplary embodiments of the disclosure.

FIG. 7 illustrates different ways in which a gNB distributes the SSB transmission opportunities among the different spatial relations according to one of the exemplary embodiments of the disclosure. In each SSB transmission period, the number of SSB transmission opportunities is M, wherein M is an even number. The gNB may distribute the SSB transmission opportunities to L spatial relations. The total number of SSB transmission opportunities equals the number of spatial relations multiplied by a factor N. In FIG. 7, L=4, N=2, and M=N×L=2×4=8 SSB transmission opportunities. The gNB may provide SSB transmission opportunities in four slots.

FIG. 7 also illustrates a centralized distribution of the SSB transmission opportunities according to one of the exemplary embodiments of the disclosure. The gNB may distribute the SSB transmission opportunities into groups of N SSB candidates. Referring to the example of centralized distribution in FIG. 7, N equals 2. In the example of FIG. 7, since L=4, there are four spatial relations and four SSB indexes SSB #0, SSB #1, SSB #2 and SSB #3. First, the gNB may distribute the first N SSB candidates to index SSB #0. Then, the gNB may distribute the following N SSB candidates to index SSB #1. Next, the gNB may distribute the following N SSB candidates to index SSB #2. Lastly, the gNB may distribute the final N SSB candidates to index SSB #3. The groups of SSB index may be separated with a time gap. In other words, the groups of N SSB candidates with the same SSB index may be discontinuous slots.

Centralized distribution of the SSB transmission opportunities may be implemented, for example, in 5G communication systems which use beamforming and perform beam sweeping. In the example of FIG. 7, the first slot of the SSB transmission period may be assigned to a first beam of the gNB, and the gNB may transmit SSB #0 in the first beam. Since the gNB performs beam sweeping, during the first slot the gNB may transmit a signal in the first beam only and does not transmit any signal in the other beams. Following the first slot, the second slot may be assigned to a second beam of the gNB, and the gNB may transmit SSB #1 in the second beam. The gNB does not transmit any signal in the other beams during the second slot. Similarly, the third slot may be assigned to a third beam, and the fourth slot may be assigned to a fourth beam.

FIG. 7 also illustrates an interleaved distribution of the SSB transmission opportunities according to one of the exemplary embodiments of the disclosure. The gNB may distribute N SSB candidates to each SSB index. Since the SSB indexes represent spatial relations, the gNB may distribute N candidates to each spatial relation. Referring to the example of interleaved distribution in FIG. 7, N equals 2. In interleaved distribution, as opposed to centralized distribution, the gNB may distribute a SSB candidate to a SSB index and may distribute the following SSB candidate to another SSB index. The gNB may distribute the SSB candidates to the SSB indexes which have not been assigned any SSB candidate. First, the gNB may distribute the first SSB candidate to index SSB #0. Then, the gNB may distribute the following SSB candidate to index SSB #1. Next, the gNB may distribute the following SSB candidate to index SSB #2. Then, the gNB may distribute the following SSB candidate to index SSB #3. After the gNB has distributed a candidate to all the SSB indexes, distribution of the SSB candidates may continue in a similar way, first continuing with SSB index SSB #0.

Interleaved distribution of the SSB transmission opportunities may be implemented, for example, in 5G communication systems which use beamforming and perform simultaneous transmission in different beams. In the example of interleaved distribution of FIG. 7, the gNB may simultaneously transmit several beams, for example, 4 beams. Even though the first slot and the third slot show SSB #0 and SSB #1 only, the gNB may simultaneously transmit 4 beams. For example, the gNB may perform LBT for the four beams in the first slot of FIG. 7. If the LBT result shows that the channel is available for the 4 beams, the gNB may transmit SSB #0 in the first beam. The gNB may simultaneously transmit signals in the second beam, the third beam and the fourth beam.

The parameters of FIG. 7 may also be modified in this exemplary embodiment of the disclosure. The gNB may also set other values for parameters L, N and M. Accordingly, the gNB may distribute SSB candidates to the same spatial relation in more than 2 slots of the SSB transmission period. The gNB may distribute 1, 2 or more SSB candidates in one slot of the transmission period. Similarly, the application may not be limited to the scenario disclosed in the embodiments of the disclosure. For example, distribution of SSB transmission opportunities may also consider characteristics of the gNBs and the UEs. Capability, flexibility, and deployment of the gNBs in the 5G communication system, and simplified implementation of the UEs may also be considered.

Figure 8A:
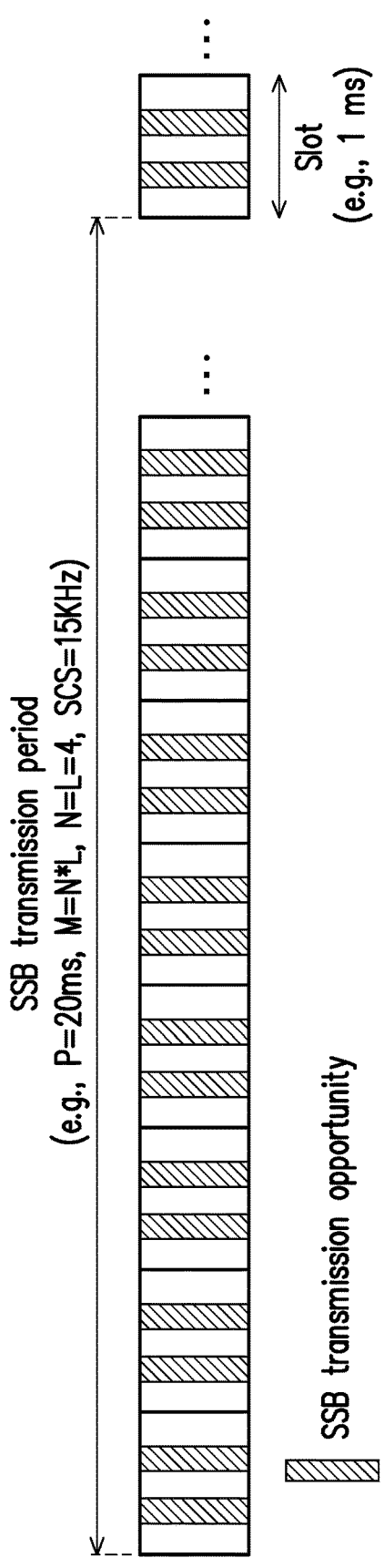
FIGS. 8A, 8B and 8C illustrate SSB transmission periods according to one of the exemplary embodiments of the disclosure.
Figure 8B:
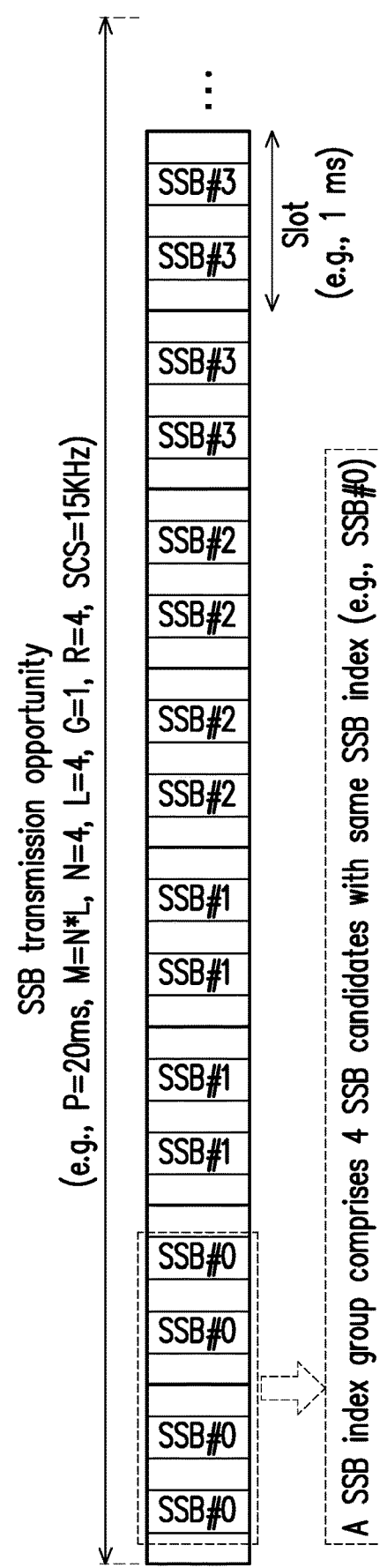
Figure 8C:
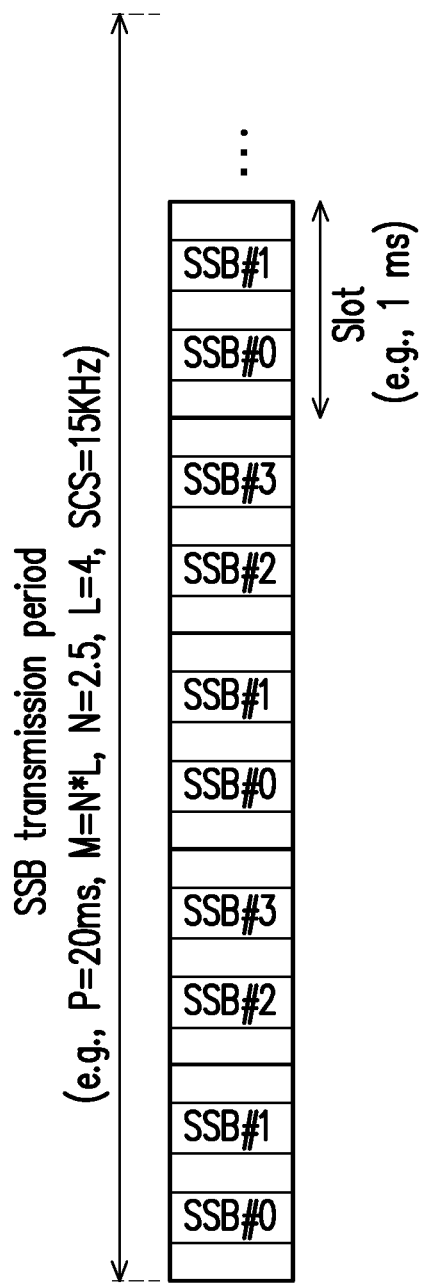

FIGS. 8A, 8B and 8C illustrate SSB transmission periods according to one of the exemplary embodiments of the disclosure. The length of the SSB transmission period is P.

The SSB transmission period may be divided into slots. The SSB transmission opportunities occupy a frequency band, and may be transmitted in a plurality of subcarriers. In the example of FIGS. 8A, 8B and 8C, P equals 20 ms, each slot has a time length of 1 ms, and SCS is 15 kilohertz. In a SSB transmission period, there are M SSB transmission opportunities for L spatial relations. SSBs may be indexed in an ascending order in time from 0 to L−1. In other words, SSB indexes may be SSB #0, SSB #1, . . . , SSB #(L−1). M may be expressed as M=N*L where N is a factor to increase SSB transmission opportunity, N>1. In the example of FIGS. 8A and 8B, N=4, L=4, and there are M=16 SSB transmission opportunities to transmit SSB #0, SSB #1, SSB #2 and SSB #3.

N could be further defined as N=G*R, where G is the number of groups for each spatial relation and R is the number of SSB candidates in a SSB index group. R and G may be an integer and larger than 0. In a SSB index group, all the SSB candidates have the same spatial relation, represented by the SSB index. For example, in FIG. 8B, for each spatial relation, there is one group in the SSB transmission period. In other words, G=1. The example of FIG. 8B also shows that, in a SSB index group, there are 4 SSB candidates. In other words, R=4. The number of SSB patterns may be determined by the combination of R and G which satisfies the equation N=G*R, where G and R may be an integer and larger than 0. For example, for N=4, the combination of G*R could be 4*1, 2*2 or 1*4.

FIG. 8C shows an example where the multiplying factor N is a non-integer. In FIG. 8C, N=2.5. In FIG. 8C, there are 4 spatial relations. The four spatial relations are represented by SSB indexes SSB #0, SSB #1, SSB #2 and SSB #3. Thus, L=4 and M=N*L=2.5*4=10 SSB transmission opportunities. FIG. 8C shows 3 SSB candidates with SSB index SSB #0, 3 SSB candidates with SSB index SSB #1, 2 SSB candidates with SSB index SSB #2, and 2 SSB candidates with SSB index SSB #3. Thus, the multiplying factor N is the average number of SSB transmission opportunities of a SSB index (or spatial relation). Moreover, the average number of SSB transmission opportunities of the same spatial relation in a SSB transmission period is determined at least by one of a total number of SSB transmission opportunities in the SSB transmission period, a number of spatial relations for SSB and a number of SSB indexes.

Additionally, in FIG. 8C, the number of SSB transmission opportunities is not the same for all SSB indexes. The maximum number of SSB transmission opportunities of the same spatial relation in a SSB transmission period is determined at least by one of a total number of SSB transmission opportunities in the SSB transmission period, a number of spatial relations for SSB or a number of SSB indexes. The minimum of SSB transmission opportunities of the same spatial relation in a SSB transmission period is determined at least by one of a total number of SSB transmission opportunities in the SSB transmission period, a number of spatial relations for SSB or a number of SSB indexes.

Figure 9C:
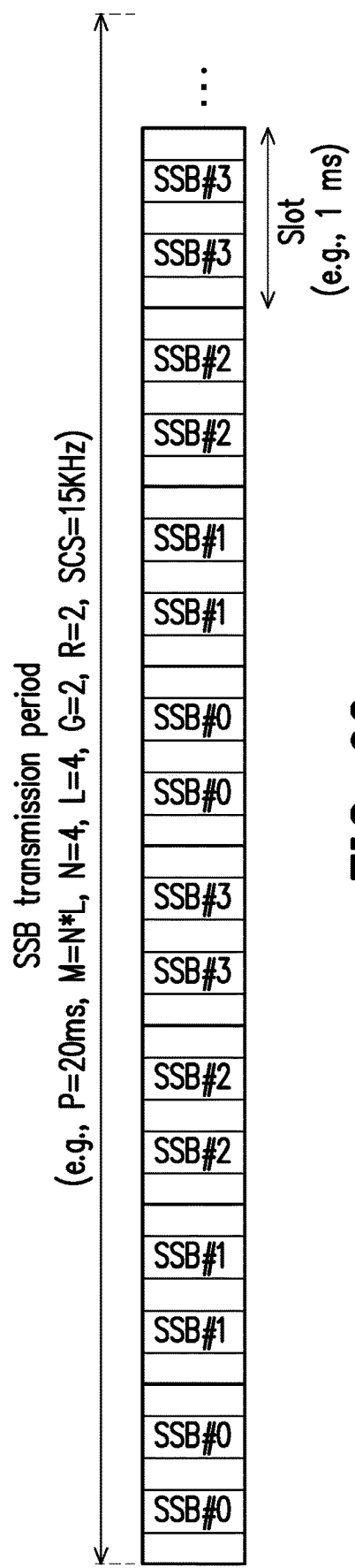

FIGS. 9A, 9B and 9C illustrate SSB transmission periods according to another of the exemplary embodiments of the disclosure. FIGS. 9A, 9B and 9C show SSB patterns corresponding to different values of R and G In the example of FIGS. 9A, 9B and 9C, P equals 20 ms, each slot has a time length of 1 ms, SCS=15 kilohertz, N=4, L=4 and hence M=N*L=16 SSB transmission opportunities.

FIG. 9A illustrates the SSB transmission periods with SSB Pattern #0, corresponding to G=1 and R=4. Thus, FIG. 9A shows that for each spatial relation there is one SSB index group with four SSB candidates.

FIG. 9B illustrates the SSB transmission periods with SSB Pattern #1, corresponding to G=4 and R=1. Thus, FIG. 9B shows that for each spatial relation there are four corresponding SSB index groups with one SSB candidate in each SSB index group.

FIG. 9C illustrates the SSB transmission periods with SSB Pattern #2, corresponding to G=2 and R=2. Thus, FIG. 9C shows that for each SSB there are two corresponding SSB index groups with two SSB candidates in each SSB index group.

In FIGS. 9A, 9B and 9C, the gNB may transmit SSB in the first slot of a SSB transmission period. The first slot may comprise two SSB transmission opportunities. The spatial relation of the two SSB transmission opportunities of the first slot may be the same or may not be the same. Spatial relation may be the same or may not be the same depending on the SSB pattern. In the case of SSB Pattern #0 and SSB Pattern #2 of FIGS. 9A and 9C, the spatial relation of the two SSB transmission opportunities of the first slot may be the same. In the case of SSB Pattern #1 of FIG. 9B, the spatial relation of the two SSB transmission opportunities of the first slot may not be the same.

FIGS. 10-14 illustrate examples of scenario conditions corresponding to different results of CCA checks and LBT procedures. FIGS. 10-14 show SSB Pattern #0. The values of the parameters shown in FIGS. 10-14 are: SSB transmission period P=20 ms, the time length of a slot=1 ms, SCS=15 KHz, N=4, L=4 and hence M=N*L=16 SSB transmission opportunities. G=1 for SSB Pattern #0, hence R=N/G=4. For SSB Pattern #0, at least two of the SSB candidates are located in consecutive SSB candidate positions and have the same SSB index.

Figure 10:
FIG. 10 shows an example of a scenario condition for SSB Pattern #0, where the gNB transmits SSB with index SSB #0 according to one of the exemplary embodiments of the disclosure.

FIG. 10 shows an example of a scenario condition where the gNB transmits SSB with index SSB #0. The gNB may perform a LBT procedure for each SSB #0 candidate. In FIG. 10, the gNB performs LBT for the first SSB #0 candidate position, and the LBT result is that the channel is available. Hereinafter, we will refer to the LBT result showing that the channel is available as "LBT success". Upon LBT success for the first SSB #0 candidate position, the gNB may transmit SSB #0 in the first SSB #0 candidate position. LBT for other SSB #0 transmission may not be necessary within this SSB transmission period.

Figure 11:
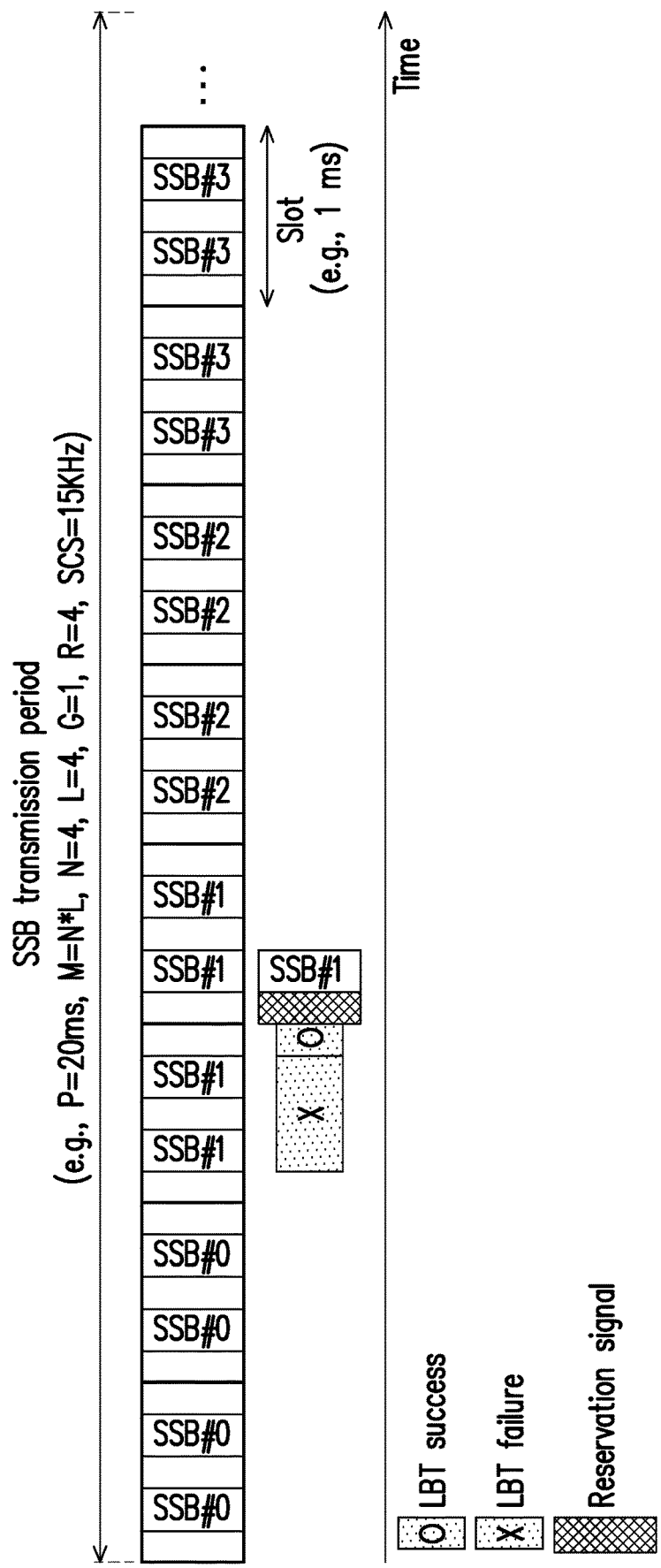
FIG. 11 shows an example of a scenario condition for SSB Pattern #0, where the gNB transmits SSB with index SSB #1 according to one of the exemplary embodiments of the disclosure.

FIG. 11 shows an example of a scenario condition where the gNB transmits SSB with index SSB #1. The gNB may perform LBT for each SSB #1 candidate. In FIG. 11, the gNB performs LBT for the first and the second SSB #1 candidate positions, and in both cases the LBT result is that the channel is not available. Hereinafter, we will refer to the LBT result showing that the channel is not available as "LBT failure". The gNB does not transmit any SSB when the LBT result is LBT failure. Upon LBT failure for the first and the second SSB #1 candidate positions, the gNB may perform LBT again for the third SSB #1 candidate position. Upon LBT success for the third SSB #1 candidate position, the channel occupancy time may contain the third SSB #1 candidate. However, the end of the successful LBT procedure may not coincide in time with the following SSB candidate position. Thus, as shown in FIG. 11, a reservation signal may be transmitted starting from the end of LBT success until the start of the third SSB #1 candidate position. Then the gNB may transmit SSB #1 in the third SSB #1 candidate position. LBT for other SSB #1 transmission may not be necessary within this SSB transmission period.

Figure 12:
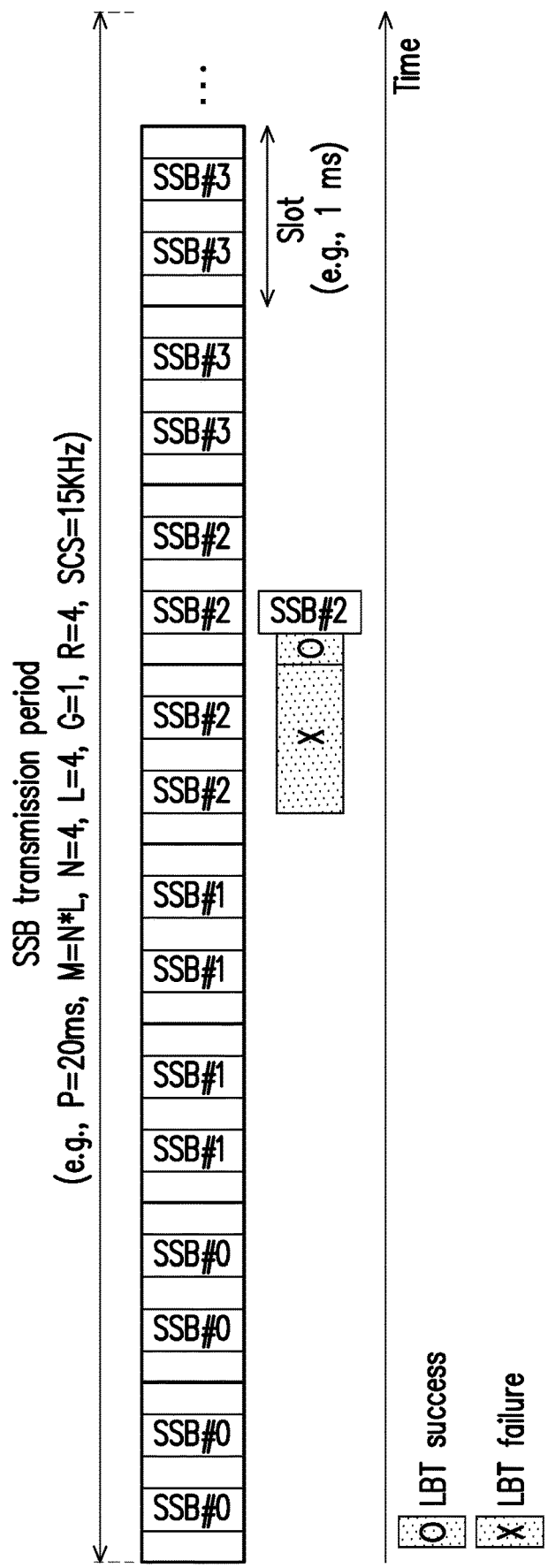
FIG. 12 shows an example of a scenario condition for SSB Pattern #0, where the gNB transmits SSB with index SSB #2 according to one of the exemplary embodiments of the disclosure.

FIG. 12 shows an example of a scenario condition where the gNB transmits SSB #2. The gNB may perform LBT for each SSB #2 candidate. In FIG. 12, the gNB performs LBT for the first and the second SSB #2 candidate positions, and in both cases the LBT result is LBT failure. Upon LBT failure for the first and the second SSB #2 candidate positions, the gNB may perform LBT again for the third SSB #2 candidate position. Upon LBT success for the third SSB #2 candidate position, the gNB may transmit SSB #2 in the third SSB #2 candidate position. LBT for other SSB #2 transmission may not be necessary within this SSB transmission period. Additionally, in FIG. 12, the gNB does not transmit a reservation signal since the end of the successful LBT coincides with the beginning of the third SSB #2 candidate position.

Figure 13:
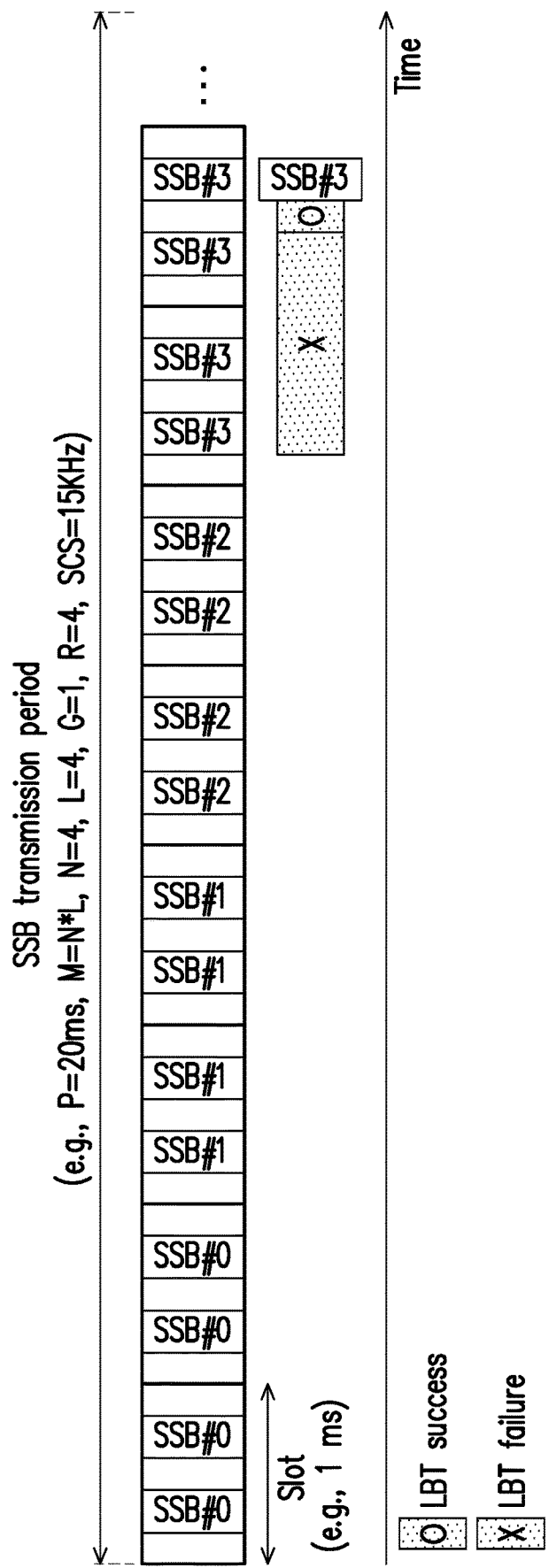
FIG. 13 shows an example of a scenario condition for SSB Pattern #0, where the gNB transmits SSB with index SSB #3 according to one of the exemplary embodiments of the disclosure.

FIG. 13 shows an example of a scenario condition where the gNB performs LBT procedure for transmitting SSB #3. The gNB may perform LBT for each SSB #3 candidate. In FIG. 13, the gNB performs LBT for the first, second, and third SSB #3 candidate positions, and in all three cases the LBT result is LBT failure. Upon LBT failure for the first, second, and third SSB #3 candidate positions, the gNB may perform LBT again for the fourth SSB #3 candidate position. Upon LBT success for the fourth SSB #3 candidate position, the gNB may transmit SSB #3 in the third SSB #3 candidate position. LBT for other SSB #3 transmission may not be necessary within this SSB transmission period. Similar to FIG. 12, in FIG. 13, the gNB does not transmit a reservation signal since the end of the successful LBT coincides with the beginning of the fourth SSB #3 candidate position.

Figure 14:
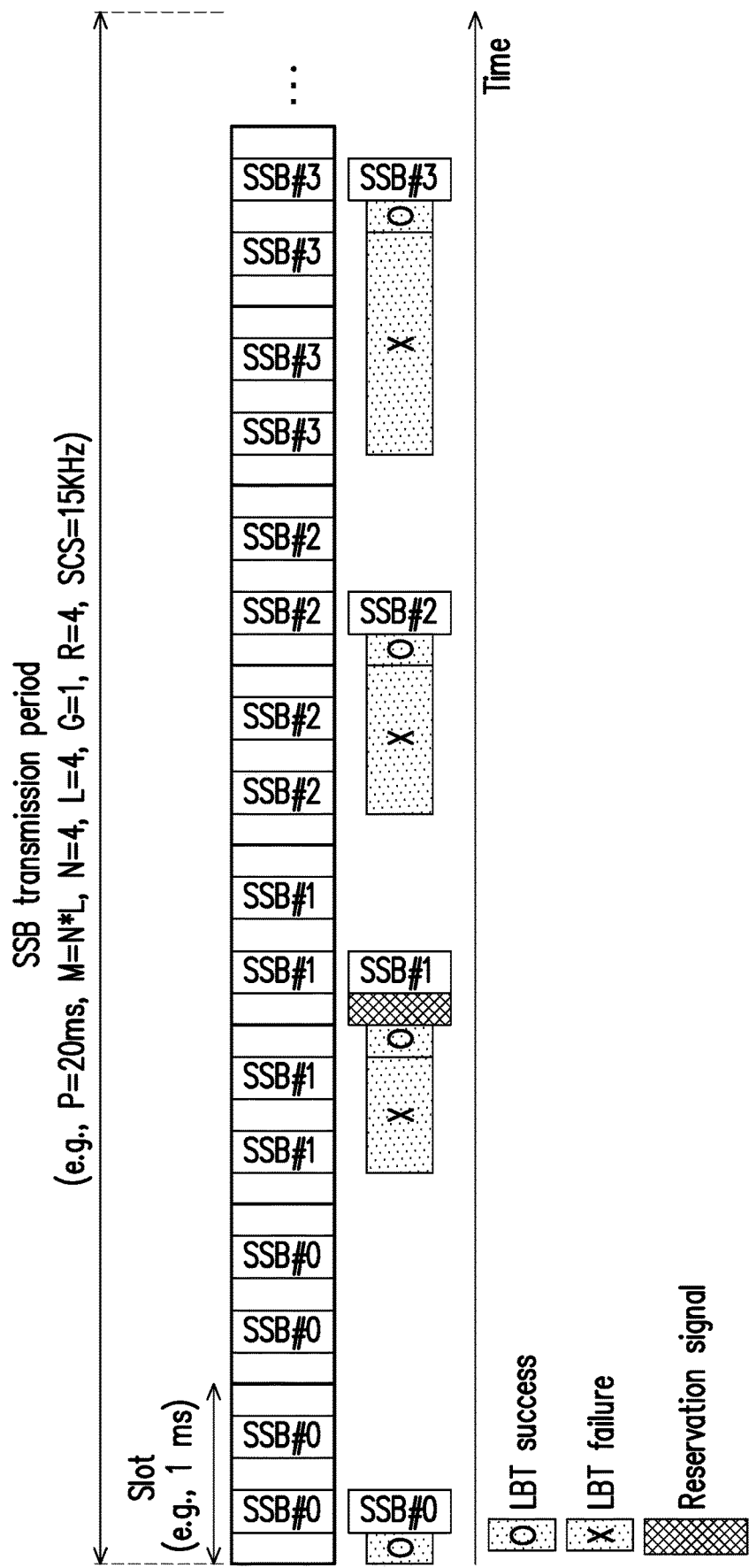
FIG. 14 shows the scenario conditions of FIGS. 10-13 for SSB Pattern #0.

FIG. 14 shows the scenario conditions of FIGS. 10-13 together in one figure. According to the examples of SSB Pattern #0 illustrated in FIGS. 10-14: 1) SSB #0 may be transmitted at least at the 1st SSB transmission opportunity; 2) SSB #1 may be transmitted at least at the 7th SSB transmission opportunity; 3) SSB #2 may be transmitted at least at the 11th SSB transmission opportunity; and 4) SSB #3 may be transmitted at least at the 16th SSB transmission opportunity. However, notice that the gNB may not transmit a SSB of a SSB index in a SSB transmission period if all LBT results for the SSB index are LBT failures.

FIGS. 15-18 illustrate examples of scenario conditions for SSB Pattern #1. The values of the following parameters are the same as those in FIGS. 10-14: SSB transmission period P=20 ms, N=4, L=4 and M=N*L=16 SSB transmission opportunities. However, G=L=4 for SSB Pattern #1, hence R=N/G=1. In the examples of FIGS. 15-18, the time length of a slot=0.5 ms and SCS=30 KHz. For SSB Pattern #1, SSB candidates located in consecutive SSB candidate positions have different SSB index.

Figure 15:
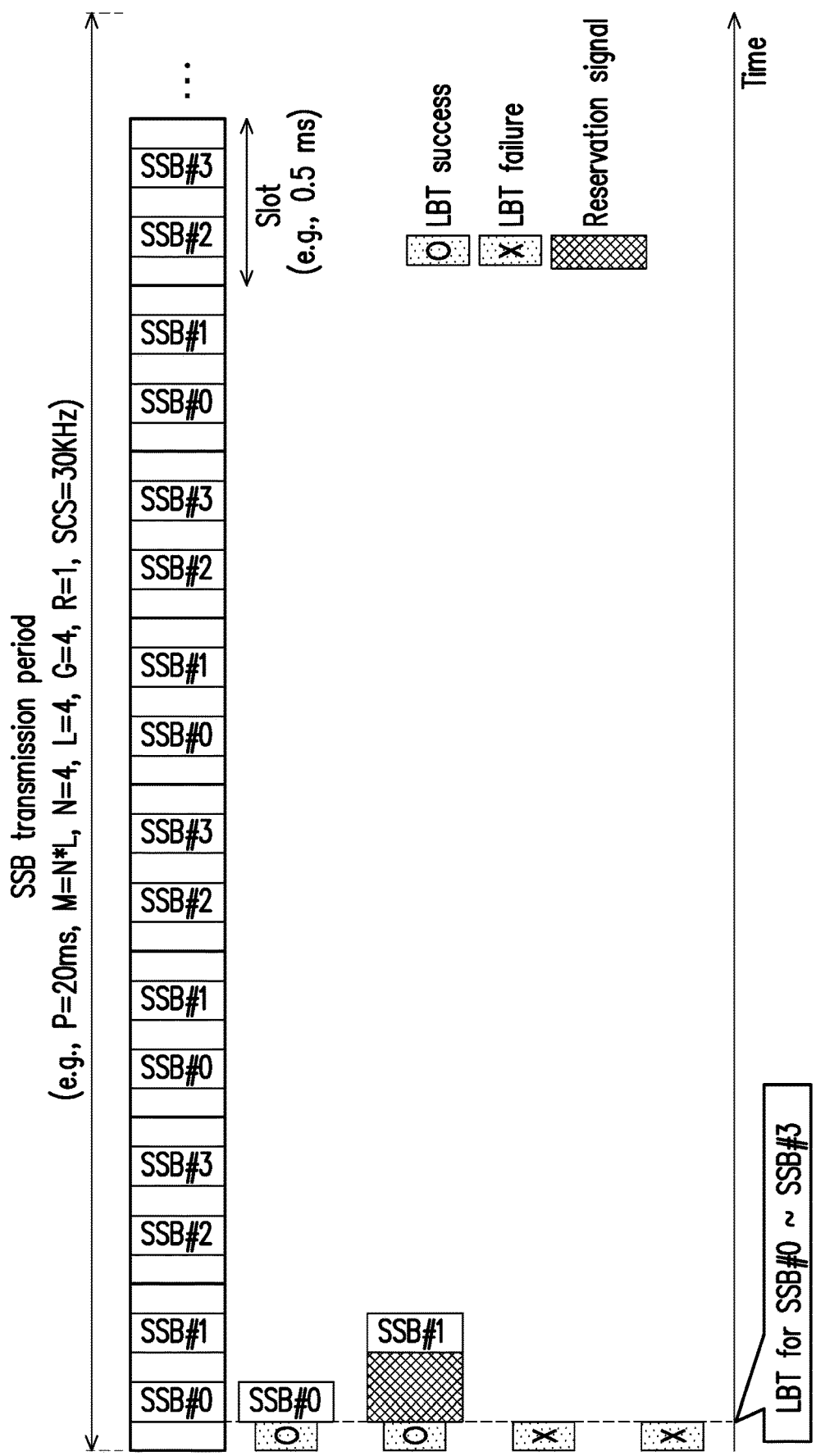
FIG. 15 shows an example of a scenario condition for SSB Pattern #1 where the gNB performs simultaneous LBT procedure for transmitting SSB #0, SSB #1, SSB #2 and SSB #3 according to one of the exemplary embodiments of the disclosure.

FIG. 15 shows an example of a scenario condition where the gNB performs simultaneous LBT procedure for transmitting SSB #0, SSB #1, SSB #2 and SSB #3. In FIG. 15, first there is LBT success for SSB #0 and SSB #1, while there is LBT failure for SSB #2 and SSB #3. The gNB may transmit SSB #0 in the first SSB #0 candidate position. The gNB may transmit a reservation signal corresponding to SSB #1 starting from the first SSB #0 candidate position until the start of the first SSB #1 candidate position. Then the gNB may transmit SSB #1 in the first SSB #1 candidate position. LBT for other SSB #0 and SSB #1 transmission may not be necessary within this SSB transmission period.

Figure 16:
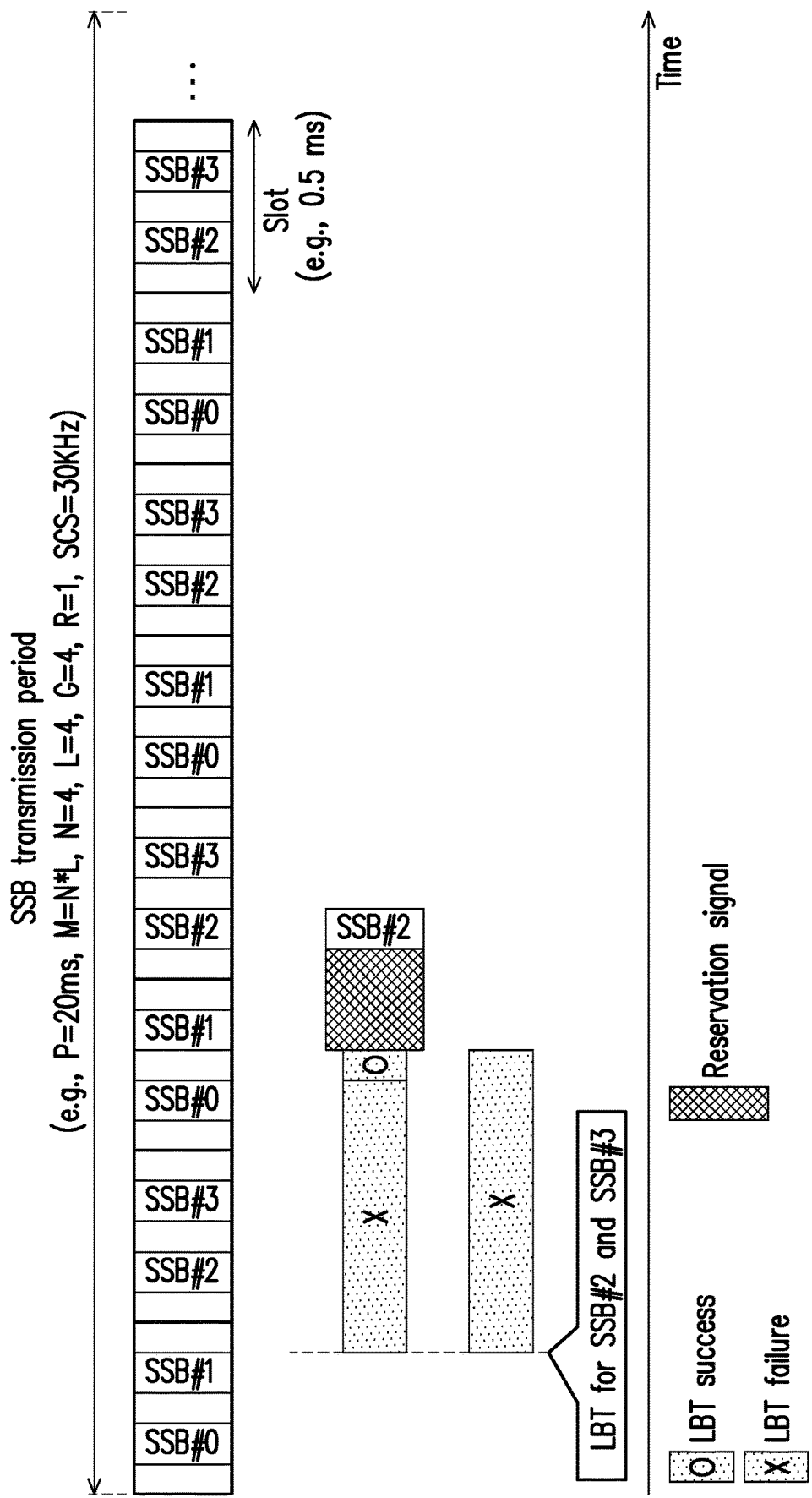
FIG. 16 shows an example of a scenario condition for SSB Pattern #1 where the gNB performs simultaneous LBT procedure for transmitting SSB #2 and SSB #3 according to one of the exemplary embodiments of the disclosure.

FIG. 16 shows a continuation of the example of FIG. 15. In FIG. 16, the gNB performs simultaneous LBT for transmitting SSB #2 and SSB #3. LBT may start from the end of the SSB #1 transmission. LBT result for SSB #2 is LBT success, while LBT result for SSB #3 is LBT failure. The gNB may transmit reservation signals corresponding to SSB #2 starting from the end of the successful LBT until the start of the second SSB #2 candidate shown in FIG. 16. Then the gNB may transmit SSB #2 in the second SSB #2 candidate position if the channel occupancy time contains the second SSB #2 candidate. LBT for other SSB #2 transmission may not be necessary within this SSB transmission period.

Figure 17:
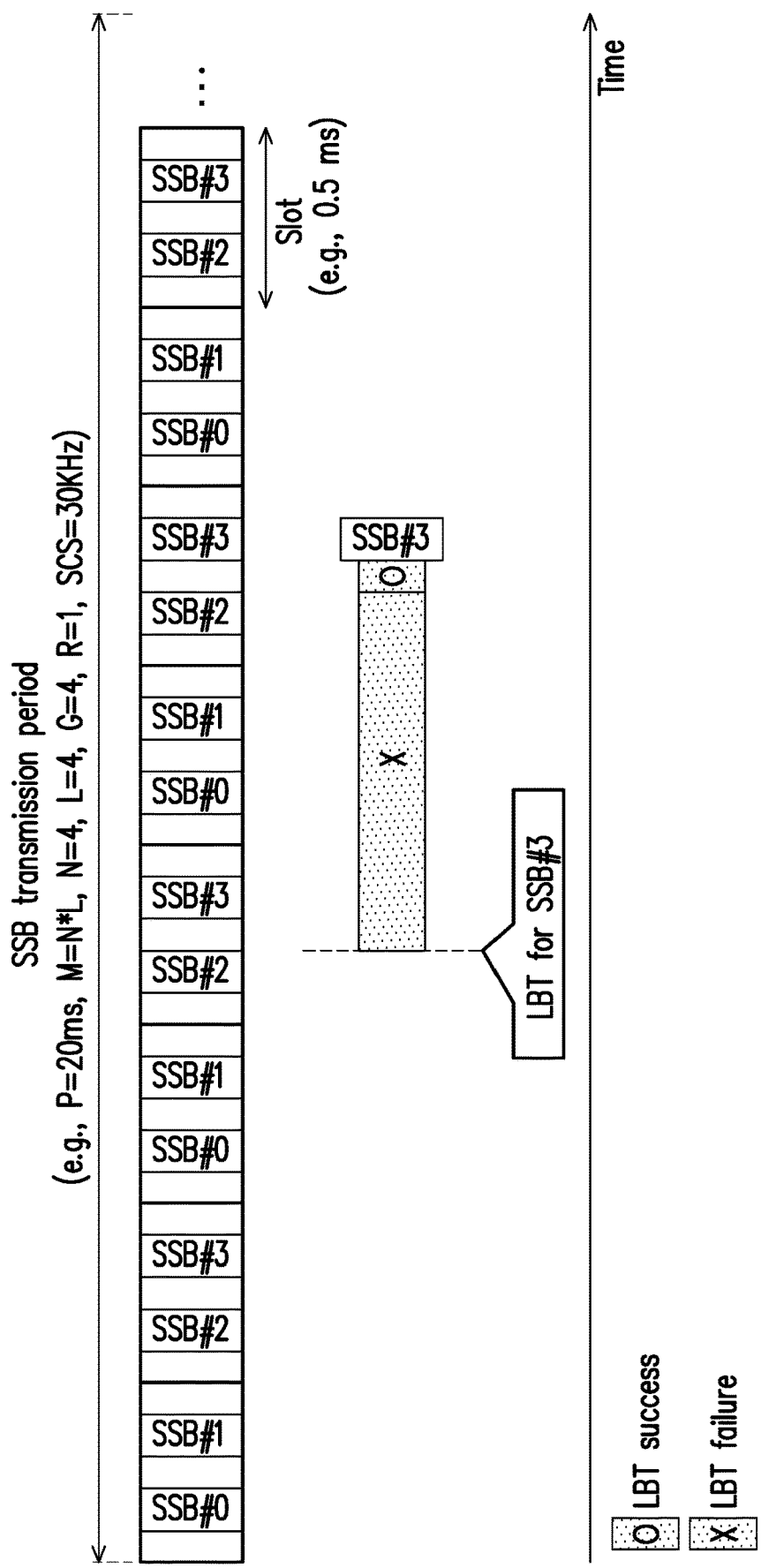
FIG. 17 shows an example of a scenario condition for SSB Pattern #1 where the gNB performs LBT procedure for transmitting SSB #3 according to one of the exemplary embodiments of the disclosure.

FIG. 17 shows a continuation of the example of FIGS. 15-16. In FIG. 17, the gNB continues performing LBT for transmitting SSB #3. LBT may start from the end of the SSB #2 transmission. As shown in FIG. 17, LBT success may occur for the third SSB #3 candidate position. The gNB may transmit SSB #3 in the third SSB #3 candidate position. LBT for other SSB #3 transmission may not be necessary within this SSB transmission period.

Figure 18:
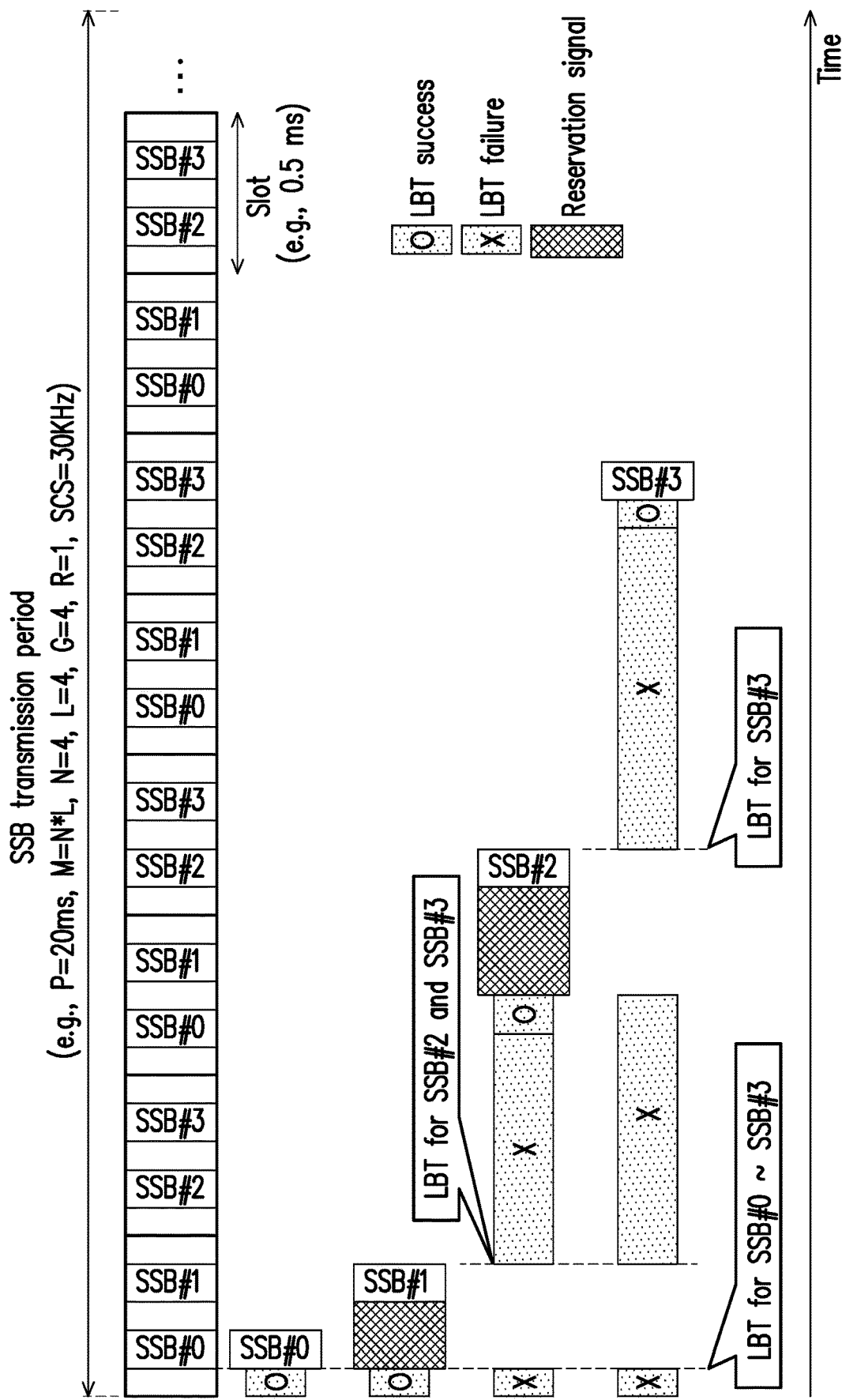
FIG. 18 shows the scenario conditions of FIGS. 15-17 for SSB Pattern #1.

FIG. 18 shows the scenario conditions of FIGS. 15-17 together in one figure. According to the examples of SSB Pattern #1 illustrated in FIGS. 15-18: 1) SSB #0 may be transmitted at least at the 1st SSB transmission opportunity; 2) SSB #1 may be transmitted at least at the 2nd SSB transmission opportunity; 3) SSB #2 may be transmitted at least at the 7th SSB transmission opportunity; and 4) SSB #3 may be transmitted at least at the 12th SSB transmission opportunity. However, notice that the gNB may not transmit a SSB of a SSB index in a SSB transmission period if all LBT results for the SSB index are LBT failures.

FIGS. 19-23 illustrate examples of scenario conditions for SSB Pattern #2. The values of the parameters shown in FIGS. 19-23 are: SSB transmission period P=20 ms, the time length of a slot=1 ms, SCS=15 KHz, N=4, L=4 and hence M=N*L=16 SSB transmission opportunities. In the examples of FIGS. 19-23, G=2, hence R=N/G=2.

Figure 19:
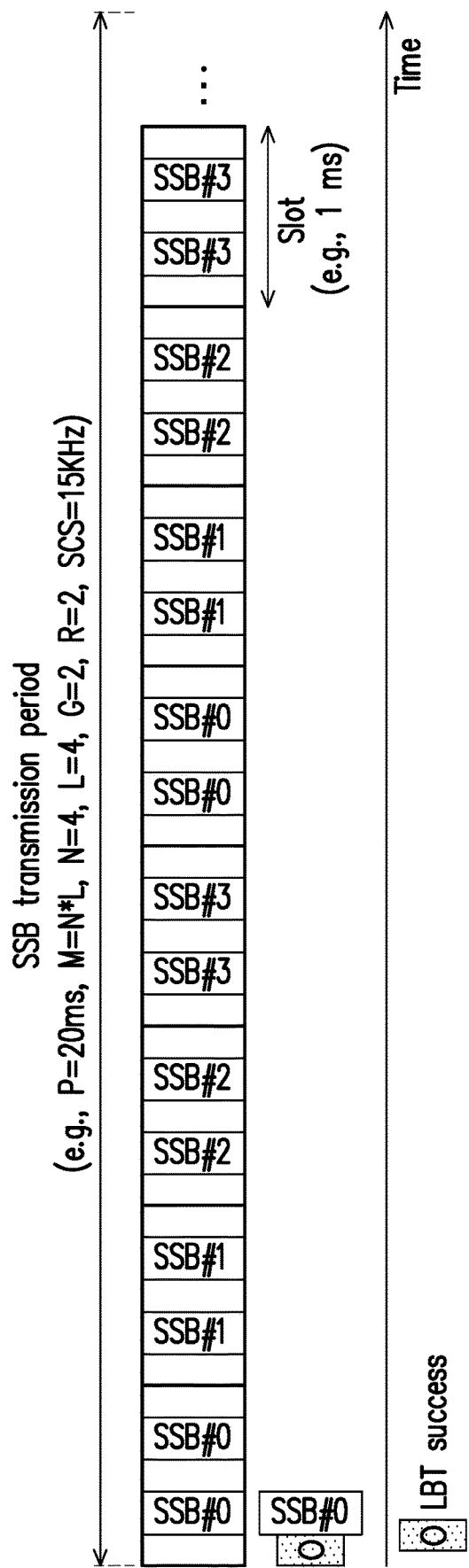
FIG. 19 shows an example of a scenario condition for SSB Pattern #2 where the gNB performs LBT procedure for transmitting SSB #0 according to one of the exemplary embodiments of the disclosure.

FIG. 19 shows an example of a scenario condition where the gNB transmits SSB with SSB index SSB #0. The gNB may perform a LBT procedure for each SSB #0 candidate position. In FIG. 19, LBT result for the first SSB #0 candidate position is LBT success. Upon LBT success for the first SSB #0 candidate position, the gNB may transmit SSB #0 in the first SSB #0 candidate position. LBT for other SSB #0 transmission may not be necessary within this SSB transmission period.

Figure 20:
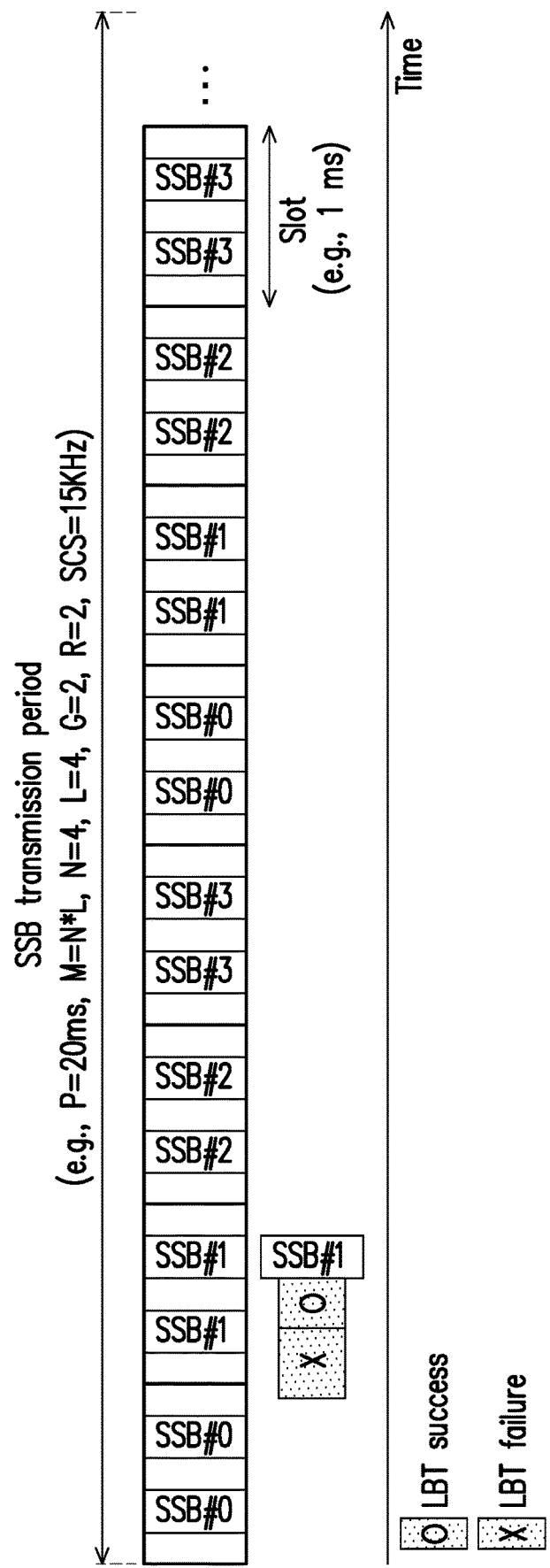
FIG. 20 shows an example of a scenario condition for SSB Pattern #2 where the gNB performs LBT procedure for transmitting SSB #1 according to one of the exemplary embodiments of the disclosure.

FIG. 20 shows a continuation of the example of FIG. 19. In FIG. 20, the gNB transmits SSB with SSB index SSB #1. The gNB may perform LBT for each SSB #1 candidate position. Upon LBT failure for the first SSB #1 candidate position, the gNB may perform LBT again for the second SSB #1 candidate position. Upon LBT success for the second SSB #1 candidate position, the gNB may transmit SSB #1 in the second SSB #1 candidate position. LBT for other SSB #1 transmission may not be necessary within this SSB transmission period.

Figure 21:
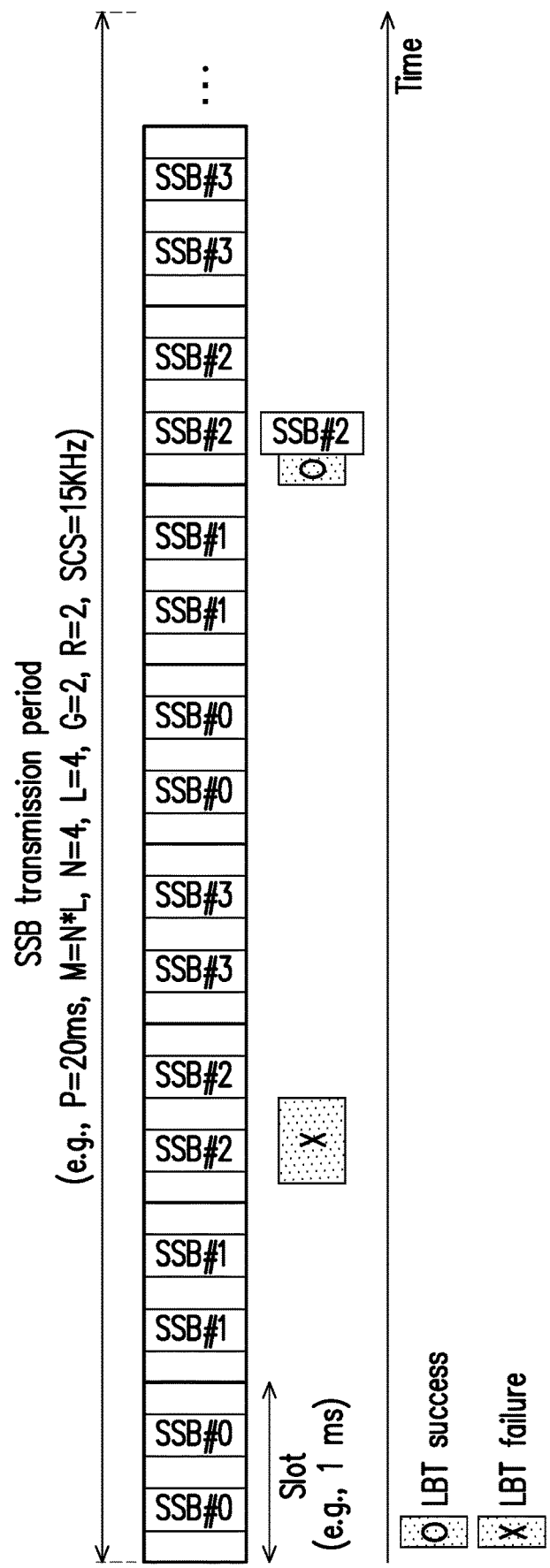
FIG. 21 shows an example of a scenario condition for SSB Pattern #2 where the gNB performs LBT procedure for transmitting SSB #2 according to one of the exemplary embodiments of the disclosure.

FIG. 21 shows a continuation of the example of FIGS. 19-20. In FIG. 21, the gNB transmits SSB with SSB index SSB #2. The gNB may perform LBT for each SSB #2 candidate position. Upon LBT failure in the first and the second SSB #2 candidate positions, the gNB may perform LBT again for the third SSB #2 candidate position. Upon LBT success for the third SSB #2 candidate position, the gNB may transmit SSB #2 in the third SSB #2 candidate position. LBT for other SSB #2 transmission may not be necessary within this SSB transmission period.

Figure 22:
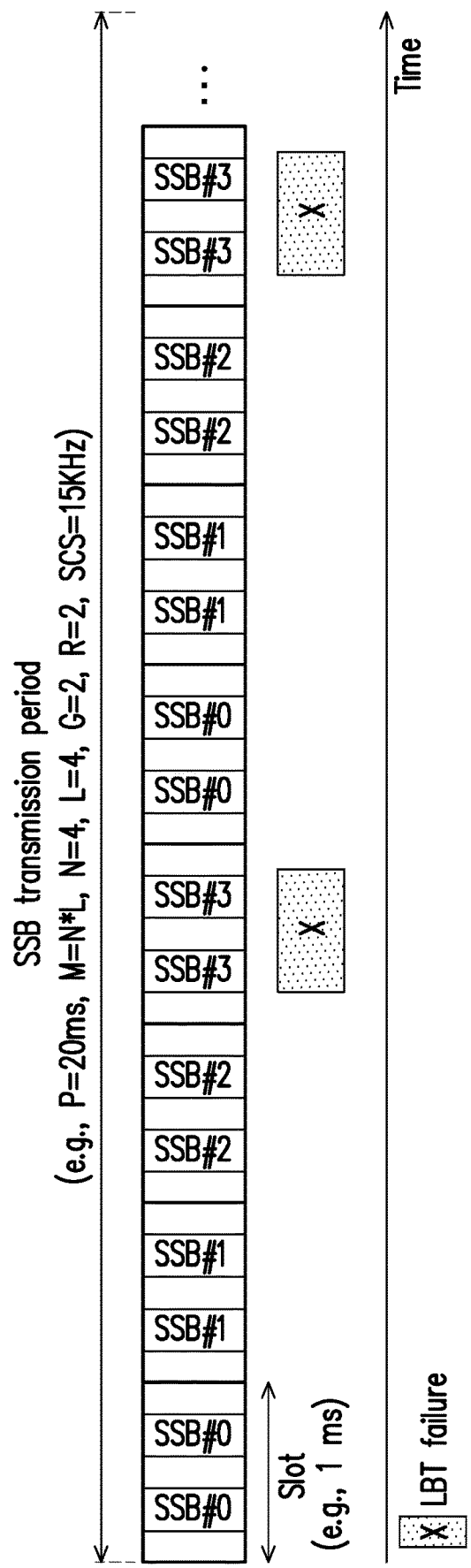
FIG. 22 shows an example of a scenario condition for SSB Pattern #2 where the gNB performs LBT procedure for transmitting SSB #3 according to one of the exemplary embodiments of the disclosure.

FIG. 22 shows a continuation of the example of FIGS. 19-21. In FIG. 22, the gNB performs LBT for transmitting SSB #3. The gNB may perform LBT for each SSB #3 candidate position. Upon LBT failure in all SSB #3 candidate positions, there is no SSB #3 transmission within this SSB transmission period.

Figure 23:
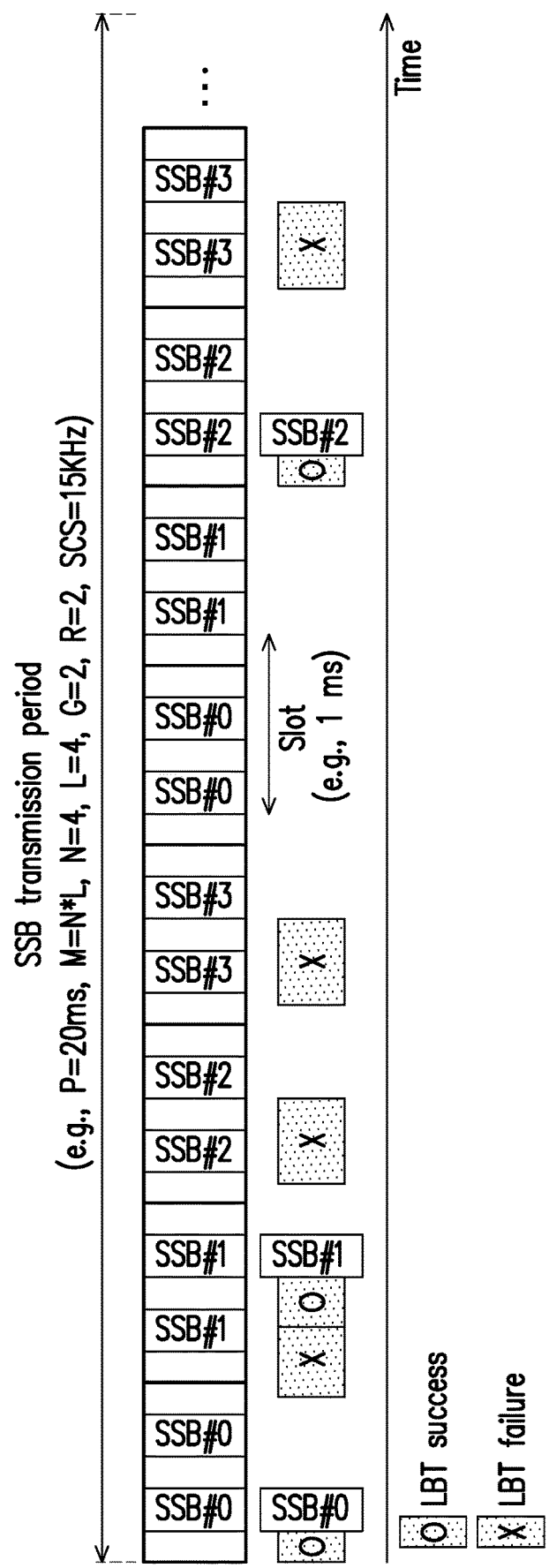
FIG. 23 shows the scenario conditions of FIGS. 19-22 for SSB Pattern #2.

FIG. 23 shows the scenario conditions of FIGS. 19-22 together in one figure. According to the examples of SSB Pattern #2 illustrated in FIGS. 19-23: 1) SSB #0 may be transmitted at least at the 1st SSB transmission opportunity; 2) SSB #1 may be transmitted at least at the 4th SSB transmission opportunity; 3) SSB #2 may be transmitted at least at the 13th SSB transmission opportunity; and 4) there may be no SSB #3 transmission within this SSB transmission period.

Figure 24:
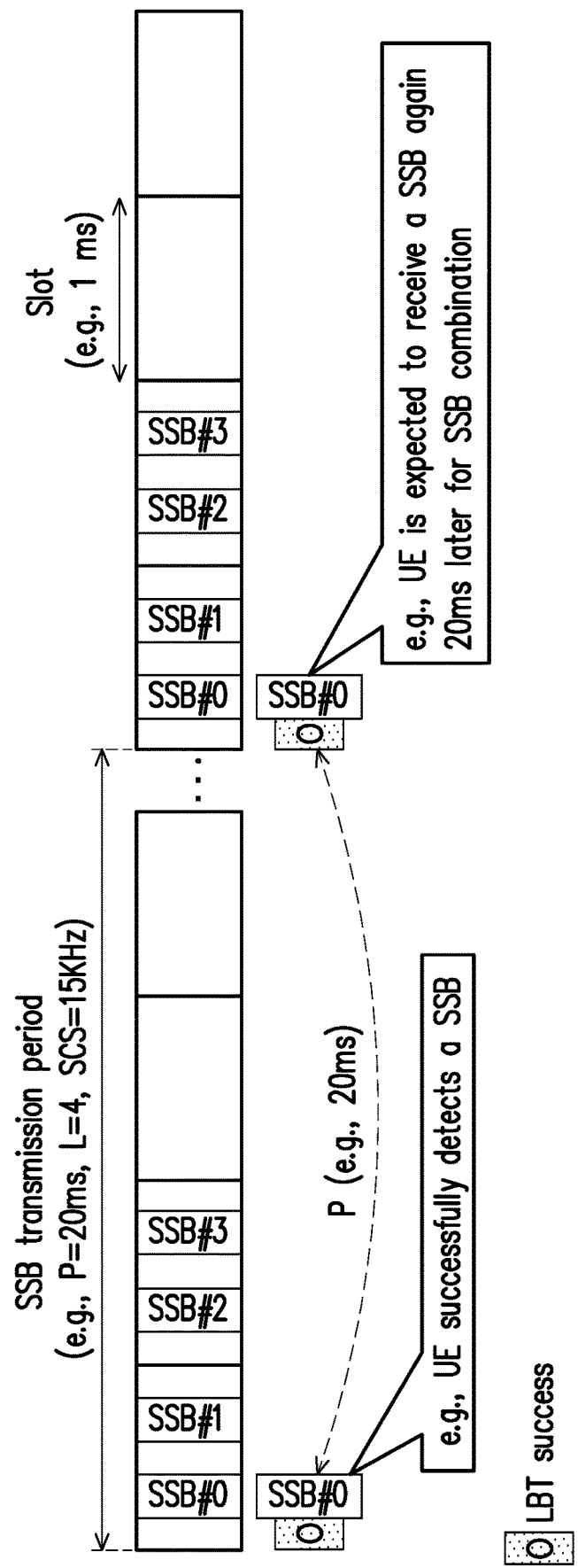
FIG. 24 illustrates an example of SSB detection (e.g., SSB combination) according to one of the exemplary embodiments of the disclosure.

FIG. 24 illustrates an example of SSB detection (e.g., SSB combination) according to one of the exemplary embodiments of the disclosure. The UE may perform SSB detection. In FIG. 24, the gNB may perform LBT for transmitting SSB with SSB index SSB #0 in a first SSB transmission period. Upon LBT success for the first SSB #0 candidate position, the gNB may transmit SSB #0 at the first SSB #0 candidate position. The UE may receive SSB #0 transmitted by the gNB. After receiving a SSB, the UE may expect to receive another SSB in order to perform SSB combination. The UE may perform SSB combination to correctly detect the PBCH and the mapping information. After receiving a SSB, a UE may expect to receive the SSB again during the following SSB transmission period. In FIG. 24, the UE may expect to receive a SSB #0 again after P=20 ms. In the following SSB transmission period, the gNB may perform LBT for transmitting SSB with SSB index SSB #0. Upon LBT success for the first SSB #0 candidate position, the gNB may transmit SSB at the first SSB #0 candidate position. The UE may receive SSB. As shown in FIG. 24, the gNB may transmit SSB #0 of the following SSB transmission period P ms after transmission of SSB #0 of the first SSB transmission period. After receiving the SSB of the following SSB transmission period, UE may perform SSB combination using the SSB #0 of the first SSB transmission period and the SSB #0 of the following SSB transmission period to detect the PBCH and the mapping information.

Thus, the UE may perform a network access method, further comprising: receiving another SSB which comprises at least one of the PBCH, the PSS, the SSS, the mapping information or any combination of two or more of selected from the PBCH, the PSS, the SSS and the mapping information; and performing SSB combination using the SSB and the another SSB to detect the PBCH and the mapping information, wherein the UE receives the SSB in a SSB transmission period, and the UE receives the another SSB in the following SSB transmission period.

However, other design considerations might also be considered for SSB detection algorithm at the UE. For example: power consumption may be a concern, and simplified UE behavior. Moreover, as the number of SSB transmission opportunities increases, UE may need to further extend the time period to monitor possible SSB. Additionally, the SSB detection algorithm may be required to consider several hypotheses due to the additional SSB resources.

Figure 25:
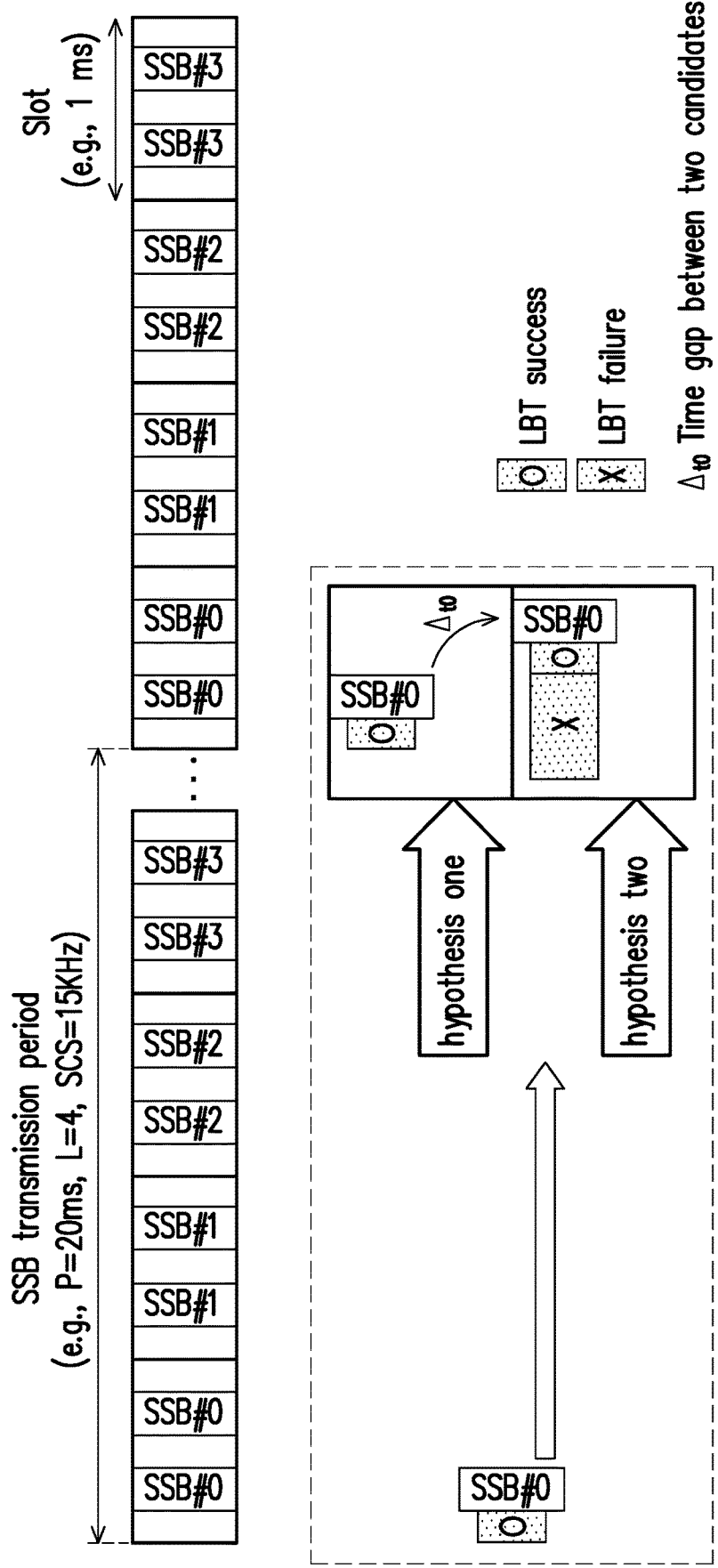
FIG. 25 illustrates an example of SSB detection hypotheses where the gNB transmits SSB #0 at the first SSB #0 candidate position according to one of the exemplary embodiments of the disclosure.
Figure 26:
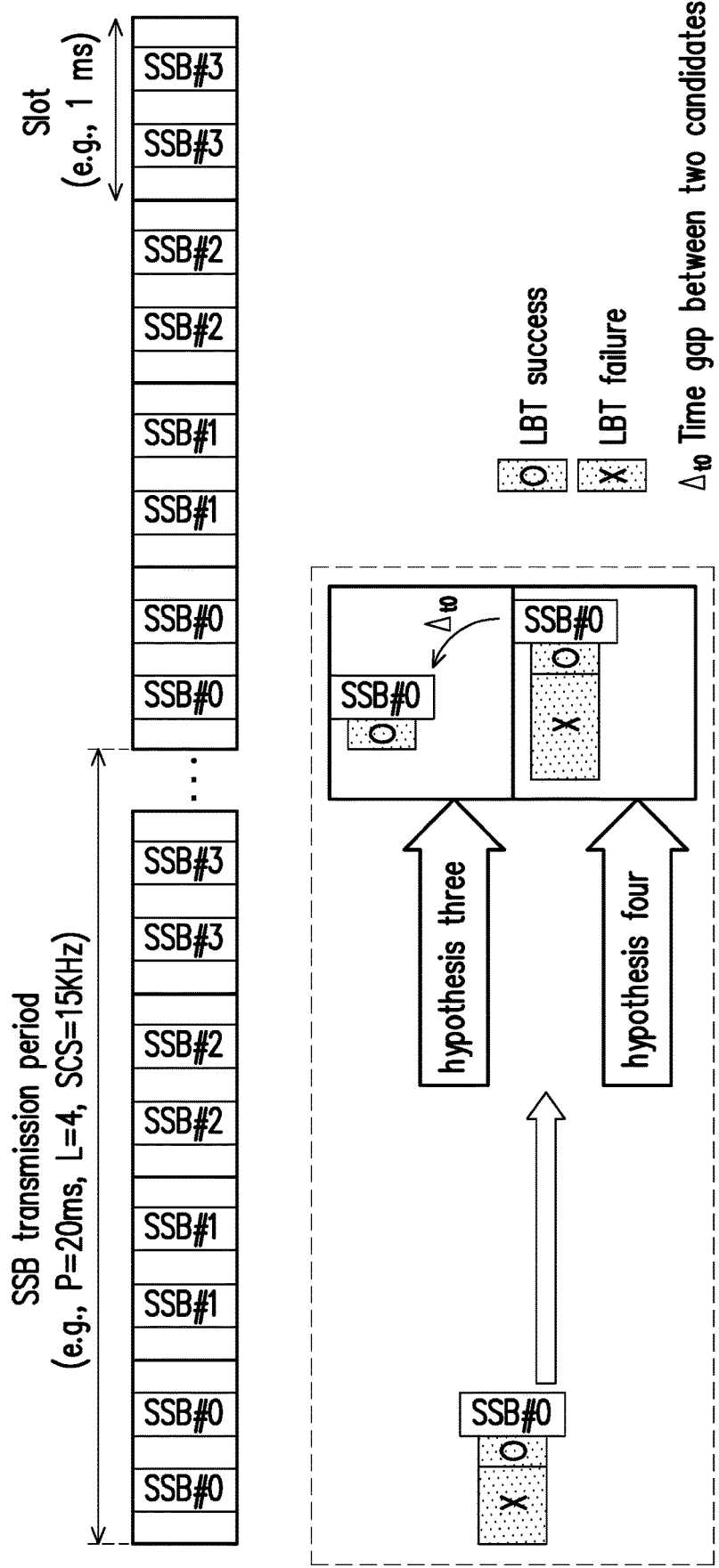
FIG. 26 illustrates another example of SSB detection hypotheses where the gNB transmits SSB #0 at the second SSB #0 candidate position according to one of the exemplary embodiments of the disclosure.

FIGS. 25 and 26 illustrate examples of hypotheses to be considered for SSB detection and SSB combination. The values of the parameters shown in FIGS. 25 and 26 are: SSB transmission period P=20 ms, the time length of a slot=1 ms, SCS=15 KHz, N=2, L=4 and hence M=N*L=8 SSB transmission opportunities. In the examples of FIGS. 25 and 26, G=1, thus R=N/G=2.

FIG. 25 illustrates an example of SSB detection hypotheses where the gNB transmits SSB #0 at the first SSB #0 candidate position. In FIG. 25, the gNB may perform LBT and obtain LBT success. Then the gNB may transmit SSB #0. The UE may successfully detect the SSB #0 transmitted by the gNB at the first SSB #0 candidate position. The UE may expect to receive another SSB #0 in the following SSB transmission period. However, SSB detection at the UE has to consider that SSB #0 of the following SSB transmission period will be transmitted either in the first SSB #0 candidate position or in the second SSB #0 candidate position. The first SSB #0 candidate position and the second SSB #0 candidate position are separated by a time gap $\Delta t0$.

Hypothesis one of FIG. 25 is that the gNB performs LBT for the first SSB #0 candidate position of the following SSB transmission period. LBT result is LBT success. Thus the gNB may transmit SSB #0 at the first SSB #0 candidate position.

Hypothesis two of FIG. 25 is that the gNB performs LBT for the first SSB #0 candidate position of the following SSB transmission period. LBT result is LBT failure. Thus the gNB may perform LBT for the second SSB #0 candidate position. In this case, LBT result is LBT success. Thus the gNB may transmit SSB #0 at the second SSB #0 candidate position.

Due to hypothesis one and hypothesis two, the gNB may transmit SSB #0 either P ms or (P+$\Delta t0$) ms after the first detected SSB #0.

FIG. 26 illustrates an example of SSB detection hypotheses where the gNB transmits SSB #0 at the second SSB #0 candidate position. In FIG. 26, the gNB may perform LBT for the first SSB #0 candidate position, and obtains LBT failure. Thus, the gNB may perform LBT for the second SSB #0 candidate position. In this case, LBT result is LBT success. Thus the gNB may transmit SSB #0 at the second SSB #0 candidate position. The UE may successfully detect SSB #0 transmitted by the gNB at the second SSB #0 candidate position. The UE may expect to receive another SSB #0 in the following SSB transmission period. Similar to FIG. 25, SSB detection at the UE has to consider that SSB #0 of the following SSB transmission period will be transmitted either in the first SSB #0 candidate position or in the second SSB #0 candidate position.

Hypothesis three of FIG. 26 is that the gNB performs LBT for the first SSB #0 candidate position of the following SSB transmission period. LBT result is LBT success. Thus the gNB transmits SSB #0 at the first SSB #0 candidate position.

Hypothesis four of FIG. 26 is that the gNB may perform LBT for the first SSB #0 candidate position of the following SSB transmission period. LBT result is LBT failure. Thus the gNB may perform LBT for the second SSB #0 candidate position. In this case, LBT result is LBT success. Thus the gNB may transmit SSB #0 at the second SSB #0 candidate position.

Due to hypothesis three and hypothesis four, the gNB may transmit SSB #0 either (P-$\Delta t0$) ms or P ms after the first detected SSB #0. Due to the four hypotheses of FIGS. 25 and 26, UE is required to further extend the time period to monitor possible SSB.

Figure 27:
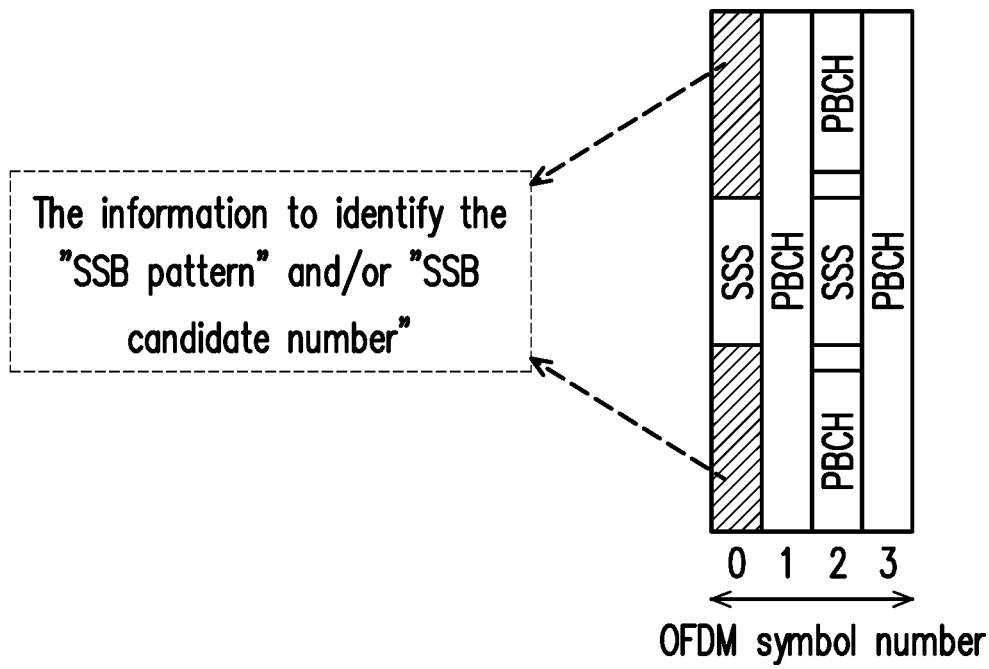
FIG. 27 illustrates a SSB according to one of the exemplary embodiments of the disclosure.

FIG. 27 illustrates a SSB according to one of the exemplary embodiments of the disclosure. The gNB may transmit the SSB in a frequency band. In the example of FIG. 27, the gNB may transmit the SSB using orthogonal frequency division multiplexing (OFDM) modulation. The SSB of FIG. 27 may comprise four OFDM symbols. However, the disclosure is not limited by the modulation scheme of the example of FIG. 27. Other types of modulation may be implemented in the disclosure. In the example of FIG. 27, the SSB may comprise PSS, SSS, PBCH and mapping information. The first OFDM symbol may comprise PSS and the mapping information. The mapping information of the SSB may identify the SSB pattern and/or SSB candidate number. The mapping information may be encoded in the SSB as an identification sequence. The identification sequence corresponding to the mapping information may be generated by Zadoff-Chu (ZC) sequences, constant amplitude zero autocorrelation (CAZAC) sequences, pseudo-noise (PN) sequences or sequences encoded by a Y bit information.

FIGS. 28-40 show examples of mapping information according to exemplary embodiments of the disclosure. Three examples of information to support SSB detection are shown. Example 1 may be mapping information comprising SSB candidates. Example 2 may be mapping information comprising two possible SSB patterns and SSB candidates. Example 3 may be mapping information comprising three possible SSB patterns and SSB candidates.

Figure 28:
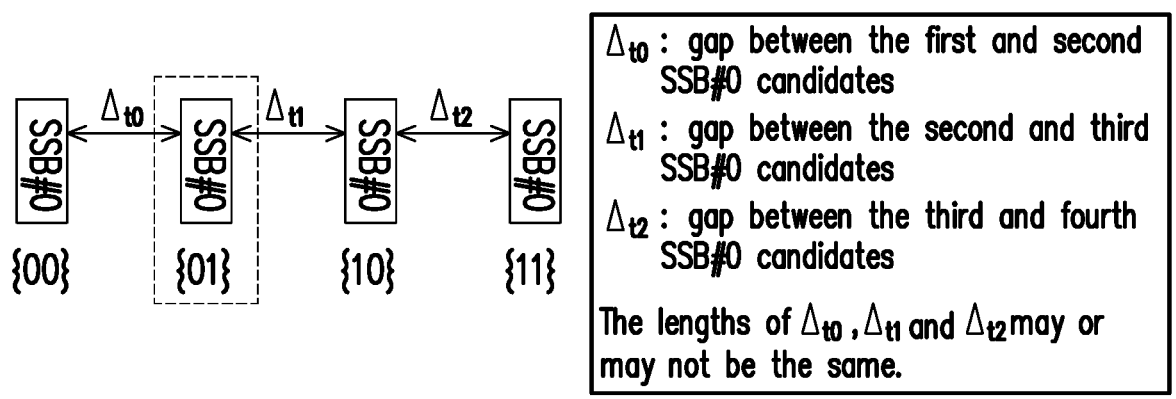
FIG. 28 illustrates Example 1 of mapping information according to one of the exemplary embodiments of the disclosure.

FIG. 28 illustrates Example 1 of mapping information according to one of the exemplary embodiments of the disclosure. FIG. 28 shows four SSB candidates which have the same SSB index SSB #0: first SSB #0 candidate {00}, second SSB #0 candidate {01}, third SSB #0 candidate {10} and fourth SSB #0 candidate {11}. Since there are four SSB #0 candidates, the number of transmission opportunities has been increased by a factor N=4. There is a time gap between SSB candidates. The time gap between the first and second SSB #0 candidates is $\Delta t0$. The time gap between the second and third SSB #0 candidates is $\Delta t1$. The time gap between the third and fourth SSB #0 candidates is $\Delta t2$. The length of the time gaps $\Delta t0$, $\Delta t1$ and $\Delta t2$ may or may not be the same.

In Example 1, the mapping information may be used to distinguish SSB candidates. For example, mapping information may be an identification sequence corresponding to the SSB candidate number. UE may determine the SSB candidate number using a look-up table. An example of a look-up table is Table A, shown as follows.

TABLE A

| {candidate} | Identification sequence |
| --- | --- |
| {00} | A0 |
| {01} | A1 |
| {10} | A2 |
| {11} | A3 |

Note:
number of bits of candidate may be ceil(log2(N)).

In FIG. 28, UE may acknowledge which SSB #0 candidate is received via the mapping information. For example, UE may determine the second SSB #0 candidate {01} is transmitted by the gNB if UE detects identification sequence A1. In Table A, identification sequence A1 may correspond to SSB candidate number {01}.

Figure 29:
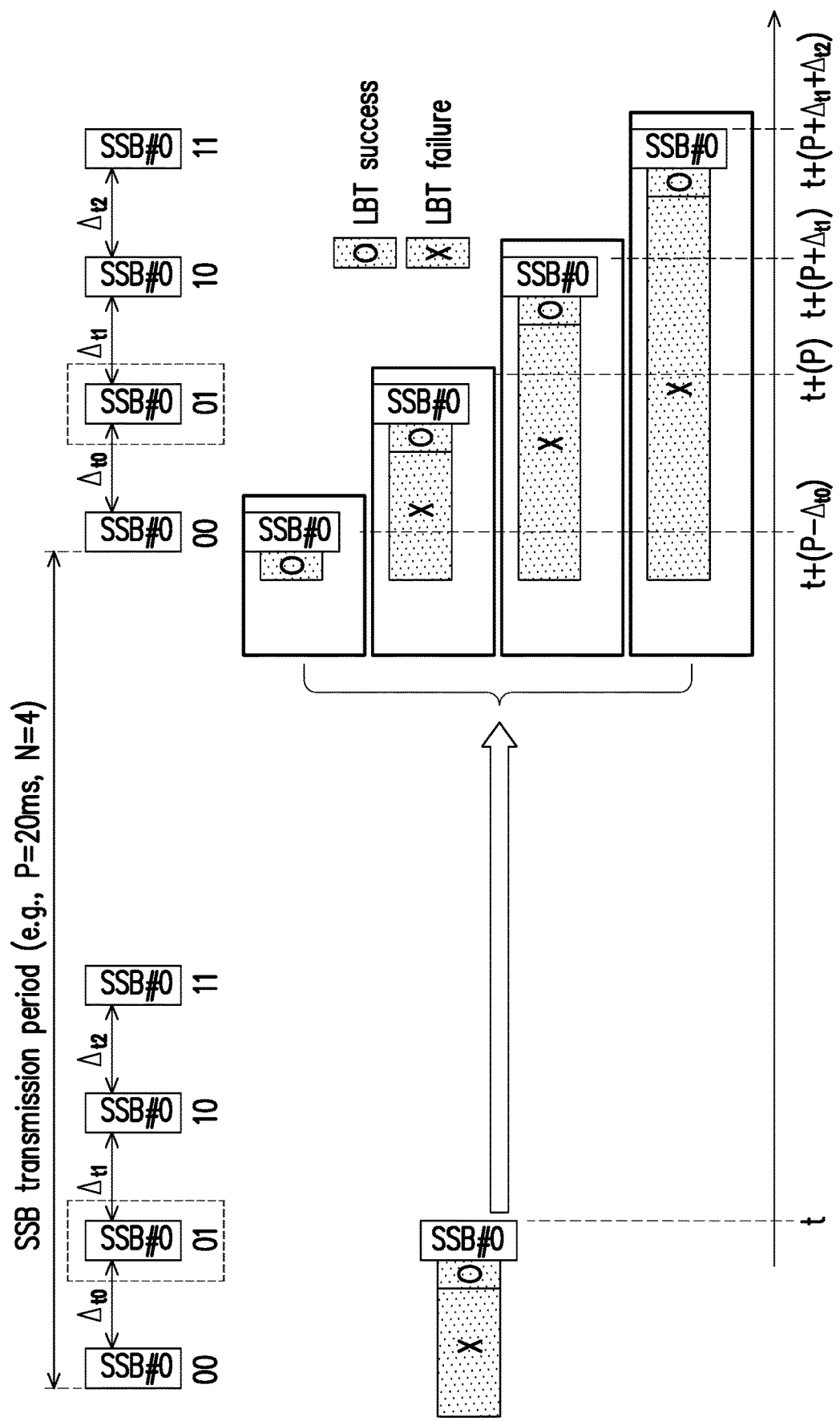
FIG. 29 illustrates an example of a scenario of SSB combination for Example 1 of mapping information according to one of the exemplary embodiments of the disclosure.

FIG. 29 illustrates an example of a scenario of SSB combination according to Example 1 of mapping information. FIG. 29 shows an example with SSB index SSB #0. The values of the parameters shown in FIG. 29 are: SSB transmission period P=20 ms and N=4. The time gap between the first and second SSB #0 candidate positions is $\Delta t0$. The time gap between the second and third SSB #0 candidate positions is $\Delta t1$. The time gap between the third and fourth SSB #0 candidate positions is $\Delta t2$. The length of the time gaps $\Delta t0$, $\Delta t1$ and $\Delta t2$ may or may not be the same. The gNB may perform LBT for the first SSB #0 candidate position. LBT result is LBT failure. Then the gNB may perform LBT for the second SSB #0 candidate position. In this case, LBT result is LBT success. Thus the gNB may transmit the second SSB #0 candidate. The UE may receive the SSB with SSB index SSB #0. UE may detect identification sequence A1. Thus, UE may determine, by using a look-up table like Table A, that the received SSB has the SSB candidate number {01}.

Since UE received SSB with SSB index SSB #0 and identification sequence A1 at time instance t, UE may determine that the next SSB may be transmitted by the gNB at a time instance of t+(P−Δt0), t+(P), t+(P+Δt1) or t+(P+Δt1+Δt2) and may monitor the channel to receive the next SSB at any of these time instances. The gNB may determine transmission time of the following SSB transmission period according to the LBT results. FIG. 29 shows four possible LBT results. The gNB may perform LBT for the first SSB #0 candidate position of the following SSB transmission period. If the LBT result is LBT success, the gNB may transmit the first SSB #0 candidate {00} at time instance t+(P−Δt0). If the LBT result is LBT failure, the gNB may perform LBT for the second SSB #0 candidate position. If the LBT result is LBT success, the gNB may transmit the second SSB #0 candidate {01} at time instance t+(P). If the LBT result is LBT failure, the gNB may perform LBT for the third SSB #0 candidate position. If the LBT result is LBT success, the gNB may transmit the third SSB #0 candidate {10} at time instance t+(P+Δt1). If the LBT result is LBT failure, the gNB may perform LBT for the fourth SSB #0 candidate position. If the LBT result is LBT success, the gNB may transmit the fourth SSB #0 candidate {11} at time instance t+(P+Δt1+Δt2). Upon receiving the SSB of the following SSB transmission period, the UE may perform SSB combination using the SSB of the first SSB transmission period and the SSB of the following SSB transmission period to detect the PBCH and the mapping information.

FIGS. 30-34 illustrate Example 2 of mapping information according to one of the exemplary embodiments of the disclosure. Example 2 may be mapping information used to distinguish SSB Pattern and SSB candidates. There are q possible SSB patterns. For Example 2 of mapping information, q=2. For each SSB index, there may be N SSB candidates. In the examples of FIGS. 30-34, N=4, SCS=15 KHz, and the time length of a slot=1 ms.

Figure 30:
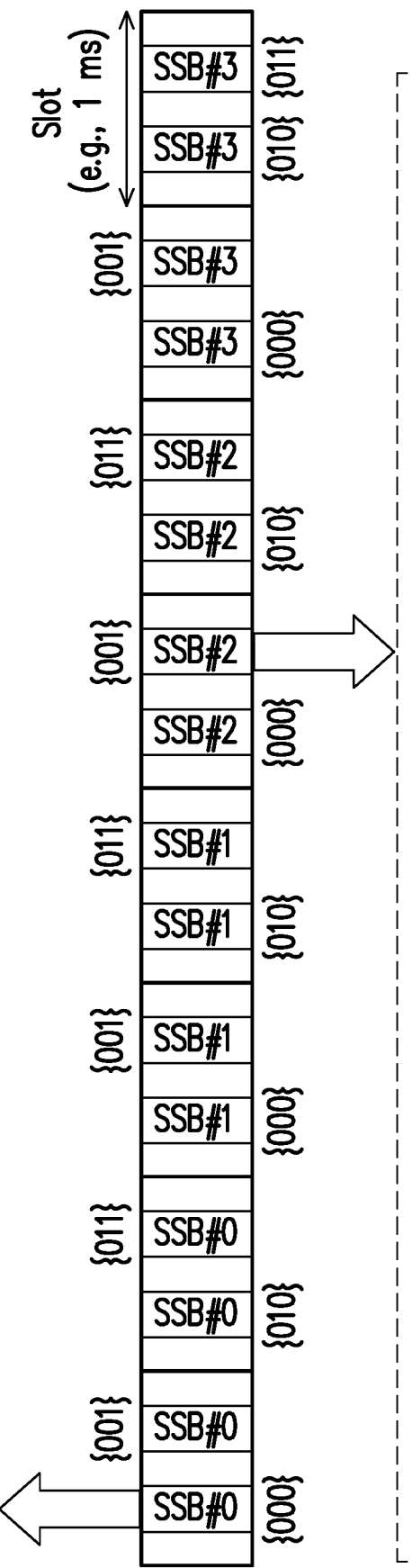
FIG. 30 illustrates an example of two identification sequences of mapping information for Example 2 of mapping information according to one of the exemplary embodiments of the disclosure.
Figure 31:
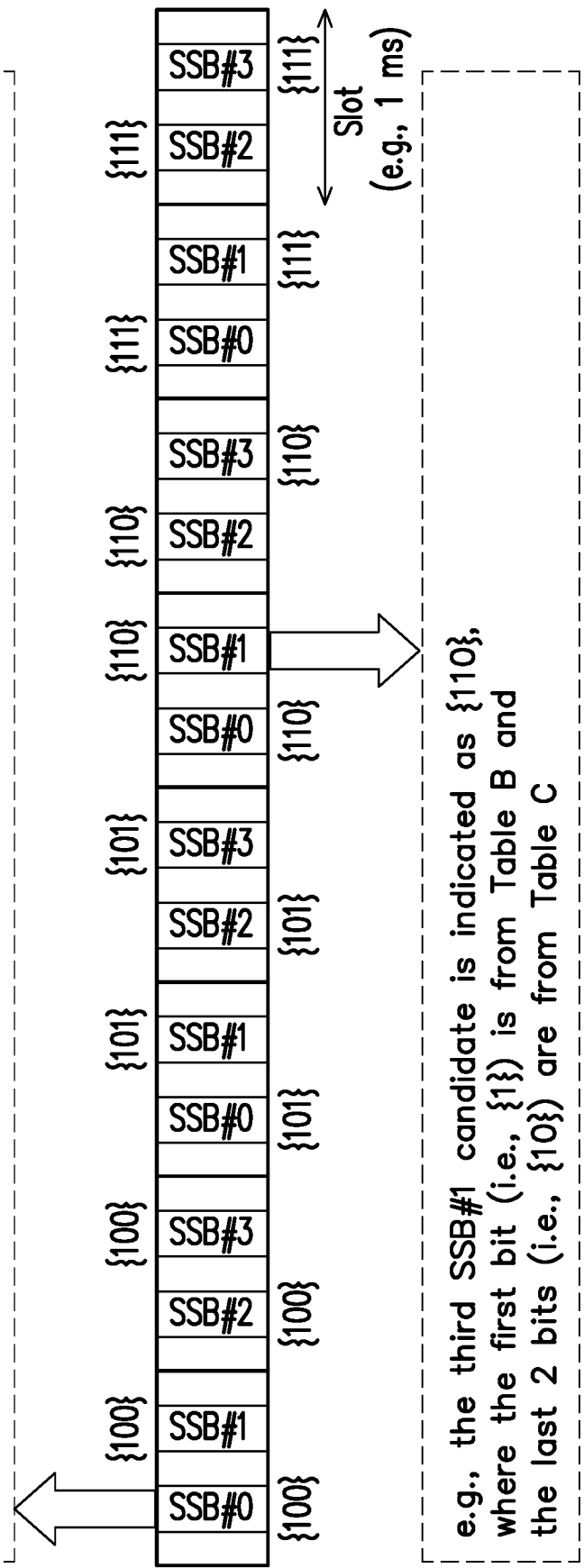
FIG. 31 illustrates another example of two identification sequences of mapping information for Example 2 of mapping information according to one of the exemplary embodiments of the disclosure.
Figure 32:
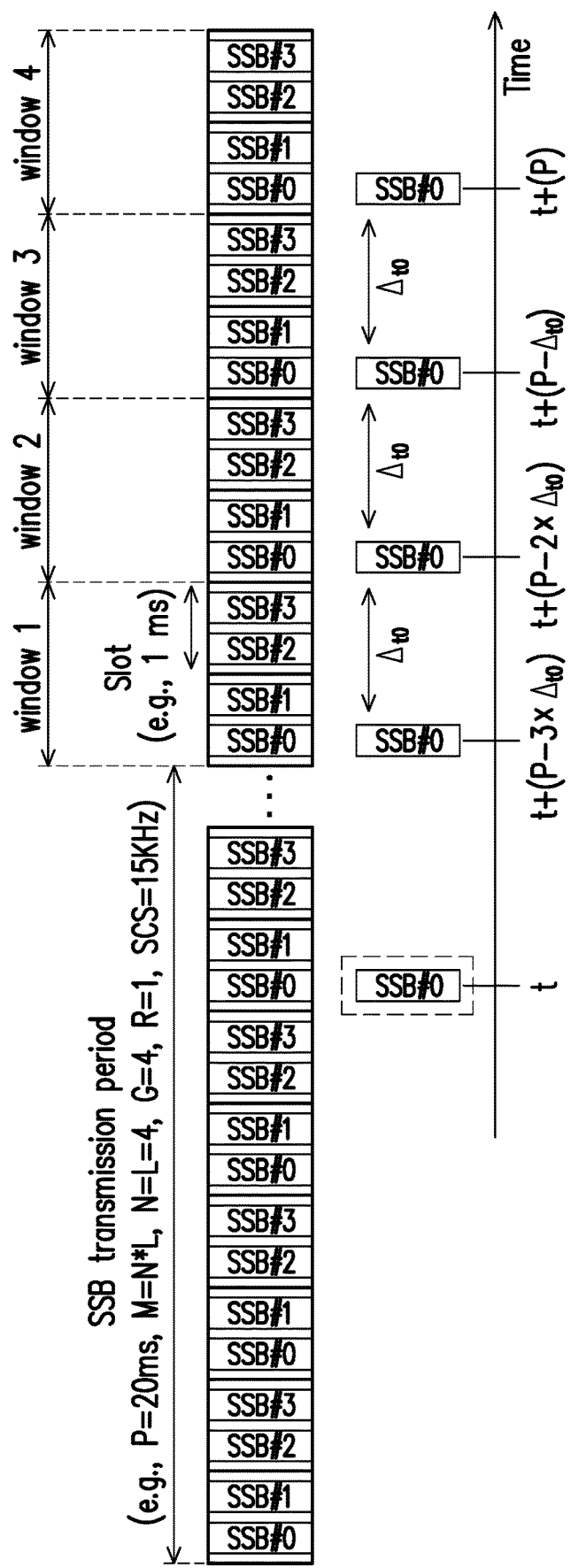
FIG. 32 illustrates an example of a scenario of SSB combination for Example 2 of mapping information according to one of the exemplary embodiments of the disclosure.

In FIGS. 30-32, mapping information may comprise two identification sequences. The first identification sequence may correspond to the SSB Pattern. Table B is a look-up table to determine the SSB Pattern. The second identification sequence may correspond to the SSB candidate number. Table C is a look-up table to determine the SSB candidate number. Tables B and C are shown as follows.

TABLE B

| {SSB Pattern} | Identification sequence |
|---|---|
| {0} | B0 |
| {1} | B1 |

Note:
number of bits of SSB Pattern may be ceil(log2(q)).

TABLE C

| {candidate} | Identification sequence |
|---|---|
| {00} | C0 |
| {01} | C1 |
| {10} | C2 |
| {11} | C3 |

Note:
number of bits of candidate may be ceil(log2(N)).

FIG. 30 illustrates an example of two identification sequences of mapping information. FIG. 30 shows SSB Pattern #0. For SSB Pattern #0, at least two of the SSB candidates may be located in consecutive SSB candidate positions and may have the same SSB index. The gNB may transmit identification sequence B0 in the SSB. Thus, the first bit of the SSB candidates is 0, according to Table B. The last two bits of the SSB candidates may indicate the SSB candidate number. For example, the gNB may transmit identification sequences B0 and C0 in the first SSB #0 candidate. Upon receiving SSB with SSB index SSB #0, the UE may use Table B and the received identification sequence B0 to determine that the SSB Pattern is SSB Pattern #0. Then, the UE may use Table C and the received identification sequence C0 to determine that the SSB candidate number is {00} and that the UE received the first SSB #0 candidate. As another example, the gNB may transmit identification sequences B0 and C1 in the second SSB #2 candidate. Upon receiving SSB with SSB index SSB #2, the UE may use Table B and the received identification sequence B0 to determine that the SSB Pattern is SSB Pattern #0. Then, the UE may use Table C and the received identification sequence C1 to determine that the SSB candidate number is {01} and that the UE received the second SSB #2 candidate.

FIG. 31 illustrates another example of two identification sequences of mapping information. FIG. 31 shows SSB Pattern #1. For SSB Pattern #1, SSB candidates located in consecutive SSB candidate positions may have different SSB index. The gNB may transmit identification sequence B1 in the SSB. Thus, the first bit of the SSB candidates is 1, according to Table B. The last two bits of the SSB candidates may indicate the SSB candidate number. For example, the gNB may transmit identification sequences B1 and C0 in the first SSB #0 candidate. Upon receiving SSB with SSB index SSB #0, the UE may use Table B and the received identification sequence B1 to determine that the SSB Pattern is SSB Pattern #1. Then, the UE may use Table C and the received identification sequence C0 to determine that the SSB candidate number is {00} and that the UE received the first SSB #0 candidate. As another example, the gNB may transmit identification sequences B1 and C2 in the third SSB #1 candidate. Upon receiving SSB with SSB index SSB #1, the UE may use Table B and the received identification sequence B1 to determine that the SSB Pattern is SSB Pattern #1. Then, the UE may use Table C and the received identification sequence C2 to determine that the SSB candidate number is {10} and that the UE received the third SSB #2 candidate.

FIG. 32 illustrates an example of a scenario of SSB combination. SSBs may comprise mapping information according to example 2. The values of the parameters shown in FIG. 32 are: SSB transmission period P=20 ms, SCS=15 KHz, L=4, N=4, and M=N*L=16. Since FIG. 32 shows SSB Pattern #1, G=N=4 and R=N/G=1. FIG. 32 shows SSB Pattern #1 with an equal interval between each SSB candidate. For example, the time gap between the first and second SSB #0 candidate positions is Δt0, the time gap between the second and third SSB #0 candidate positions is Δt0, and the time gap between the third and fourth SSB #0 candidate positions is Δt0. However, the time gap between each SSB candidate may or may not be the same in different embodiments. After the UE receives a SSB, UE may determine the SSB pattern. UE may determine the time gaps between each candidate since these time gaps are related to the SSB pattern. Additionally, since the UE may determine the SSB candidate number, UE may know the exact position where the gNB may transmit the SSBs in the following SSB transmission period. In FIG. 32, the gNB transmits the fourth SSB #0 candidate at time instance t. The fourth SSB #0 candidate may include identification sequence B1, according to Table B, since the gNB uses SSB Pattern #1. The fourth SSB #0 candidate may include identification sequence C3, according to Table C, to indicate it is the fourth SSB #0 candidate. After the UE receives SSB #0, UE may detect identification sequences B1 and C3, and determines that the received SSB #0 is the fourth SSB #0 candidate of SSB Pattern #1. Then, the UE may determine that the gNB may transmit SSB with SSB index SSB #0 in the following SSB transmission period at time instances t+(P−3*Δt0), or t+(P−2*Δt0), or t+(P−Δt0), or t+(P). The UE may monitor SSB at time instances t+(P−3*Δt0), or t+(P−2*Δt0), or t+(P−Δt0), or t+(P). Upon receiving another SSB, from the gNB, during the following SSB transmission period, the UE may perform SSB combination using the SSB and the another SSB to detect the PBCH and the mapping information.

Thus, the UE may perform a network access method, further comprising: determining SSB candidate positions in the following SSB transmission period for a plurality of SSB candidates according to the SSB pattern; receiving another SSB which comprises at least one of the PBCH, the PSS, the SSS, the mapping information or any combination of two or more of selected from the PBCH, the PSS, the SSS and the mapping information; and performing SSB combination using the SSB and the another SSB to detect the PBCH and the mapping information, wherein the UE receives the SSB in a SSB transmission period, and the UE receives the another SSB in the following SSB transmission period.

FIG. 32 further shows that the SSB transmission period may comprise a plurality of windows: window 1, window 2, window 3 and window 4. Each window may comprise a plurality of slots. The UE may receive the SSB within a SSB transmission period. Since the SSB transmission period may comprise a plurality of windows, the UE may receive the SSB within a window of the plurality of windows. Each window occupies a time interval within the SSB transmission period. However, the SSB transmission period is not smaller than the total time occupied by the plurality of windows. Furthermore, a first window of the plurality of windows is located at the start of the SSB transmission period. The windows of the plurality of windows are adjacent to each other and do not overlap.

A window of the plurality of windows may comprise a plurality of slots. A slot of the plurality of slots may comprise two SSB transmission opportunities. In the example of FIG. 32, the window of the plurality of windows comprises two slots. The length of each slot is 1 ms. Since the SSB transmission period P=20 ms, the SSB transmission period may comprise twenty slots. The gNB may configure the SSB transmission period P. The period of the window of the plurality of windows may equal the SSB transmission period. Thus, a window of the plurality of windows may be periodic and a period of the window of the plurality of windows is not smaller than the plurality of slots comprised in the window of the plurality of windows. The gNB may configure the period of the window of the plurality of windows.

FIG. 32 further shows that a first window may comprise a plurality of SSB transmission opportunities. Each of the SSB transmission opportunities is located in a position in the first window. Each of the SSB transmission opportunities has a spatial relation. A second window comprises another plurality of SSB transmission opportunities, each of the SSB transmission opportunities of the second window is located in a position in the second window. Each of the SSB transmission opportunities of the second window has a spatial relation. For example, window 1 comprises a plurality of SSB transmission opportunities. Window 2 comprises another plurality of SSB transmission opportunities.

Since FIG. 32 shows an example for SSB Pattern #1, the SSB transmission opportunity with spatial relation SSB #0 of window 1 may be located in the first position of the window. The SSB transmission opportunity with spatial relation SSB #0 of window 2 may be also located in the first position of the window. Similarly, in windows 3 and 4, the SSB transmission opportunity with spatial relation SSB #0 may be also located in the first position of the window. Thus, for SSB Pattern #1, if a SSB transmission opportunity of a first window and a SSB transmission opportunity of a second window may be located in the same position, the SSB transmission opportunity of the first window and the SSB transmission opportunity of the second window may have the same spatial relation. This teaching is similar for SSB Pattern #2.

Additionally, for SSB Pattern #2, at least one SSB transmission opportunity of a first window and a SSB transmission opportunity of a second window have the same spatial relation, and the at least one SSB transmission opportunity of the first window and the SSB transmission opportunity of the second window are located in different position.

The first window and the second window may be in the same SSB transmission period. For example, window 1 and window 2 of FIG. 32 may be in the same SSB transmission period. The UE may receive a SSB that has a spatial relation. In an exemplary embodiment of the disclosure, the gNB may determine not to transmit more SSBs which have the same spatial relation during the SSB transmission period. Thus, no other SSB has the same spatial relation with the received SSB within the SSB transmission period. However, in another exemplary embodiment of the disclosure, the first window and the second window may be in different SSB transmission periods. For example, the first window may be window 1 of FIG. 32, and the second window may be window 1 of the following SSB transmission period.

FIG. 32 further shows that the SSB transmission opportunity with SSB index SSB #0 of window 1 and the SSB transmission opportunity with SSB index SSB #0 of window 2 are separated by a predetermined time gap Δt0. Similarly, for windows 2, 3 and 4, SSB transmission opportunity with SSB index SSB #0 of consecutive windows are separated by the predetermined time gap Δt0. Thus, a SSB transmission opportunity of a first window and a SSB transmission opportunity of a second window may be separated by a predetermined time gap.

The predetermined time gap may be different for SSB transmission opportunities of different SSB index. For example, the SSB transmission opportunity with SSB index SSB #1 of window 1 and the SSB transmission opportunity with SSB index SSB #1 of window 2 may be separated by a different predetermined time gap, for example Δt1. Predetermined time gaps Δt0 and Δt1 may be different. Thus, the predetermined time gap separating SSB transmission opportunities of a SSB index may be different from the predetermined time gap separating SSB transmission opportunities of another SSB index.

FIGS. 33-34 illustrate Example 2 of mapping information, where the mapping information may comprise an identification sequence corresponding to the SSB Pattern and to the SSB candidate number. Table D may be a look-up table to determine the SSB Pattern and the SSB candidate number. Table D is shown as follows.

TABLE D

| {SSB Pattern, candidate} | Identification sequence |
|---|---|
| {0, 00} | D0 |
| {0, 01} | D1 |
| {0, 10} | D2 |
| {0, 11} | D3 |
| {1, 00} | D4 |
| {1, 01} | D5 |
| {1, 10} | D6 |
| {1, 11} | D7 |

Note 1:
number of bits of SSB Pattern may be ceil(log2(q)).
Note 2:
number of bits of candidate may be ceil(log2(N)).

FIG. 33 illustrates an example of one identification sequence of mapping information. FIG. 33 shows SSB Pattern #0. Thus, the gNB may transmit identification sequences D0, D1, D2 and D3 in FIG. 33. For example, the gNB may transmit identification sequence D0 in the first SSB #0 candidate. Upon receiving SSB with SSB index SSB #0, the UE may use Table D and the received identification sequence D0 to determine the bits {0,00}. The UE may determine with the first bit 0 that the SSB Pattern is SSB Pattern #0. The UE also may determine with the last two bits 00 that the UE received the first SSB #0 candidate. As another example, the gNB may transmit identification sequence D3 in the fourth SSB #3 candidate. Upon receiving SSB with SSB index SSB #3, the UE may use Table D and the received identification sequence D3 to determine the bits {0,11}. The UE may determine with the first bit 0 that the SSB Pattern is SSB Pattern #0. The UE also may determine with the last two bits 11 that the UE received the fourth SSB #3 candidate.

FIG. 34 illustrates another example of one identification sequence of mapping information. FIG. 34 shows SSB Pattern #1. Thus, the gNB may transmit identification sequences D4, D5, D6 and D7 in FIG. 34. For example, the gNB may transmit identification sequence D4 in the first SSB #0 candidate. Upon receiving SSB with SSB index SSB #0, the UE may use Table D and the received identification sequence D4 to determine the bits {1,00}. The UE may determine with the first bit 1 that the SSB Pattern is SSB Pattern #1. The UE may also determine with the last two bits 00 that the UE received the first SSB #0 candidate. As another example, the gNB may transmit identification sequence D7 in the fourth SSB #3 candidate. Upon receiving SSB with SSB index SSB #3, the UE may use Table D and the received identification sequence D7 to determine the bits {1,11}. The UE may determine with the first bit 1 that the SSB Pattern is SSB Pattern #1. The UE may also determine with the last two bits 11 that the UE received the fourth SSB #3 candidate.

Furthermore, Table D may be used in another example of SSB combination. The example may be very similar to FIG. 32. Assume that the gNB and the UE use Table D. In FIG. 32, the gNB may transmit the fourth SSB #0 candidate at time instance t. The fourth SSB #0 candidate would include identification sequence D7, according to Table D, since the gNB uses SSB Pattern #1 and to indicate it is the fourth SSB #0 candidate. After the UE receives SSB #0, UE may detect identification sequence D7, and may determine that the received SSB #0 is the fourth SSB #0 candidate of SSB Pattern #1. Then, the UE may determine that the gNB may transmit SSB with SSB index SSB #0 in the following SSB transmission period at time instances t+(P−3*Δt0), or t+(P−2*Δt0), or t+(P−Δt0), or t+(P). The UE may monitor SSB at time instances t+(P−3*A10), or t+(P−2*Δt0), or t+(P−Δt0), or t+(P). Upon receiving another SSB, from the gNB, during the following SSB transmission period, the UE may perform SSB combination using the SSB and the another SSB to detect the PBCH and the mapping information.

FIGS. 35-40 illustrate Example 3 of mapping information according to one of the exemplary embodiments of the disclosure. Example 3 may be mapping information used to distinguish SSB Pattern and SSB candidates. There are q possible SSB patterns. For Example 3 of mapping information, q=3. For each SSB index, there may be N SSB candidates. In the examples of FIGS. 35-40, N=4, SCS=15 KHz, and the time length of a slot=1 ms.

Figure 35:
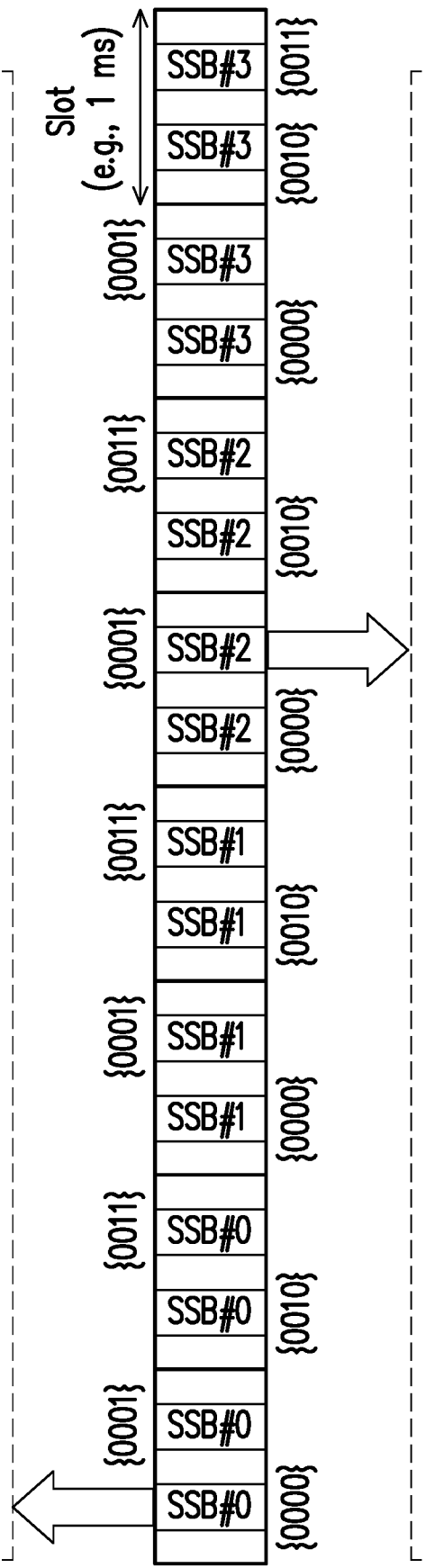
FIG. 35 illustrates a first example of two identification sequences of mapping information for Example 3 of mapping information according to one of the exemplary embodiments of the disclosure.
Figure 36:
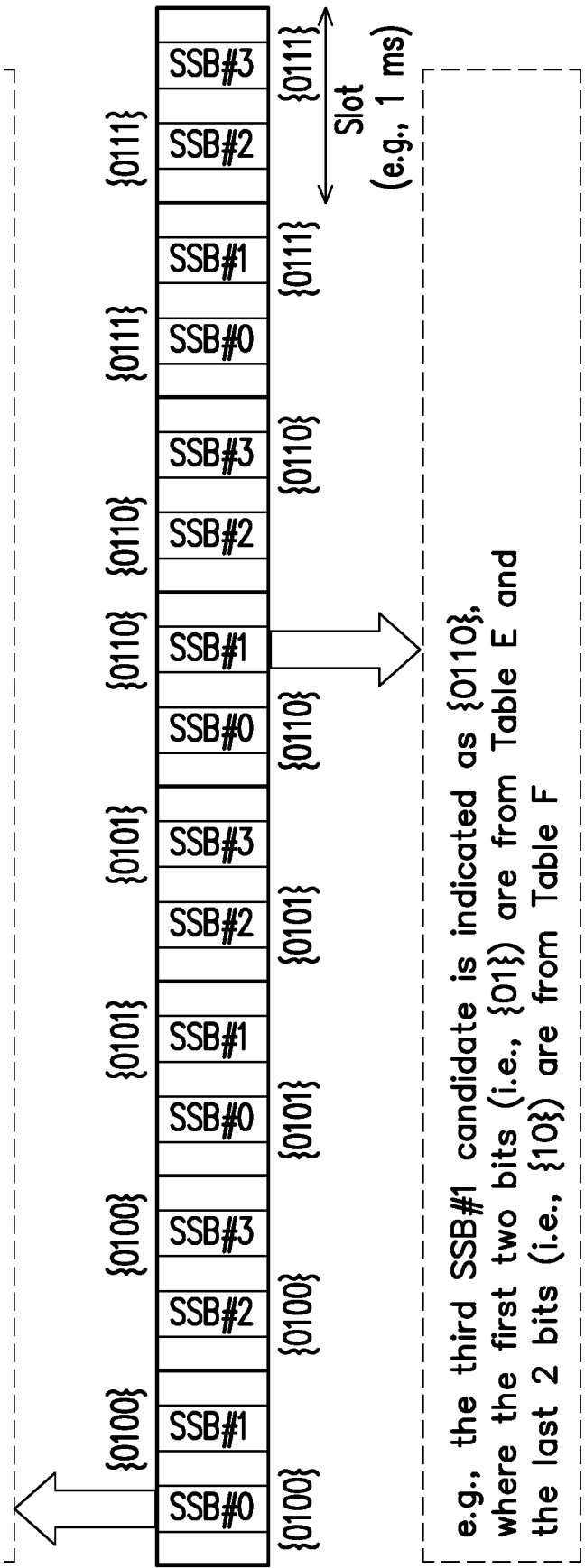
FIG. 36 illustrates a second example of two identification sequences of mapping information for Example 3 of mapping information according to one of the exemplary embodiments of the disclosure.
Figure 37:
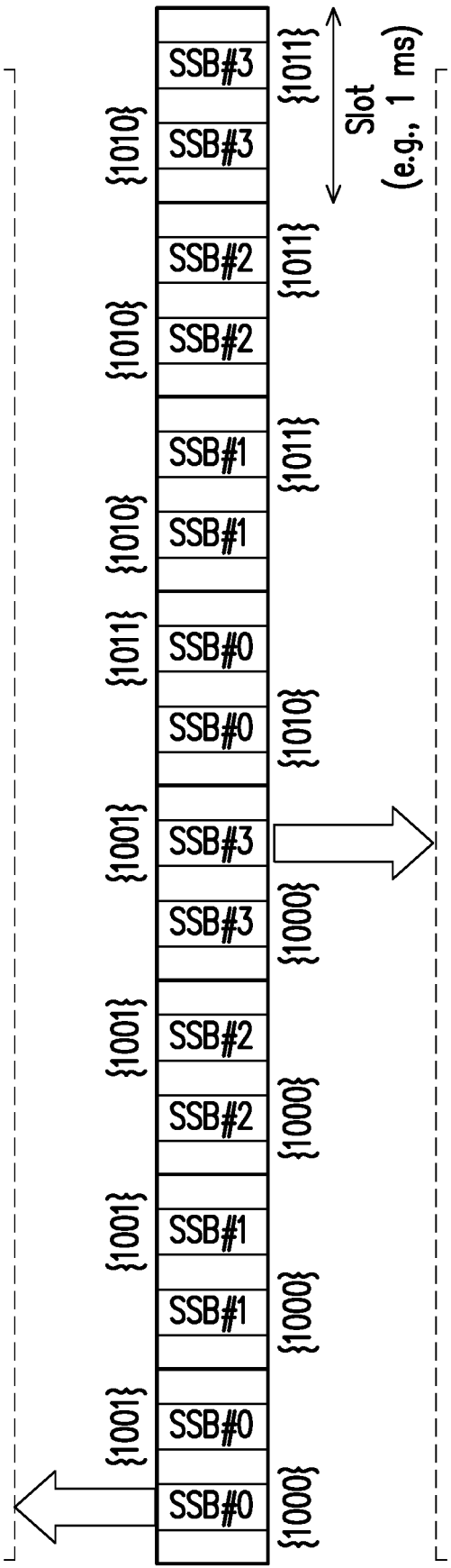
FIG. 37 illustrates a third example of two identification sequences of mapping information for Example 3 of mapping information according to one of the exemplary embodiments of the disclosure.

In FIGS. 35-37, mapping information may comprise two identification sequences. The first identification sequence may correspond to the SSB Pattern. Table E may be a look-up table to determine the SSB Pattern. The second identification sequence may correspond to the SSB candidate number. Table F may be a look-up table to determine the SSB candidate number. Tables E and F are shown as follows.

TABLE E

| {SSB Pattern} | Identification sequence |
|---|---|
| {00} | E0 |
| {01} | E1 |
| {10} | E2 |
| Reserved | Reserved |

Note:
number of bits of SSB Pattern may be ceil(log2(q)).

TABLE F

| {candidate} | Identification sequence |
|---|---|
| {00} | F0 |
| {01} | F1 |
| {10} | F2 |
| {11} | F3 |

Note:
number of bits of candidate may be ceil(log2(N)).

FIG. 35 illustrates a first example of two identification sequences of mapping information. FIG. 35 shows SSB Pattern #0. The gNB may transmit identification sequence E0 in the SSB. Thus, the first two bits of the SSB candidates may be {00}, according to Table E. The last two bits of the SSB candidates may indicate the SSB candidate number. For example, the gNB may transmit identification sequences E0 and F0 in the first SSB #0 candidate. Upon receiving SSB with SSB index SSB #0, the UE may use Table E and the received identification sequence E0 to determine that the SSB Pattern is SSB Pattern #0. Then, the UE may use Table F and the received identification sequence F0 to determine that the SSB candidate number is {00} and that the UE received the first SSB #0 candidate. As another example, the gNB may transmit identification sequences E0 and F1 in the second SSB #2 candidate. Upon receiving SSB with SSB index SSB #2, the UE may use Table E and the received identification sequence E0 to determine that the SSB Pattern is SSB Pattern #0. Then, the UE may use Table F and the received identification sequence F1 to determine that the last two bits are {01} and that the UE received the second SSB #2 candidate.

FIG. 36 illustrates a second example of two identification sequences of mapping information. FIG. 36 shows SSB Pattern #1. The gNB may transmit identification sequence E1 in the SSB. Thus, the first two bits of the SSB candidates may be {01}, according to Table E. The last two bits of the SSB candidates may indicate the SSB candidate number. For example, the gNB may transmit identification sequences E1 and F0 in the first SSB #0 candidate. Upon receiving SSB with SSB index SSB #0, the UE may use Table E and the received identification sequence E1 to determine that the SSB Pattern is SSB Pattern #1. Then, the UE may use Table F and the received identification sequence F0 to determine that the SSB candidate number is {00} and that the UE received the first SSB #0 candidate. As another example, the gNB may transmit identification sequences E1 and F2 in the third SSB #1 candidate. Upon receiving SSB with SSB index SSB #1, the UE may use Table E and the received identification sequence E1 to determine that the SSB Pattern is SSB Pattern #1. Then, the UE may use Table F and the received identification sequence F2 to determine that the last two bits are {10} and that the UE received the third SSB #1 candidate.

FIG. 37 illustrates a third example of two identification sequences of mapping information. FIG. 37 shows SSB Pattern #2. The gNB may transmit identification sequence E2 in the SSB. Thus, the first two bits of the SSB candidates may be {10}, according to Table E. The last two bits of the SSB candidates may indicate the SSB candidate number. For example, the gNB may transmit identification sequences E2 and F0 in the first SSB #0 candidate. Upon receiving SSB with SSB index SSB #0, the UE may use Table E and the received identification sequence E2 to determine that the SSB Pattern is SSB Pattern #2. Then, the UE may use Table F and the received identification sequence F0 to determine that the SSB candidate number is {00} and that the UE received the first SSB #0 candidate. As another example, the gNB may transmit identification sequences E2 and F1 in the second SSB #3 candidate. Upon receiving SSB with SSB index SSB #3, the UE may use Table E and the received identification sequence E2 to determine that the SSB Pattern is SSB Pattern #2. Then, the UE may use Table F and the received identification sequence F1 to determine that the last two bits are {01} and that the UE received the second SSB #3 candidate.

Figure 38:
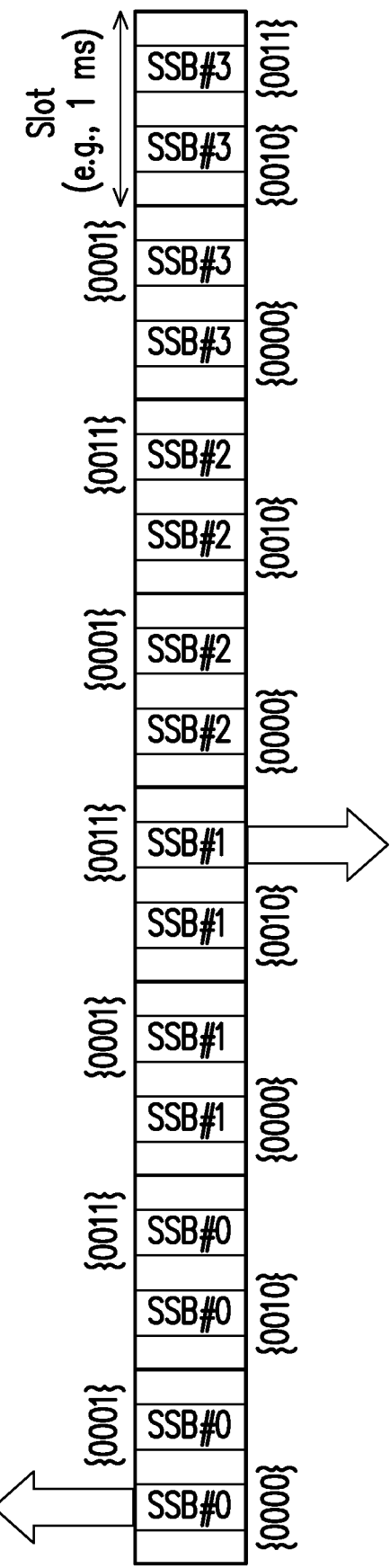
FIG. 38 illustrates a first example of one identification sequence of mapping information for Example 3 of mapping information according to one of the exemplary embodiments of the disclosure.
Figure 39:
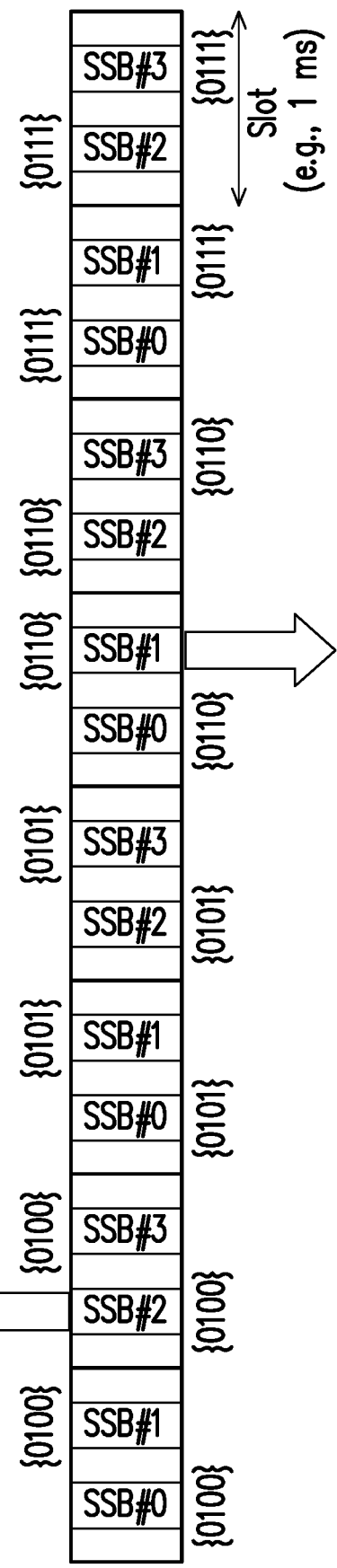
FIG. 39 illustrates a second example of one identification sequence of mapping information for Example 3 of mapping information according to one of the exemplary embodiments of the disclosure.
Figure 40:
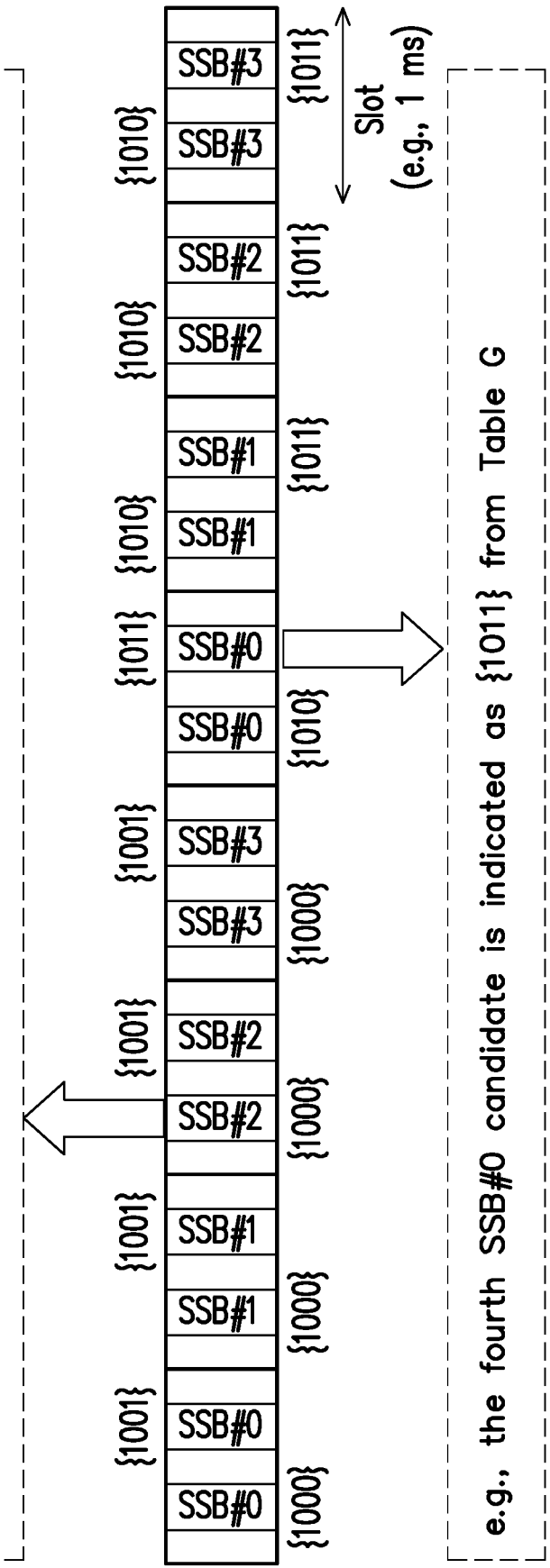
FIG. 40 illustrates a third example of one identification sequence of mapping information for Example 3 of mapping information according to one of the exemplary embodiments of the disclosure.

FIGS. 38-40 also illustrate Example 3 of mapping information. In FIGS. 38-40, mapping information may comprise one identification sequence. The identification sequence may correspond to the SSB Pattern and to the SSB candidate number. Table G may be a look-up table to determine the SSB Pattern and the SSB candidate number. Table G is shown as follows.

TABLE G

| {SSB Pattern, candidate} | Identification sequence |
| --- | --- |
| {00, 00} | G0 |
| {00, 01} | G1 |
| {00, 10} | G2 |
| {00, 11} | G3 |
| {01, 00} | G4 |
| {01, 01} | G5 |
| {01, 10} | G6 |
| {01, 11} | G7 |
| {10, 00} | G8 |

TABLE G-continued

| {SSB Pattern, candidate} | Identification sequence |
| --- | --- |
| {10, 01} | G9 |
| {10, 10} | G10 |
| {10, 11} | G11 |
| R | R |

Notes:
1. Number of bits of SSB Pattern may be ceil(log2(q)).
2. Number of bits of candidate may be ceil(log2(N)).
3. R: reserved.

FIG. 38 illustrates a first example of one identification sequence of mapping information. FIG. 38 shows SSB Pattern #0. Thus, the gNB may transmit identification sequences G0, G1, G2 and G3 in FIG. 38. For example, the gNB may transmit identification sequence G0 in the first SSB #0 candidate. Upon receiving SSB with SSB index SSB #0, the UE may use Table G and the received identification sequence G0 to determine the bits {00,00}. The UE may determine with the first two bits 00 that the SSB Pattern is SSB Pattern #0. The UE may also determine with the last two bits 00 that the UE received the first SSB #0 candidate. As another example, the gNB may transmit identification sequence G3 in the fourth SSB #1 candidate. Upon receiving SSB with SSB index SSB #3, the UE may use Table G and the received identification sequence G3 to determine the bits {00,11}. The UE may determine with the first two bits 00 that the SSB Pattern is SSB Pattern #0. The UE may also determine with the last two bits 11 that the UE received the fourth SSB #1 candidate.

FIG. 39 illustrates a second example of one identification sequence of mapping information. FIG. 39 shows SSB Pattern #1. Thus, the gNB may transmit identification sequences G4, G5, G6 and G7 in FIG. 39. For example, the gNB may transmit identification sequence G4 in the first SSB #2 candidate. Upon receiving SSB with SSB index SSB #2, the UE may use Table G and the received identification sequence G4 to determine the bits {01,00}. The UE may determine with the first two bits 01 that the SSB Pattern is SSB Pattern #1. The UE may also determine with the last two bits 00 that the UE received the first SSB #2 candidate. As another example, the gNB may transmit identification sequence G6 in the third SSB #1 candidate. Upon receiving SSB with SSB index SSB #1, the UE may use Table G and the received identification sequence G6 to determine the bits {01,10}. The UE may determine with the first two bits 01 that the SSB Pattern is SSB Pattern #1. The UE may also determine with the last two bits 10 that the UE received the third SSB #1 candidate.

FIG. 40 illustrates a third example of one identification sequence of mapping information. FIG. 40 shows SSB Pattern #2. Thus, the gNB may transmit identification sequences G8, G9, G10 and G11 in FIG. 40. For example, the gNB may transmit identification sequence G8 in the first SSB #2 candidate. Upon receiving SSB with SSB index SSB #2, the UE may use Table G and the received identification sequence G8 to determine the bits {10,00}. The UE may determine with the first two bits 10 that the SSB Pattern is SSB Pattern #2. The UE may also determine with the last two bits 00 that the UE received the first SSB #2 candidate. As another example, the gNB may transmit identification sequence G11 in the fourth SSB #0 candidate. Upon receiving SSB with SSB index SSB #1, the UE may use Table G and the received identification sequence G11 to determine the bits {10,11}. The UE may determine with the first two bits 10 that the SSB Pattern is SSB Pattern #2. The UE may also determine with the last two bits 11 that the UE received the fourth SSB #0 candidate.

Figure 42:
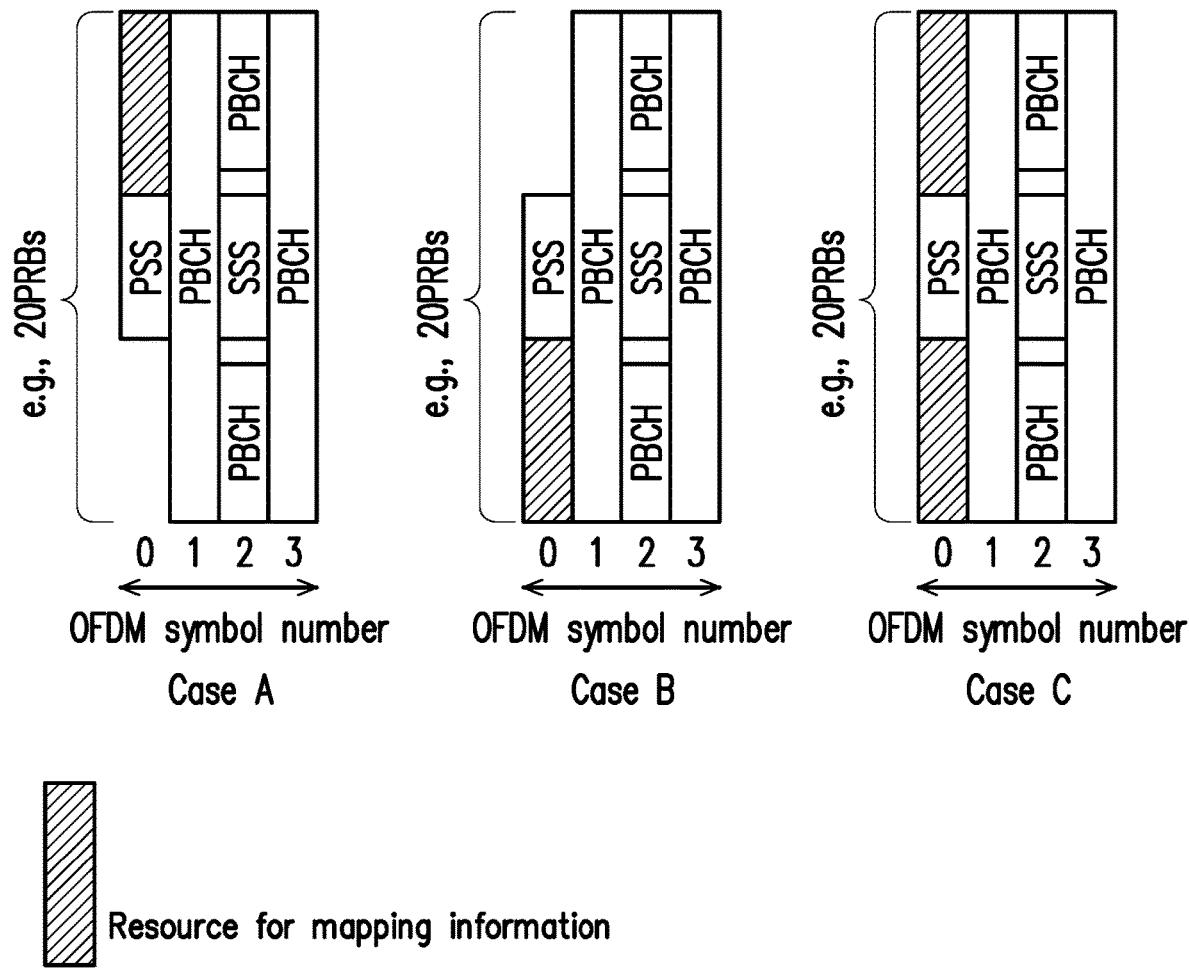
FIG. 42 illustrates three cases of SSBs with mapping information according to one of the exemplary embodiments of the disclosure.

FIGS. 41-42 show SSBs with mapping information according to exemplary embodiments of the disclosure.

FIG. 41 shows a SSB transmitted on unlicensed band. The SSB may at least comprise SS, PBCH and mapping information. As shown in FIG. 41, the SSB may also comprise PSS, SSS, PBCH and the mapping information. For example, in time domain, the mapping information and PSS may be placed in the same OFDM symbol. In frequency domain, the mapping information may be placed in frequencies higher and/or lower than the frequencies occupied by PSS. A set of physical resource blocks (PRB) may be utilized to carry the mapping information. For example, FIG. 41 shows OFDM symbols comprising 20 PRBs. The gNB may allocate resources for mapping information. FIG. 41 shows 8 PRBs carrying mapping information: 4 PRBs are in frequencies above PSS and the other 4 PRBs are in frequencies below PSS. For example, at least one CAZAC, ZC and/or PN sequence may be utilized to represent the mapping information. For example, the length of the CAZAC, ZC and/or PN sequence may be 12 bits, and the mapping information may be one or two bits. The gNB may generate a CAZAC sequence of a length of 12 bits in at least one PRB to represent one bit. For example, with first cyclic shift (in other words, 0) for bit {0}, and with second cyclic shift (in other words, 6) for bit {1}.

FIG. 42 shows three cases of SSB with mapping information. In Case A, the gNB may allocate resources for mapping information in frequencies above PSS. In Case B, the gNB may allocate resources for mapping information in frequencies below PSS. In Case C, the gNB may allocate resources for mapping information in frequencies both above and below PSS. The gNB may place the at least one PRB according to Case A, Case B or Case C.

In another example, the mapping information may comprise CAZAC sequences corresponding to two bits. In a first alternative, the gNB may generate two CAZAC sequences. The gNB may generate a first CAZAC sequence in at least one PRB to represent the first bit. For example, with first cyclic shift (in other words, 0) for bit {0}, and with second cyclic shift (in other words, 6) for bit {1}. In a similar way, the gNB may generate a second CAZAC sequence in at least one PRB to represent the second bit. For example, the length of the CAZAC sequences may be 12 bits. The combination of the first and the second CAZAC sequences may be used to represent 2 bits. The mapping information of the SSB may comprise the first and the second CAZAC sequences. The gNB may place the two sequences according to Case A, Case B or Case C of FIG. 42. Particularly, for Case C, the gNB may place one sequence in the frequencies above PSS, and one sequence in the frequencies below PSS.

In a second alternative, the gNB may generate one CAZAC sequence to represent the two bits of mapping information. The gNB may generate a CAZAC sequence in at least one PRB to represent two bits. For example: with first cyclic shift (in other words, 0) for bits {00}; with second cyclic shift (in other words, 3) for bits {01}; with third cyclic shift (in other words, 6) for bits {10}; and with fourth cyclic shift (in other words, 9) for bits {11}. For example, the length of the CAZAC sequence may be 12 bits. The mapping information of the SSB may comprise the CAZAC sequence. The gNB may place the at least one PRB according to Case A, Case B or Case C of FIG. 42.

In another example, the mapping information may comprise CAZAC sequences corresponding to three bits. In a first alternative, the gNB may generate two CAZAC sequences. The gNB may generate a first CAZAC sequence in at least one PRB to represent one bit. For example, with first cyclic shift (in other words, 0) for bit {0}, and with second cyclic shift (in other words, 6) for bit {1}. The gNB may generate a second CAZAC sequence in at least one PRB to represent the other two bits. For example: with first cyclic shift (in other words, 0) for bits {00}; with second cyclic shift (in other words, 3) for bits {01}; with third cyclic shift (in other words, 6) for bits {10}; and with fourth cyclic shift (in other words, 9) for bits {11}. For example, the length of the CAZAC sequences may be 12 bits. The combination of the first and the second CAZAC sequences may be used to represent 3 bits. For example, the first bit is from the first CAZAC sequence and the last two bits are from the second CAZAC sequence. The mapping information of the SSB may comprise the first and the second CAZAC sequences. The gNB may place the two CAZAC sequences according to Case A, Case B or Case C of FIG. 42. Particularly, for Case C, the gNB may place one CAZAC sequence in the frequencies above PSS, and one CAZAC sequence in the frequencies below PSS.

In a second alternative, the gNB may generate three CAZAC sequences to represent the three bits of mapping information. The gNB may generate a first CAZAC sequence in at least one PRB to represent a first bit. For example, with first cyclic shift (in other words, 0) for bit {0}, and with second cyclic shift (in other words, 6) for bit {1}. In a similar way, the gNB may generate a second CAZAC sequence in at least one PRB to represent the second bit. Also in a similar way, the gNB may generate a third CAZAC sequence in at least one PRB to represent the third bit. For example, the length of the CAZAC sequences may be 12 bits. The combination of the first, second and third CAZAC sequences may be used to represent 3 bits. The gNB may place the three sequences according to Case A, Case B or Case C of FIG. 42. Particularly, for Case C, the gNB may place some sequence(s) in the frequencies above PSS, and the other sequence(s) in the frequencies below PSS.

In another example, the mapping information may comprise CAZAC sequences corresponding to four bits. In a first alternative, the gNB may generate two CAZAC sequences. The gNB may generate a first CAZAC sequence in at least one PRB to represent two bits. For example: with first cyclic shift (in other words, 0) for bits {00}; with second cyclic shift (in other words, 3) for bits {01}; with third cyclic shift (in other words, 6) for bits {10}; and with fourth cyclic shift (in other words, 9) for bits {11}. In a similar way, the gNB may generate a second CAZAC sequence in at least one PRB to represent the other two bits. For example, the length of the CAZAC sequences may be 12 bits. The combination of the first and the second CAZAC sequences may be used to represent 4 bits. For example, the first two bits are from the first CAZAC sequence and the last two bits are from the second CAZAC sequence. The mapping information of the SSB may comprise the first and the second CAZAC sequences. The gNB may place the two sequences according to Case A, Case B or Case C of FIG. 42. Particularly, for Case C, the gNB may place one sequence in the frequencies above PSS, and one sequence in the frequencies below PSS.

In a second alternative, the gNB may generate four CAZAC sequences to represent the four bits of mapping information. The gNB may generate a first CAZAC sequence in at least one PRB to represent a first bit. For example, with first cyclic shift (in other words, 0) for bit {0}, and with second cyclic shift (in other words, 6) for bit {1}. In a similar way, the gNB may generate a second CAZAC sequence in at least one PRB to represent a second bit. Also in a similar way, the gNB may generate a third CAZAC sequence in at least one PRB to represent a third bit. Lastly, in a similar way, the gNB may generate a fourth CAZAC sequence in at least one PRB to represent a fourth bit. For example, the length of the CAZAC sequences may be 12 bits. The combination of the four CAZAC sequences may be used to represent 4 bits. The gNB may place the four sequences according to Case A, Case B or Case C of FIG. 42. Particularly, for Case C, the gNB may place some sequence(s) in the frequencies above PSS, and other sequence(s) in the frequencies below PSS.

Thus, in several embodiments of the disclosure, the mapping information of the SSB comprises a plurality of constant amplitude zero autocorrelation (CAZAC) sequences. In several exemplary embodiments of the disclosure, each CAZAC sequence of the mapping information may correspond to one single bit of the SSB candidate number and/or the SSB pattern. In other exemplary embodiments of the disclosure, each CAZAC sequence of the mapping information may correspond to two bits of the SSB candidate number and/or the SSB pattern.

FIGS. 43-46 show SSB multiplexing with the Physical Downlink Shared Channel (PDSCH) according to exemplary embodiments of the disclosure. For rate matching purposes, UE may need to know on which SSB candidate position does gNB transmits SSB. In the examples of FIGS. 43-46, the time length of a slot=1 ms, SCS=15 KHz and N=4.

Figure 43:
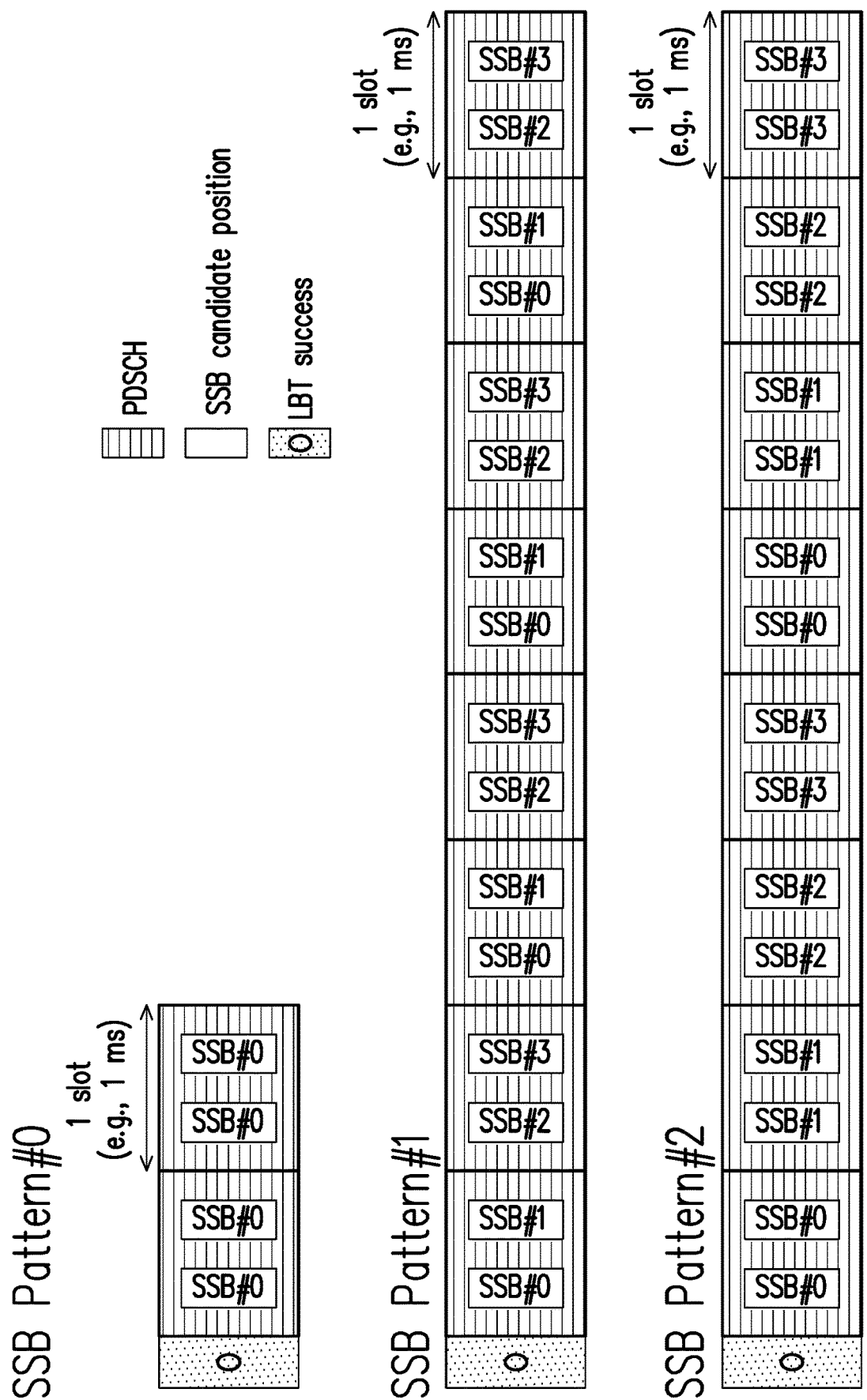
FIG. 43 illustrates SSB multiplexing with the Physical Downlink Shared Channel (PDSCH) according to exemplary embodiments of the disclosure.

FIG. 43 shows SSB Patterns transmitted in PDSCH. gNB may perform LBT for PDSCH transmission. Upon LBT success, gNB may transmit PDSCH. PDSCHs of FIG. 43 show SSB Pattern #0, SSB Pattern #1, and SSB Pattern #2. gNB may allocate resources for the SSB candidate positions in PDSCH. However, if gNB does not transmit SSB in a SSB candidate position, gNB may transmit PDSCH in the unused SSB candidate position.

Figure 44:
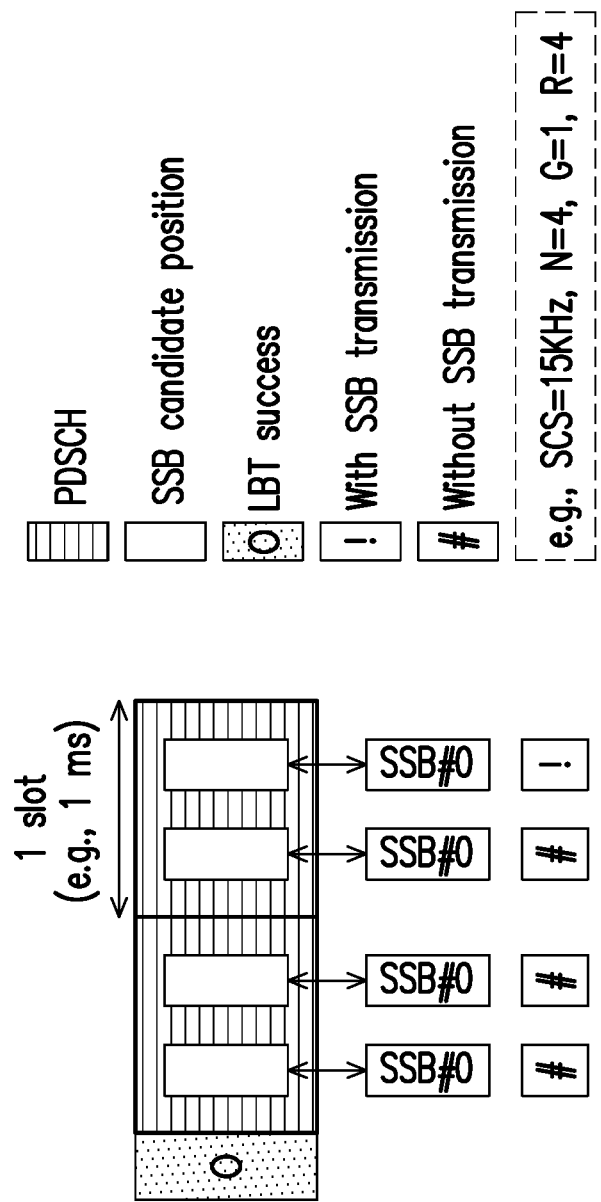
FIG. 44 illustrates SSB multiplexing with the Physical Downlink Shared Channel (PDSCH) for SSB Pattern #0 according to exemplary embodiments of the disclosure.

FIG. 44 shows PDSCH with SSBs in SSB Pattern #0. Since gNB uses SSB Pattern #0, G=1 and R=N/G=4. gNB may perform LBT for PDSCH transmission. Upon LBT success, gNB may transmit PDSCH. SSB may be transmitted in a fixed SSB candidate position. For example, SSB #0 may be transmitted in the last SSB candidate position. In this case, UE may do rate matching at the last SSB candidate position. If gNB does not transmit SSB in a SSB candidate position, gNB may transmit PDSCH in the unused SSB candidate position.

Figure 45:
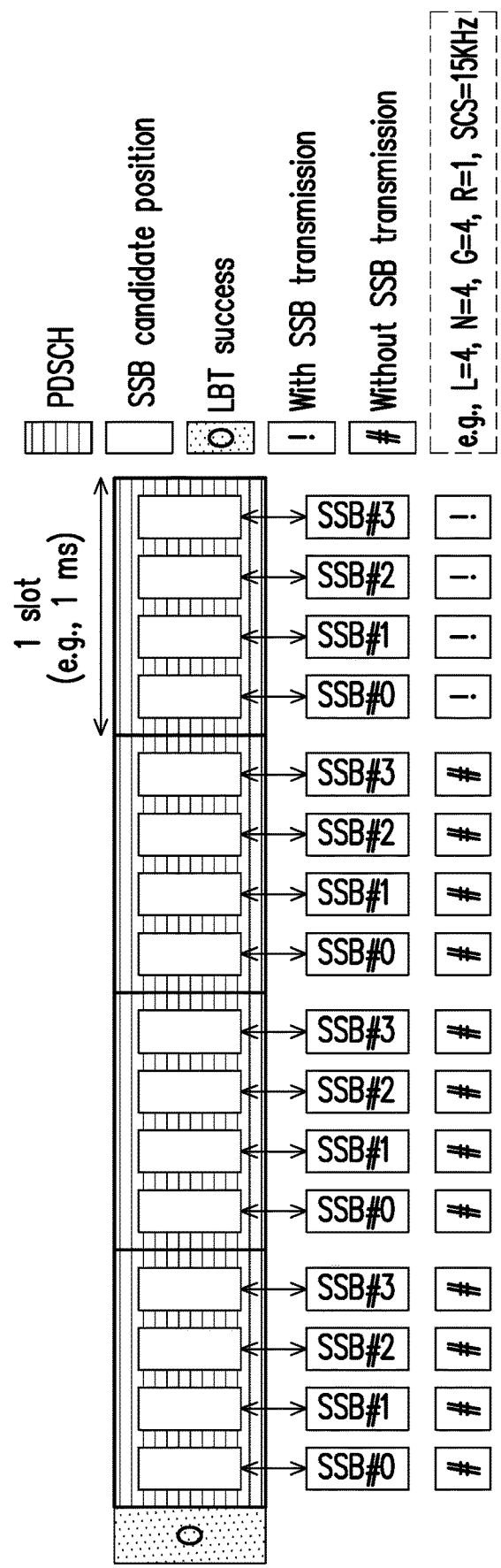
FIG. 45 illustrates SSB multiplexing with the Physical Downlink Shared Channel (PDSCH) for SSB Pattern #1 according to exemplary embodiments of the disclosure.

FIG. 45 shows PDSCH with SSBs in SSB Pattern #1. Since gNB uses SSB Pattern #1, G=N=4 and R=N/G=1. In FIG. 45, L=4. gNB may perform LBT for PDSCH transmission. Upon LBT success, gNB may transmit PDSCH. SSBs may be transmitted in fixed SSB candidate positions (e.g., fixed window, fixed slot). For example, SSB #0, SSB #1, SSB #2 and SSB #3 may be transmitted in the last SSB candidate positions. In this case, UE may do rate matching at the last SSB candidate position of each SSB index. If gNB does not transmit SSB in a SSB candidate position, gNB may transmit PDSCH in the unused SSB candidate position.

Figure 46:
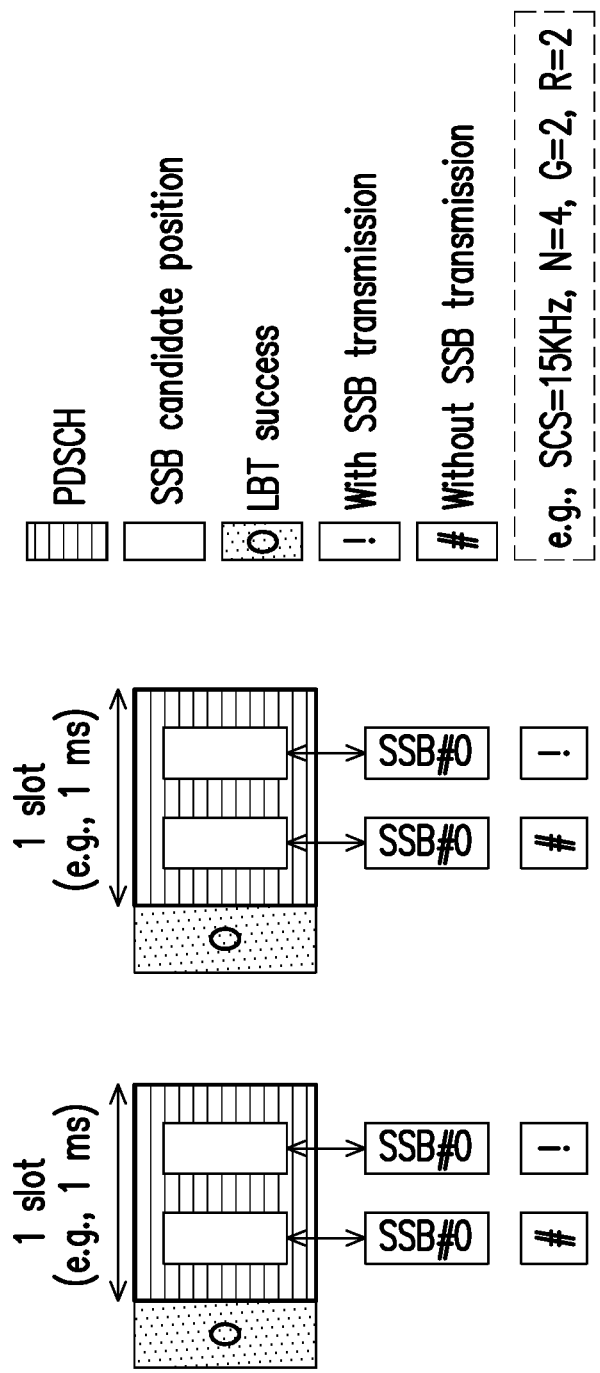
FIG. 46 illustrates SSB multiplexing with the Physical Downlink Shared Channel (PDSCH) for SSB Pattern #2 according to exemplary embodiments of the disclosure.

FIG. 46 shows PDSCH with SSBs in SSB Pattern #2. In FIG. 46, N=4, G=2 and R=N/G=2. gNB may perform LBT for PDSCH transmission. Upon LBT success, gNB may transmit PDSCH. SSB may be transmitted in a fixed SSB candidate position. For example, SSB #0 may be transmitted in the second and the fourth SSB candidate positions. In this case, UE may do rate matching at the second and the fourth SSB candidate positions. If gNB does not transmit SSB in a SSB candidate position, gNB may transmit PDSCH in the unused SSB candidate position.

In view of the aforementioned descriptions, the disclosure is suitable for being used in a 5G communication system, wherein the 5G communication system uses an unlicensed frequency band, and is able to increase the opportunities for the UEs to access the network. A gNB provides several positions for SSB candidates of the same SSB index. The gNB performs CCA checks and LBT procedures before determining to transmit a SSB candidate. If the channel is occupied, the gNB continues to perform LBT until the channel is available. If the channel is available, the gNB transmits the SSB candidate in the SSB candidate position. Once the gNB is able to transmit a SSB candidate of a particular SSB index, the gNB is not required to transmit the remaining SSB candidates of the particular SSB index. Thus, there is a much higher probability that the gNB is able to transmit at least one of the SSB candidates to the UEs, and the UEs have a higher probability of accessing the network.

A beam in this document may be represented by an antenna, an antenna port, an antenna element, a group of antennas, a group of antenna port, a group of antenna element, a spatial domain filter, a reference signal, a reference signal resource set. For example, a first beam may be represented as a first antenna port or a first group of antenna port or a first spatial domain filter. A beam may be associated with a SSB index. Different signals using the same beam for transmission shows that the two signals have the same spatial relation.

A gNodeB in this document may be a cell, a serving cell, a transmission reception point (TRP), an unlicensed cell, an unlicensed serving cell, an unlicensed TRP, a gNB, an evolved Node B (eNodeB), an eNB, . . . , but not limited herein.

Combinations of embodiments disclosed in this document is not precluded. Channel occupancy time may be restricted by regulation. For example, channel occupancy time may be less than 1 ms, and at least a sensing interval of 25 microseconds is clean.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A network access method used by a user equipment (UE), the method comprising:
    receiving, within a Synchronization Signal/physical broadcast channel Block (SSB) transmission period which contains multiple transmission opportunities of SSBs having a same index, a received SSB, and once the received SSB has been received within the SSB transmission period, no other SSB having the same SSB index as the received SSB is received within the SSB transmission period, and the received SSB comprises a physical broadcast channel (PBCH), a primary synchronization signal (PSS), and a secondary synchronization signal (SSS); and
    determining directly from the received SSB, a SSB candidate number and a SSB index.

2. The network access method of claim 1, wherein a next generation Node B (gNB) configures the SSB transmission period.

3. The network access method of claim 1, wherein the SSB transmission period comprises a plurality of windows.

4. The network access method of claim 3, wherein each window of the plurality of windows comprises a plurality of slots, wherein a slot of the plurality of slots has only two SSB transmission opportunities.

5. The network access method of claim 3, wherein the first window of the plurality of windows is located at the start of the SSB transmission period.

6. The network access method of claim 3, wherein the windows of the plurality of windows are adjacent to each other and do not overlap.

7. The network access method of claim 3, wherein the SSB transmission period is not smaller than the total time occupied by the plurality of windows.

8. The network access method of claim 3, wherein a first window comprises a plurality of SSB transmission opportunities, each of the SSB transmission opportunities is located in a position in the first window, each of the SSB transmission opportunities has a spatial relation,
    wherein a second window comprises another plurality of SSB transmission opportunities, each of the SSB transmission opportunities of the second window is located in a position in the second window, each of the SSB transmission opportunities of the second window has a spatial relation,
    wherein if a SSB transmission opportunity of the first window and a SSB transmission opportunity of the second window are located in the same position, the SSB transmission opportunity of the first window and the SSB transmission opportunity of the second window have the same spatial relation.

9. The network access method of claim 8, wherein the first window and the second window are in the same SSB transmission period.

10. The network access method of claim 8, wherein the first window and the second window are in different SSB transmission periods.

11. The network access method of claim 8, wherein a SSB transmission opportunity of the first window and a SSB transmission opportunity of the second window are separated by a predetermined time gap.

12. The network access method of claim 8, wherein an average number of SSB transmission opportunities of the same spatial relation in a SSB transmission period is determined at least by one of a total number of SSB transmission opportunities in the SSB transmission period, a number of spatial relations for SSB or a number of SSB indexes.

13. A user equipment (UE) comprising:
    a wireless receiver; and
    a processor coupled to the wireless receiver and configured to:
        receive, via the wireless receiver and within a Synchronization Signal/physical broadcast channel Block (SSB) transmission period which contains multiple transmission opportunities of SSBs having a same index, a received SSB, and once the received SSB has been received within the SSB transmission period, no other SSB having the same SSB index as the received SSB is received within the SSB transmission period, and the received SSB comprises a physical broadcast channel (PBCH), a primary synchronization signal (PSS), and a secondary synchronization signal (SSS); and
        determine directly from the received SSB, a SSB candidate number and a SSB index.

14. The UE of claim 13, wherein the SSB transmission period comprises a plurality of windows.

15. The UE of claim 14, wherein a next generation Node B (gNB) configures the SSB transmission period.

16. The UE of claim 14, wherein each window of the plurality of windows comprises a plurality of slots, wherein a slot of the plurality of slots has only two SSB transmission opportunities.

17. The UE of claim 14, wherein the first window of the plurality of windows is located at the start of the SSB transmission period.

18. The UE of claim 14, wherein the windows of the plurality of windows are adjacent to each other and do not overlap.

19. The UE of claim 14, wherein the SSB transmission period is not smaller than the total time occupied by the plurality of windows.

20. The UE of claim 14, wherein a first window comprises a plurality of SSB transmission opportunities, each of the SSB transmission opportunities is located in a position in the first window, each of the SSB transmission opportunities has a spatial relation,
    wherein a second window comprises another plurality of SSB transmission opportunities, each of the SSB transmission opportunities of the second window is located in a position in the second window, each of the SSB transmission opportunities of the second window has a spatial relation,
    wherein if a SSB transmission opportunity of the first window and a SSB transmission opportunity of the second window are located in the same position, the SSB transmission opportunity of the first window and the SSB transmission opportunity of the second window have the same spatial relation.

21. The UE of claim 20, wherein the first window and the second window are in the same SSB transmission period.

22. The UE of claim 20, wherein the first window and the second window are in different SSB transmission periods.

23. The UE of claim 20, wherein a SSB transmission opportunity of the first window and a SSB transmission opportunity of the second window are separated by a predetermined time gap.

24. The UE of claim 20, wherein an average number of SSB transmission opportunities of the same spatial relation in a SSB transmission period is determined at least by one of a total number of SSB transmission opportunities in the SSB transmission period, a number of spatial relations for SSB or a number of SSB indexes.

* * * * *